US009132803B2

(12) United States Patent
Inagawa et al.

(10) Patent No.: US 9,132,803 B2
(45) Date of Patent: Sep. 15, 2015

(54) SEATBELT RETRACTOR

(75) Inventors: Yasuhiro Inagawa, Osaka (JP); Hiroyuki Miyoshi, Osaka (JP); Do Shik Kim, Osaka (JP); Insu Choi, Osaka (JP)

(73) Assignee: ASHMORI INDUSTRY CO., LTD., Osaka (JP)

( * ) Notice: Subject to any disclaimer, the term of this patent is extended or adjusted under 35 U.S.C. 154(b) by 206 days.

(21) Appl. No.: 13/991,498

(22) PCT Filed: Dec. 12, 2011

(86) PCT No.: PCT/JP2011/078657
§ 371 (c)(1),
(2), (4) Date: Jun. 4, 2013

(87) PCT Pub. No.: WO2012/098784
PCT Pub. Date: Jul. 26, 2012

(65) Prior Publication Data

US 2013/0256444 A1 Oct. 3, 2013

(30) Foreign Application Priority Data

Jan. 20, 2011 (JP) ................................ 2011-009436

(51) Int. Cl.

| | |
|---|---|
| ***B60R 22/38*** | (2006.01) |
| ***B60R 22/46*** | (2006.01) |
| *B60R 22/28* | (2006.01) |

(52) U.S. Cl.
CPC ............. *B60R 22/46* (2013.01); *B60R 22/4633* (2013.01); *B60R 22/4676* (2013.01); *B60R 2022/286* (2013.01)

(58) Field of Classification Search
CPC ...................... B60R 22/4628; B60R 2022/286
USPC ......................................................... 242/374
See application file for complete search history.

(56) References Cited

U.S. PATENT DOCUMENTS

| | | | | |
|---|---|---|---|---|
| 5,788,176 | A | 8/1998 | Ebner et al. | |
| 6,367,729 | B1 * | 4/2002 | Inagawa et al. | 242/379.1 |

(Continued)

FOREIGN PATENT DOCUMENTS

| | | |
|---|---|---|
| DE | 40 00 313 A1 | 7/1991 |
| DE | 296 05 200 U1 | 7/1996 |

(Continued)

OTHER PUBLICATIONS

Extended Search Report issued in European Patent Application No. 11856387.3 dated May 9, 2014.

(Continued)

*Primary Examiner* — Sang Kim
(74) *Attorney, Agent, or Firm* — Oliff PLLC

(57) ABSTRACT

A winding drum with a webbing wound thereon has one axial end rotatably supported by one sidewall section of a housing, and a shaft section raised from the other axial end is rotatably supported through a cover member mounted on the outer end of the other sidewall section of the housing. The housing has an opening formed in the other sidewall section through which a ratchet gear is inserted with gap therebetween, the ratchet gear being formed on the outer peripheral edge of the winding drum at the other axial end side thereof; and inner teeth formed on the inner peripheral edge of the opening. When pretensioner mechanism is activated and tensile force greater than predetermined level acts on the webbing, the cover member is plastically deformed through the shaft section and locks the ratchet gear into engaged state wherein the ratchet gear is engaged with the inner teeth.

2 Claims, 42 Drawing Sheets

(56) References Cited

U.S. PATENT DOCUMENTS

| | | | | |
|---|---|---|---|---|
| 7,232,089 | B2 * | 6/2007 | Inagawa et al. | 242/379.1 |
| 7,290,730 | B2 * | 11/2007 | Nagata et al. | 242/374 |
| 8,371,613 | B2 * | 2/2013 | Hodatsu et al. | 280/806 |

FOREIGN PATENT DOCUMENTS

| | | |
|---|---|---|
| DE | 10 2006 018 455 A1 | 10/2007 |
| DE | 10 2007 051 572 A1 | 4/2009 |
| GB | 2 240 257 A | 7/1991 |
| JP | U-7-5990 | 1/1995 |
| JP | A-8-40201 | 2/1996 |
| JP | A-2009-241863 | 10/2009 |

OTHER PUBLICATIONS

International Search Report issued in International Patent Application No. PCT/JP2011/078657 dated Jan. 17, 2012.

* cited by examiner 1
5
6
7
8
9
3
11
12
13
13A
13B
14
14A
14B
15
16
17
21
22
25
26
27
30
32
38
51
57
8A 16
125
57
122
131
122
122
127
119A
119B
61
62A
62
62B
111
113
114
114
116
64A
63B
63A
117
64
64B
63A
63
17
66D
79
66C
66
82
85
66A
79
66B
7
72
71
73
33
74
33A
118A
112
80
81
65
80
81
83
128
81
77
29
29
29
68
76

1
3
6
7
8
9
11
12
22
26
27
31
32
33
45
48
88
206
206E
207
209
210
210B

P1
1
3
6
7
8
9
11
12
21
22
26
27
31
32
33
45
48
88
206
206E
207
209
210
210B
L1

SEATBELT RETRACTOR

TECHNICAL FIELD

The present invention relates to a seatbelt retractor which removes the slack of webbing in case of an emergency such as vehicle collision or the like.

BACKGROUND ART

Conventionally, there have been proposed various types of seatbelt retractors which remove the slack of webbing in case of an emergency, such as vehicle collision or the like.

For instance, there has conventionally been used a seatbelt retractor equipped with a forced locking mechanism which functions as follows. In a case where a gas generating member of a pretensioner mechanism activates in response to vehicle collision, a piston inside a pipe cylinder moves upward from its normal state so as to rotate a pinion gear body. Thereby, teeth on a pinion gear portion of the pinion gear body come in contact with a push block disposed inside of a base block body and push the push block outwardly. Consequently, the push block is further pushed outwardly by a block urging spring so that a rotating lever is rotated. Further on, a lower end portion of the rotating lever is disengaged from a tip end portion of a gear-side arm. Thereby, the gear-side arm is rotated in outward direction by the urging spring, and simultaneously, a mechanical-side arm is rotated through a coupling shaft. As a result, rotation of the mechanical-side arm causes a pawl to get engaged with a ratchet gear of a take-up drum (for instance, refer to Japanese Laid-open Patent Publication No. 2009-241863).

SUMMARY OF THE INVENTION

Problems to be Solved by the Invention

The forced locking mechanism of the seatbelt retractor disclosed in the above described patent publication requires, as assemblage members, the push block to be disposed inside the base block, the block urging spring, the rotating lever, the gear-side arm, the urging spring, the coupling shaft and the mechanical-side arm. Thus, the number of assemblage members is large, which makes assemblage complicated.

The present invention has been made to solve the above mentioned problem and an object thereof is to provide a seatbelt retractor that has a forced locking mechanism that can be assembled quickly with reduced number of assemblage members, the forced locking mechanism serving to prevent a take-up drum from rotating in a webbing-pull-out direction when a pretensioner mechanism portion activates.

Means for Solving the Problem

To achieve the object of the present invention, there is provided a seatbelt retractor comprising: a housing; a take-up drum that is housed in the housing in a rotatable fashion and configured to house a webbing by winding the webbing thereon; and a pretensioner mechanism unit that is mounted on an exterior of one-side wall portion of the housing and configured to rotate the take-up drum in a webbing-take-up direction so as to take up the webbing on the take-up drum in a case of vehicle collision, wherein an axial directional one end of the take-up drum is rotatably supported by the one-side wall portion of the housing and a shaft portion erected on an axial directional other end of the take-up drum is rotatably supported by a cover member that is mounted on an exterior of other-side wall portion of the housing, the other-side wall portion facing the one-side wall portion, wherein the housing includes: an opening portion that is formed in the other-side wall portion of the housing and configured to allow insertion of a ratchet gear formed on an outer periphery of an edge portion at the axial directional other end of the take-up drum so that predetermined space is secured between the opening portion and the ratchet gear when the ratchet gear is inserted therein; and inner teeth that are formed on an inner periphery of the opening portion so as to face the ratchet gear and capable of engaging with the ratchet gear, and wherein, when the pretensioner mechanism activates and causes the webbing to receive a predetermined value or more of tensile force, the cover member gets plastically deformed via the shaft portion so that the inner teeth of the opening portion and the ratchet gear stay in an engaged state.

In the above seatbelt retractor, when the pretensioner mechanism activates due to vehicle collision and causes the webbing to receive a predetermined value or more of tensile force, the cover member mounted on the exterior of the other-side wall portion of the housing gets plastically deformed via the shaft portion erected on the axial directional other end of the take-up drum. Thereby, there is caused the engaged state between the ratchet gear formed on the outer periphery the take-up drum having been inserted in the opening portion formed on the other-side wall portion of the housing and the inner teeth formed on the inner periphery of the opening portion and they stay in the engaged state.

Thereby, plastic deformation can surely be caused to the cover member mounted on the exterior of the other-side wall portion of the housing when the webbing is taken up in response to activation of the pretensioner mechanism. Consequently, this mechanical configuration can surely and promptly prevent the take-up drum from rotating in the webbing-pull-out direction. Thereby, even after activation of the pretensioner mechanism, the mechanical configuration can surely keep locking the take-up drum so as not to rotate in the webbing-pull-out direction. Further, this mechanical configuration allows the take-up drum to rotate in the webbing-take-up direction so that the take-up drum can surely take up the webbing thereon in response to activation of the pretensioner mechanism.

Further, on the inner periphery of the opening portion formed on the other-side wall portion of the housing, there are formed the inner teeth configured to get engaged with the ratchet gear. Still further, on the other-side wall portion of the housing, there is mounted the cover member. The arrangement of the above mentioned mechanical elements can constitute a forced locking mechanism that prevents the take-up drum from rotating in the webbing-pull-out direction when the pretensioner mechanism activates. Thereby, reduction in the number of assemblage parts and speeding-up of assemblage operation can be achieved with respect to the forced locking mechanism that prevents the take-up drum from rotating in the webbing-pull-out direction when the pretensioner mechanism activates.

Further, in the seatbelt retractor of the present invention, pitch of the inner teeth may be made smaller than pitch of the ratchet gear.

In the above seatbelt retractor, the pitch of the inner teeth is made smaller than the pitch of the ratchet gear. Therefore, the difference of pitch size can surely shorten delay time for the ratchet gear to get engaged with the inner teeth when the take-up drum rotates in the webbing-pull-out direction. Still further, since the pitch of the inner teeth is made smaller than the pitch of the ratchet gear, tooth thickness of the inner teeth can be thickened by reducing radial directional tooth depth of the inner teeth by burring, etc.

Further, in the seatbelt retractor of the present invention, the inner teeth may be formed on a part of the inner periphery of the opening portion that faces the ratchet gear so that, with reference to rotation axis of the take-up drum, the inner teeth start from at least a webbing-pull-out-side radial direction toward a direction where the take-up drum is caused to rotate when the webbing is pulled out.

In the above seatbelt retractor, the inner teeth are formed on a part of the inner periphery of the opening portion that faces the ratchet gear so that, with reference to rotation axis of the take-up drum, the inner teeth start from at least a webbing-pull-out-side radial direction toward a direction where the take-up drum is caused to rotate when the webbing is pulled out. Thereby, the inner teeth can surely be formed on the inner periphery of the opening portion that faces movement direction of the ratchet gear that is formed on the outer periphery at the end portion of the take-up drum and caused to move when the cover member gets plastically deformed in response to activation of the pretensioner mechanism.

Further, in the seatbelt retractor of the present invention, the cover member may be made by molding synthetic resin.

In the above seatbelt retractor, the cover member is made by molding synthetic resin. Therefore, shape and hardness of the cover member can easily be designed. Thereby, plastic deformation can surely be caused to the cover member so that the ratchet gear gets engaged with the inner teeth to keep the engaged state when the pretensioner mechanism activates and causes the webbing to receive a predetermined value or more of tensile force.

DESCRIPTION OF EMBODIMENTS

Hereinafter, one embodiment of the seatbelt retractor according to the present invention will be described in detail while referring to the accompanying drawings.

[Schematic Configuration]

First, a schematic configuration of a seatbelt retractor 1 according to the present embodiment will be described based on FIG. 1 and FIG. 2.

Figure 1:
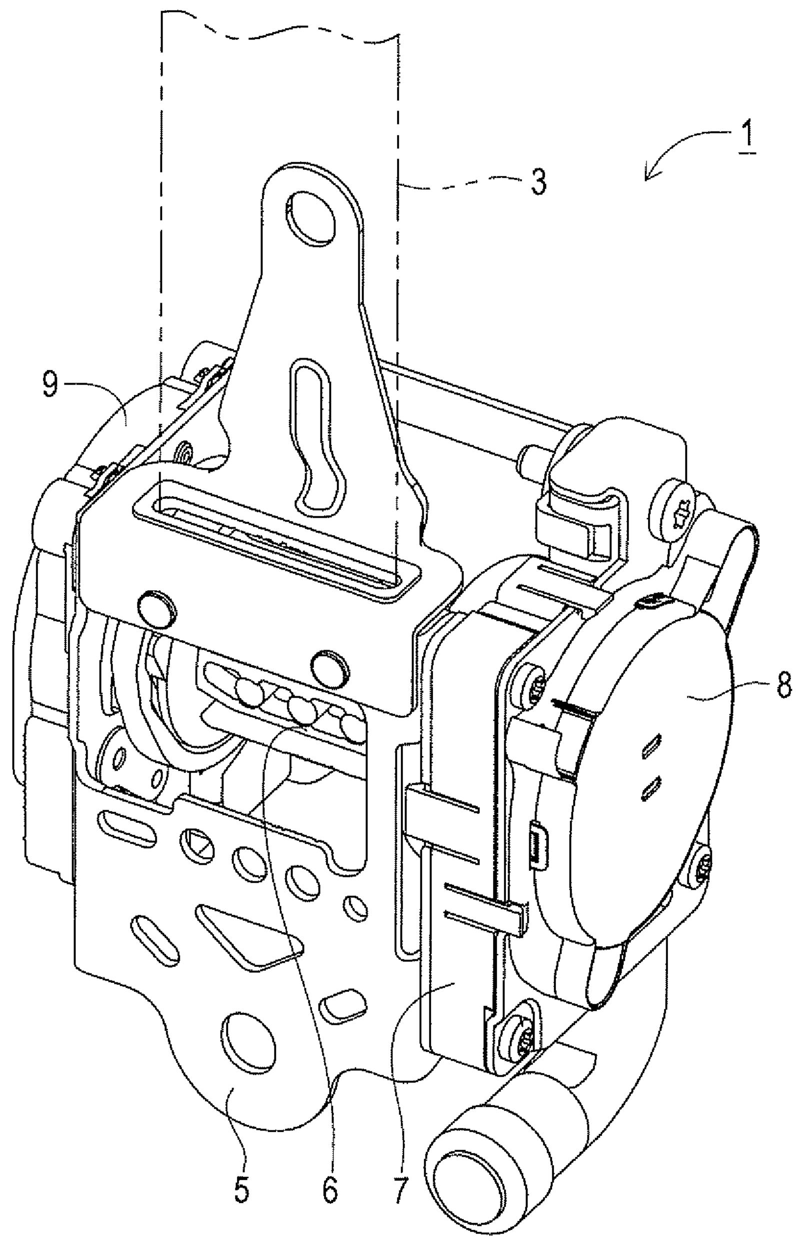
FIG. 1 is a perspective view showing an outer appearance of a seatbelt retractor according to a present embodiment.

FIG. 1 is a perspective view showing an outer appearance of a seatbelt retractor 1 according to the present embodiment. FIG. 2 is a perspective view showing the respective assemblies of the seatbelt retractor 1 in a disassembled state.

Figure 2:
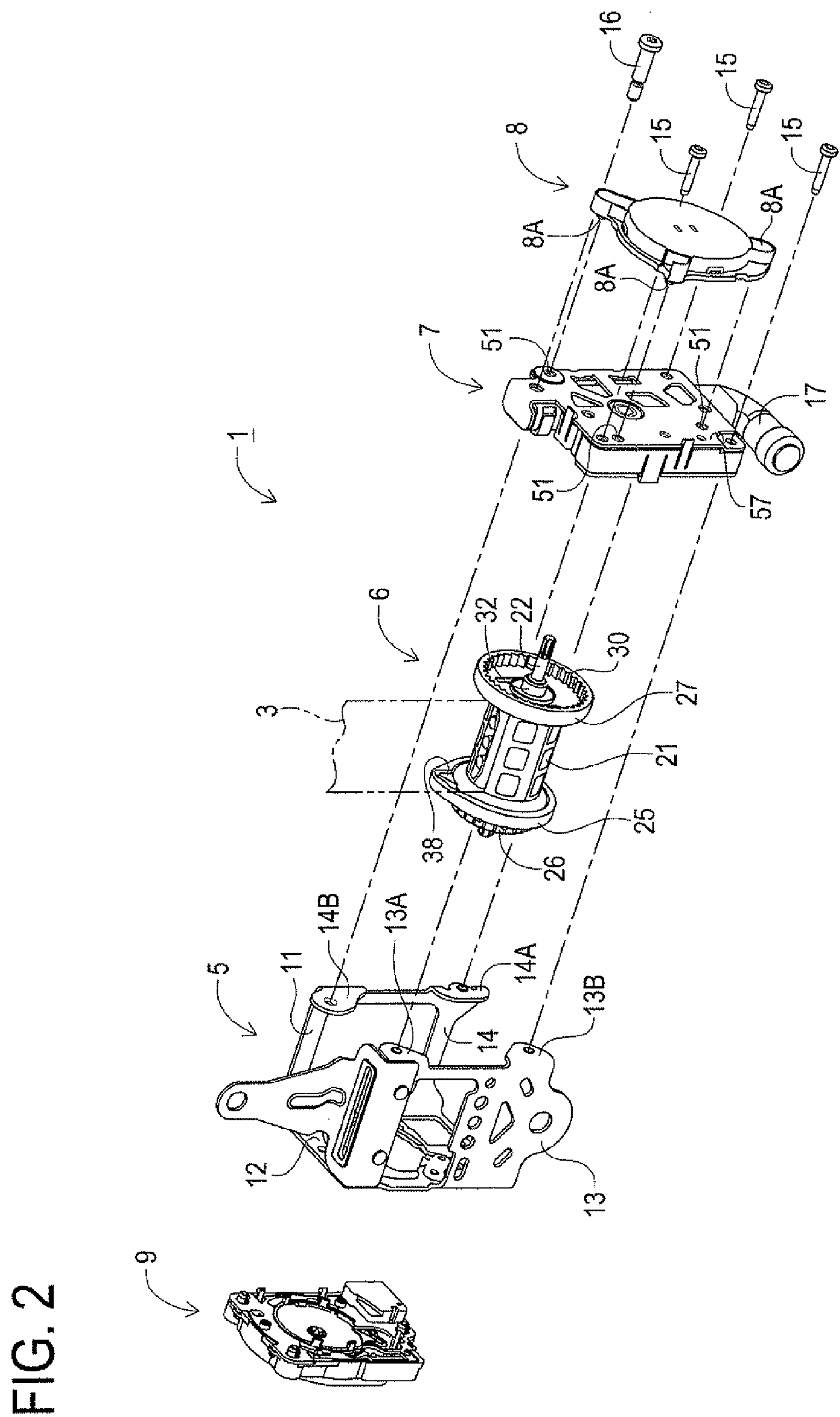
FIG. 2 is a perspective view showing respective assemblies of the seatbelt retractor in a disassembled state.

As shown in FIG. 1 and FIG. 2, the seatbelt retractor 1 is a device for retracting a vehicle webbing 3. The seatbelt retractor 1 is comprised of a housing unit 5, a take-up drum unit 6, a pretensioner unit 7, a take-up spring unit 8 and a locking unit 9.

The locking unit 9 is fixed to a side wall portion 12 of a housing 11 constituting the housing unit 5 as will be described later. The locking unit 9 carries out an actuating operation to stop pull out of the webbing 3 in response to a sudden pull out of the webbing 3 or more than predetermined acceleration of a vehicle speed.

The pretensioner unit 7 having a pretensioner mechanism 17 (refer to FIG. 6) as will be described later is mounted to the housing unit 5. To be more specific, the housing unit 5 has a substantially U-shape in plain view and has a side plate portion 13 and a side plate portion 14 which constitute opposite sides thereof. From the top and lower edge portions of the side plate portions 13 and 14, screwed portions 13A, 13B and screwed portions 14A, 14B extend inwardly from each side plate portion 13 and 14 roughly at right angle and form a screw hole separately. The pretensioner unit 7 and the housing unit 5 are screwed with three screws 15 and a stopper screw 16 at the screwed portions 13A, 13B, 14A, and 14B. Thereby, the pretensioner unit 7 constitutes the other side wall portion opposite the side wall portion 12 of the housing 11.

Figure 5:
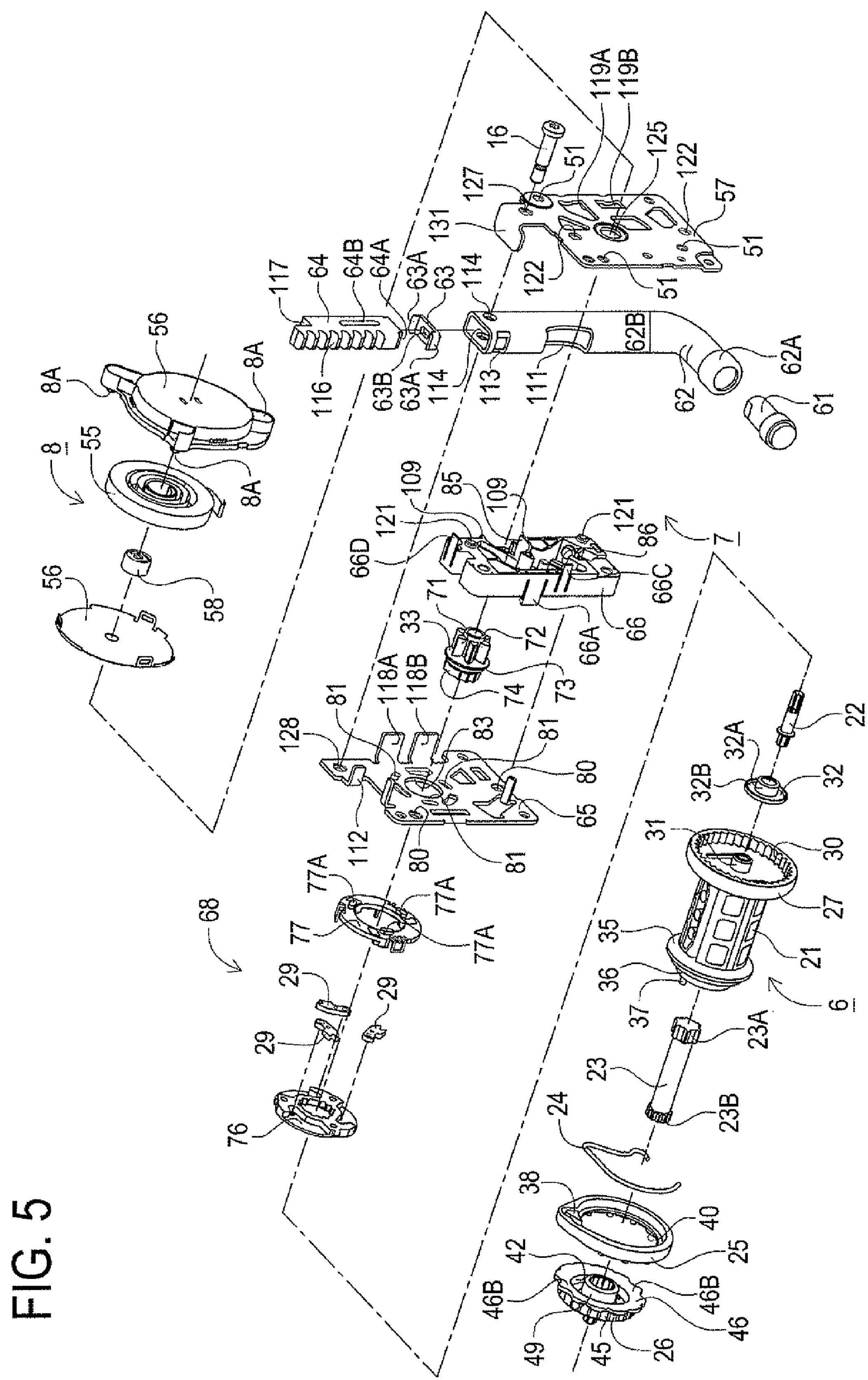
FIG. 5 is an exploded perspective view of the take-up drum unit, a pretensioner unit and a take-up spring unit.

A take-up spring unit 8 is fixed to an outer side of the pretensioner unit 7 by nylon latches 8A which are integrally formed with a spring case 56 (refer to FIG. 5).

A take-up drum unit 6 onto which the webbing 3 is wound is rotatably supported between the pretensioner unit 7 and the locking unit 9 fixed to the side wall portion 12 of the housing unit 5.

[Schematic Configuration of Take-up Drum Unit]

Next, a schematic configuration of the take-up drum unit 6 will be described based on FIG. 2 through FIG. 5.

Figure 3:
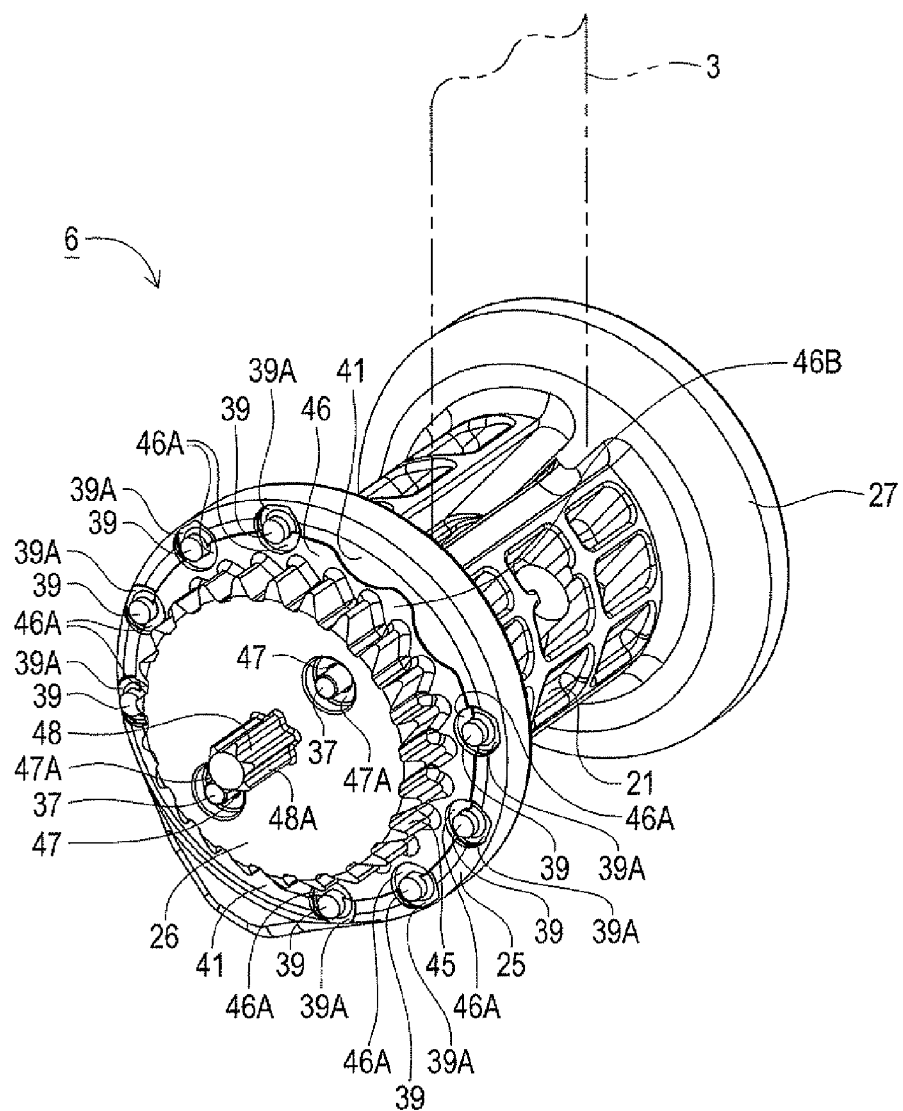
FIG. 3 is a perspective view of a take-up drum unit.
Figure 4:
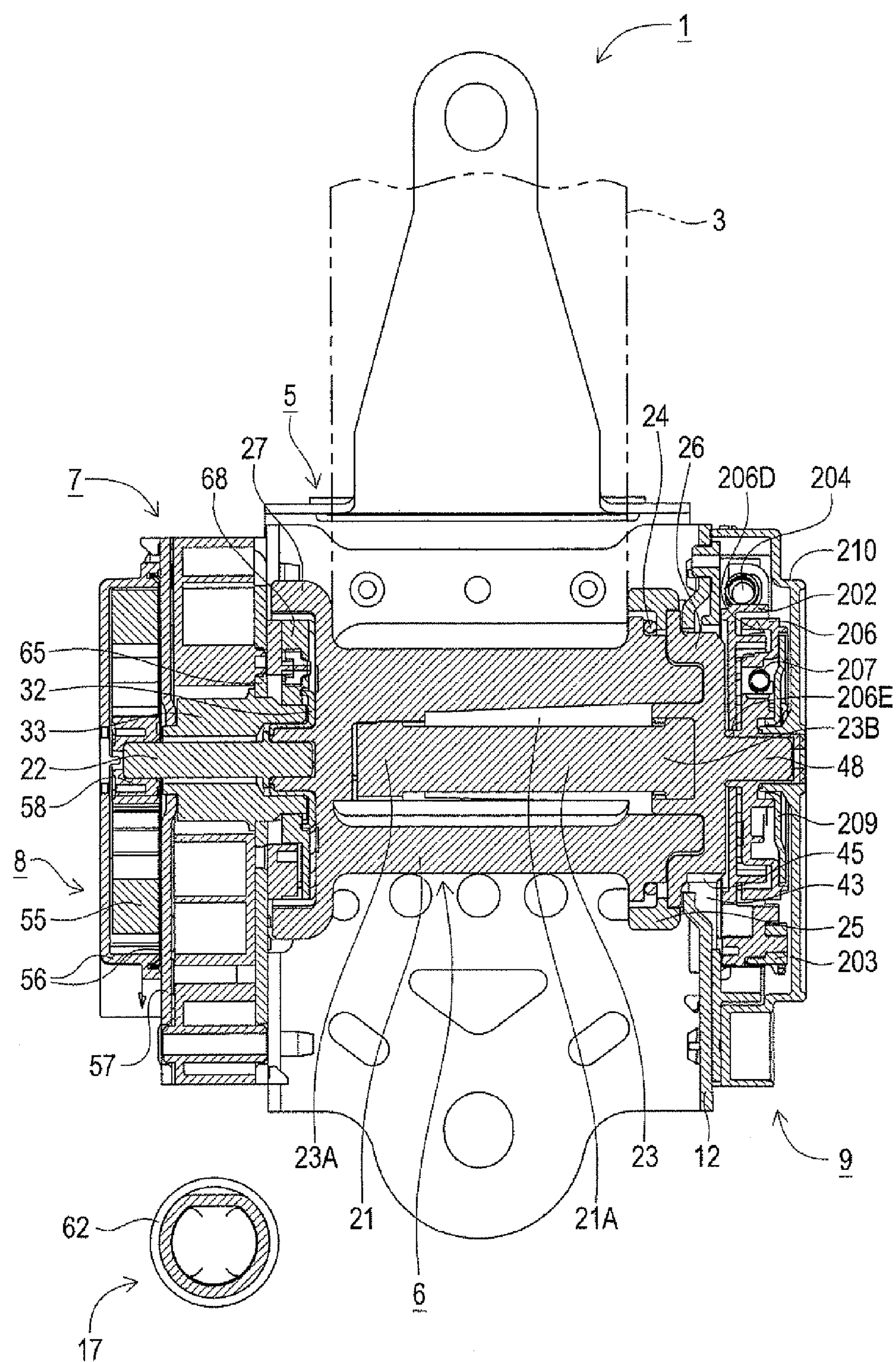
FIG. 4 is a cross sectional view of the seatbelt retractor.

FIG. 3 is a perspective view of a take-up drum unit 6. FIG. 4 is a cross sectional view of a seatbelt retractor 1. FIG. 5 is an exploded perspective view of the take-up drum unit 6, the pretensioner unit 7 and the take-up spring unit 8.

As shown in FIG. 2 through FIG. 5, the take-up drum unit 6 is comprised of a guiding drum 21, a drum shaft 22, a torsion bar 23, a wire 24, a wire plate 25, a ratchet gear 26 and a bearing 32.

The guiding drum 21 is made of an aluminum material or the like and is formed in a substantially cylindrical shape, with one end portion thereof facing the pretensioner unit 7 being walled and closed. On an edge portion of a shaft central direction of the guiding drum 21 which is at the side of pretensioner unit 7, there is formed a flange portion 27 which extends radially and outwardly from an outer peripheral portion of the guiding drum 21, roughly at a right angle with its shaft central direction. A clutch gear 30 is formed in an inner peripheral face of this flange portion 27 so that the clutch gear 30 engages the respective clutch pawls 29 in case of vehicle collision as will be described later.

A cylindrical mounting boss 31 is erected at a central position in the end portion of the guiding drum 21 on the pretensioner unit 7 side. Also, a drum shaft 22 formed of a steel material or the like is mounted at the central position of this end portion by press fitting or the like. To the outer periphery of the mounting boss 31, there are fitted the bearing 32 which has a cylindrical portion 32A having substantially a cylindrical shape and being formed of a synthetic resin material such as polyacetal resin or the like, and a flanged end portion 32B which is connected at an outer periphery of a bottom end portion of the cylindrical portion 32A. The take-up drum unit 6 is rotatably supported by a shaft receiving portion 33A of a pinion gear body 33 (refer to FIG. 6 and FIG. 8) through this bearing 32. The pinion gear body 33 is formed of a steel material and the like and constitutes the pretensioner unit 7.

Inside the guiding drum 21, there is formed a shaft hole 21A which extends along a center axis thereof so as to become tapered. Within the shaft hole 21A on the flange portion 27 side, there is formed a spline groove for fitting the torsion bar 23 which is made of a steel material or the like. The spline 23A side of the torsion bar 23 is inserted in the shaft hole 21A of the guiding drum 21 and is press-fitted to get in contact with the flange portion 27. As a result, the torsion bar 23 is press-fitted and fixed inside the guiding drum 21 so that relative rotation thereof with respect to the guiding drum 21 is disabled.

On the locking unit 9 side in an axial direction of the guiding drum 21, there is formed a flange portion 35 which extends slightly in a radial direction from an outer peripheral surface slightly inside an edge portion of the guiding drum 21. Also, from an outer side of the flange portion 35, there is formed a cylindrical stepped portion 36 of which outer diameter of a portion at an outer side thereof becomes tapered in an axial direction. A pair of ejector pins 37 and 37 are erected at radially opposite positions in an outer end portion of the stepped portion 36.

On an outer side surface of the flange portion 35, as will be described later, there is formed a convex portion in a predetermined shape (refer to FIG. 18). A rod-shaped wire 24 made up of a metallic material such as a stainless steel material is mounted to an outer periphery of a bottom end portion of the stepped portion 36 so as to match the shape of this convex portion.

An outer peripheral portion of the flange portion 35 is covered by a wire plate 25 which is a substantially egg-like shape when seen from a side. The wire plate 25 is made of an aluminum material or the like and has a convex portion 38 so as to allow a fit of the wire 24 which protrudes outward from the flange portion 35.

At a central part of the wire plate 25, there is formed a through hole 40 into which the stepped portion 36 will be inserted. On an outer periphery portion of the through hole 40 at an axial directional outside thereof, there are formed a pair of engaging convex portions 41 each of which protrudes radially and inwardly from an inner periphery of the through hole 40 like a circular arc shape. The pair of engaging convex portions 41 are disposed so as to oppose each other in a radial direction. At portions between the pair of engaging convex portions 41 on the outer periphery portion of the thorough hole 40 at the axial direction outside thereof, there are erected four pairs of revet pins 39 so that revet pins 39 of each pair oppose each other in a radial direction. A concave portion 39A being recessed to a predetermined depth in a semi-circular arcuate shape is formed in a bottom end portion of each rivet pin 39.

A ratchet gear 26 has a cylindrical extending portion 42 having a disk-like shape and being made of a steel material or the like. The extending portion 42 extends from an outer peripheral portion in an axial direction up to a length substantially the same with the stepped portion 36. In an outer peripheral surface of this extending portion 42, there is formed a ratchet gear portion 45. As will be described later, in a case of vehicle collision, the ratchet gear portion 45 gets engaged with an engagement gear portion 89 comprised of inner teeth 88 (refer to FIG. 10) so as to stay in an engaged state. In a case of vehicle emergency, the pawl 43 (refer to FIG. 9) gets engaged with the ratchet gear portion 45.

At an edge portion of the extending portion 42 in an axial direction on the guiding drum 21 side, there is formed a baffle flange 46 which extends from an outer peripheral portion of the extending portion 42 in a radial direction. Further, a pair of engaging concave portions 46B are provided at an outer periphery of the baffle flange 46 (refer to FIG. 5) thereon so as to oppose each other in a radial direction. Concave portions 46A being recessed to a predetermined depth in a semi-circular arcuate shape are formed in an outer surface in the axial direction of the baffle flange 46, so as to oppose the respective rivet pins 39.

Through holes 47 are opened in the ratchet gear 26 at positions opposite the respective ejector pins 37 so as to allow insertion of the respective ejector pins 37. Concave portions 47A being recessed to a predetermined depth are formed in the circumference of the respective through holes 47. A shaft portion 48 is erected at a center position outside of the ratchet gear 26. A spline 48A is formed at an outer peripheral surface of the shaft portion 48. The take-up drum unit 6 is thus rotatably supported by the locking unit 9 through this shaft portion 48.

A cylindrical mounting boss 49 is erected at a central part of an inner surface of the ratchet gear 26. Spline grooves are formed at an inner peripheral surface of the mounting boss 49 for fitting the spline 23B formed at the other end of the torsion bar 23. The spline 23B formed at the other end of the torsion bar 23 is formed so as to have an outer diameter which is approximately the same as the outer diameter of the spline 23A formed at the one end of the torsion bar 23.

Accordingly, the respective engaging concave portions 46B of the baffle flange 46 in the ratchet gear 26 are fitted with the respective engaging convex portions 41 of the wire plate 25. Thereafter, the respective rivet pins 39 are riveted so as to expand at an inner side of the concave portions 39A at a base end thereof and the concave portions 46A of the baffle flange 46 formed at opposite positions. The wire 24 is mounted to an outer surface of the flange portion 35 in the guiding drum 21 (refer to FIG. 18).

Next, when the wire plate 25 and the ratchet gear 26 are applied to the outside of the flange portion 35, the spline 23B formed at the other end of the torsion bar 23 is fitted inside the mounting boss 49 while the respective ejector pins 37 of the guiding drum 21 are being inserted inside the respective through holes 47 of the ratchet gear 26. Thereafter, the respective ejector pins 37 are riveted so as to be expanded inside the concave portions 47A formed in a circumference of the through holes 47.

As a result, the ratchet gear 26 and the wire plate 25 are mounted so that relative rotation thereof is disabled. This ratchet gear 26 and the wire plate 25 are also mounted to the guiding drum 21 through the torsion bar 23 and the respective ejector pins 37 so that relative rotation thereof with respect to the guiding drum 21 is disabled. The webbing 3 is wound around an outer peripheral surface between the flange portion 27 of the guiding drum 21 and the flange portion 35 and the wire plate 25.

[Schematic Configuration of Take-up Spring Unit]

Next, a schematic configuration of the take-up spring unit 8 will be described based on FIG. 2, FIG. 4 and FIG. 5.

As shown in FIG. 2, FIG. 4 and FIG. 5, the take-up spring unit 8 has a take-up urging mechanism 55 including a spiral spring, a spring case 56 for accommodating this take-up urging mechanism 55 and a spring shaft 58. The take-up spring unit 8 is fixed in the respective through holes 51 in the cover plate 57 constituting the outer side of the pretensioner unit 7 formed of a steel material or the like through nylon latches 8A provided at three locations on the spring case 56. A tip end portion of the drum shaft 22 in the take-up drum unit 6 is coupled with the spiral spring through the spring shaft 58 inside the spring case 56. Thus, the take-up drum unit 6 is urged in a retracting direction of the webbing 3 at all times owing to the urging force of the spiral spring.

[Schematic Configuration of Pretensioner Unit]

Next, a schematic configuration of the pretensioner unit 7 will be described based on FIG. 4 through FIG. 8.

Figure 6:
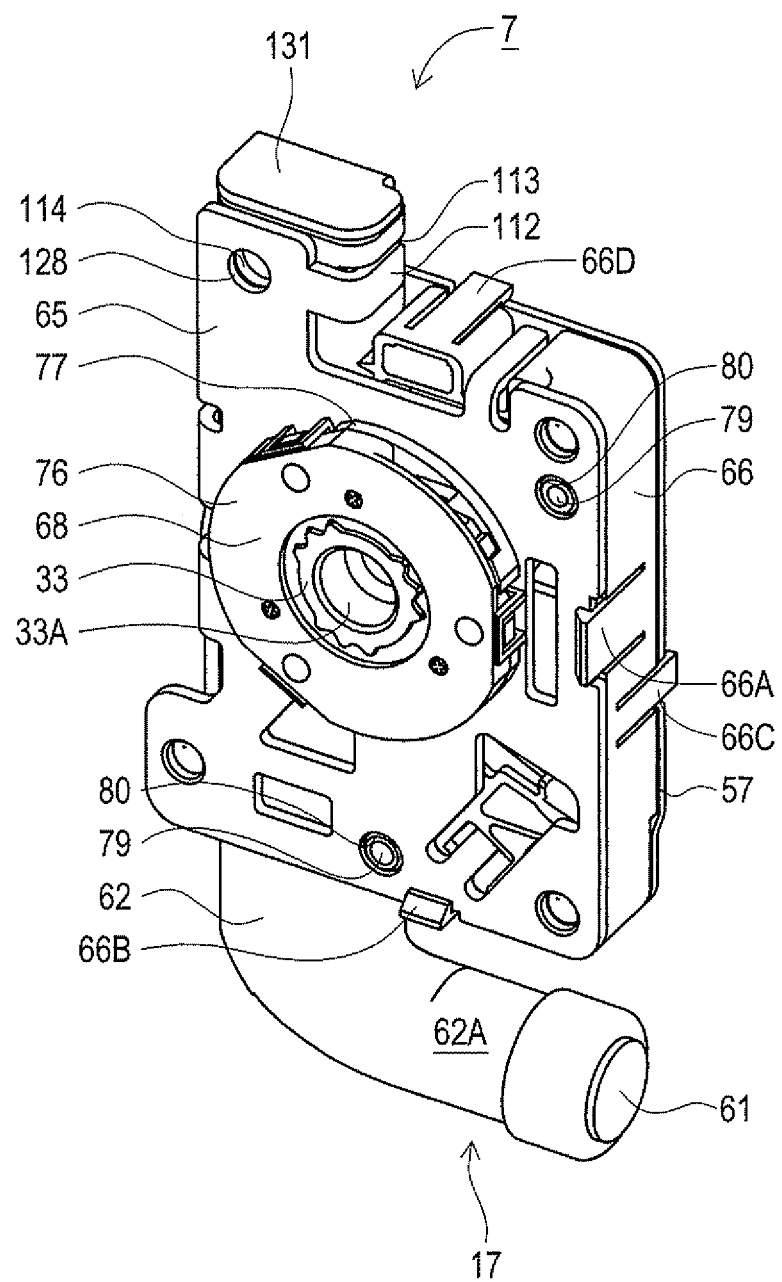
FIG. 6 is a perspective view of a pretensioner unit as seen from a housing unit mounting side thereof.
Figure 7:
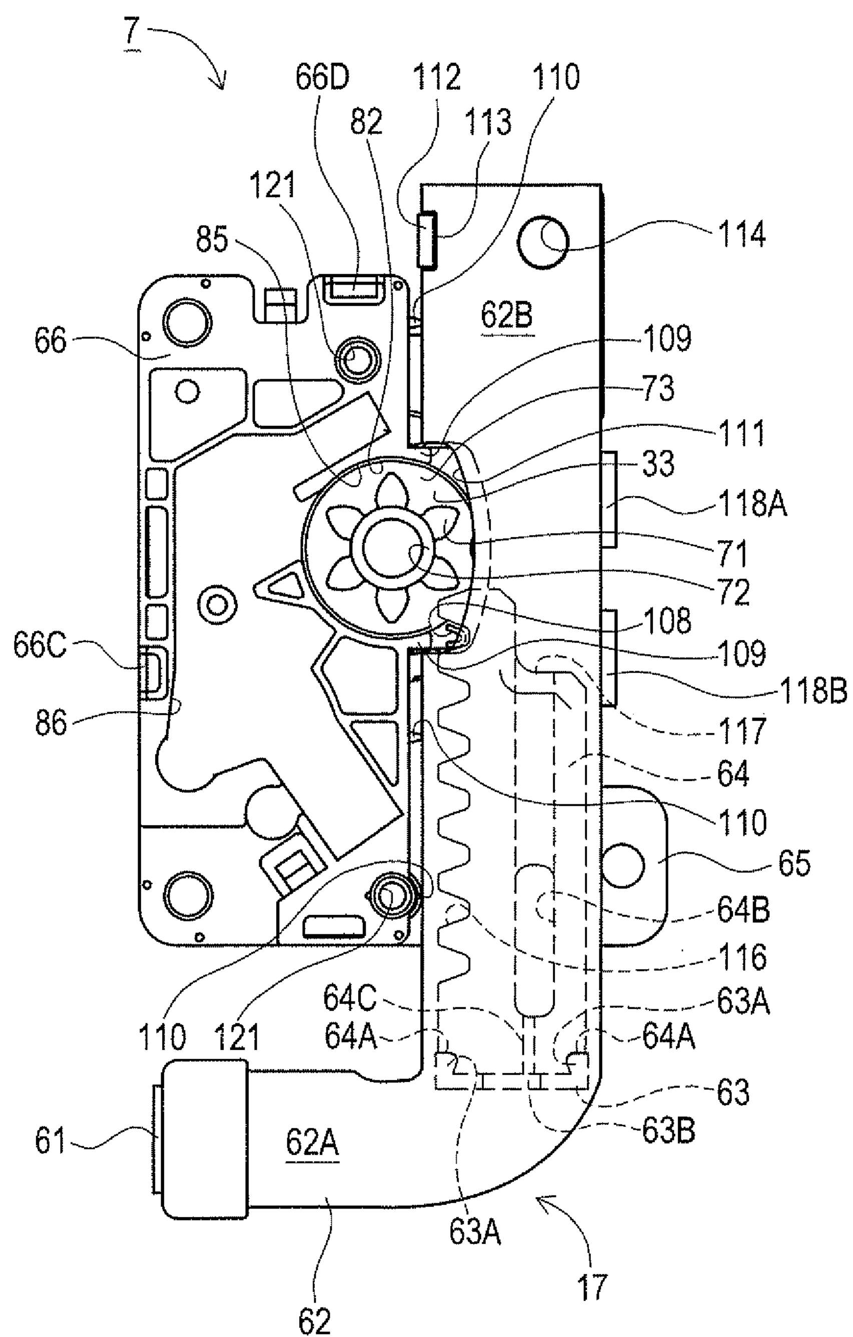
FIG. 7 is a partially-cut-out-mannered side view of the pretensioner unit.
Figure 8:
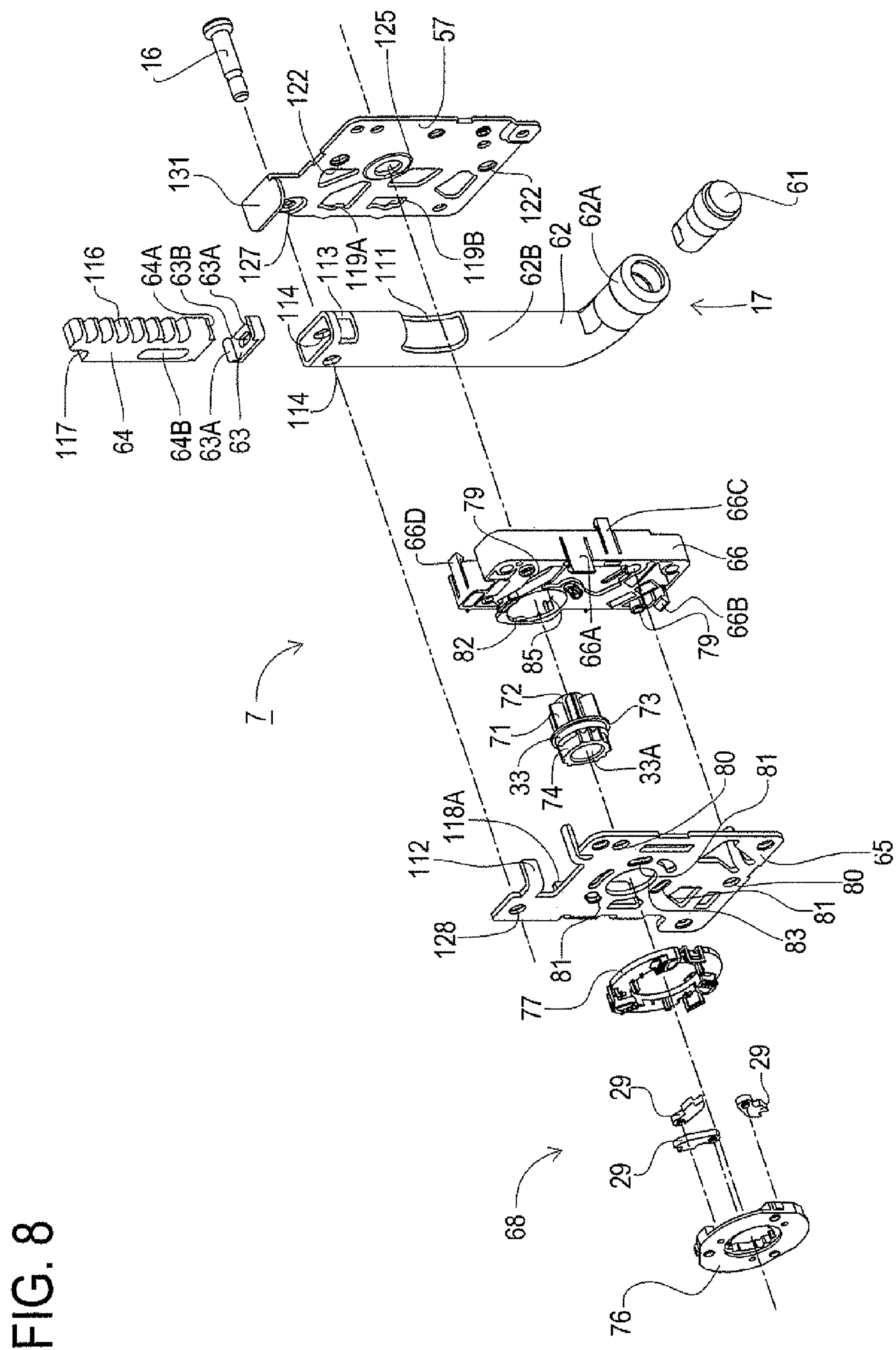
FIG. 8 is an exploded perspective view showing the pretensioner unit in FIG. 6 in a disassembled state.

FIG. 6 is a perspective view of the pretensioner unit 7 as seen from a housing unit 5 mounting side. FIG. 7 is a side view showing the pretensioner unit 7. FIG. 8 is an exploded perspective view showing the pretensioner unit 7 in FIG. 6 in a disassembled state.

As shown in FIG. 4 through FIG. 8, the pretensioner unit 7 is comprised of a pretensioner mechanism 17 which activates a gas generating member 61 in case of vehicle collision. This causes the take-up drum unit 6 to rotate in the retracting direction of the webbing 3 through the flange portion 27 of the take-up drum unit 6, by using the pressure of this gas.

Here, the pretensioner mechanism 17 consists of: a gas generating member 61; a pipe cylinder 62; a sealing plate 63 and a piston 64 which move inside the pipe cylinder 62 under the gas pressure from the gas generating member 61; a pinion gear body 33 which engages a rack formed in this piston 64 and rotates; a base plate 65 to which the pipe cylinder 62 is mounted; a base block body 66 of a substantially rectangular shape which is in contact with the base plate 65 and mounted on a side surface of the pipe cylinder 62 on the pinion gear body 33 side; and a clutch mechanism 68 provided on a back surface of the base plate 65.

The pinion gear body 33 is provided with a pinion gear portion 71 and has a substantially cylindrical shape on an outer peripheral portion thereof. The pinion gear body 33 is made of a steel material or the like and engages the rack formed in the piston 64. The pinion gear body 33 also has a cylinder-shaped support portion 72 formed so as to extend outwardly from an end portion thereof on the cover plate 57 side, in an axial direction of the pinion gear portion 71. The support portion 72 is formed to have substantially the same length as the thickness of the cover plate 57 with the root diameter of the pinion gear portion 71 as outer diameter.

A flange portion 73 extending in a radial direction is formed at an end portion of the pinion gear portion 71 on the base plate 65 side in the axial direction thereof. Further, on the pinion gear body 33, there is formed a boss portion 74 which has a shaft receiving portion 33A formed in a substantially cylindrical-shape in an outward direction from the flange portion 73. The shaft receiving portion 33A is adapted for inserting therein the drum shaft 22 of the take-up drum unit 6 and fitting thereon the bearing 32. Three sets of splines having the outer diameter of the bottom end portion of the boss portion 74 are formed on an outer peripheral surface of this boss portion 74 at an interval of roughly 120 degrees central angle.

The clutch mechanism 68 has a substantially annular-shaped pawl base 76 made of a steel material or the like, three clutch pawls 29 made of an aluminum material or the like, and a substantially annular-shaped pawl guide 77 which is made of a synthetic resin such as polyacetal resin or the like. The pawl guide 77 and the pawl base 76 are configured to hold the respective clutch pawls 29 therebetween as will be described later (refer to FIG. 15).

On an inner peripheral surface of the pawl base 76 there are formed three sets of spline grooves at an interval of roughly 120 degrees central angle. The spline grooves are press-fitted with the splines formed on the boss portion 74 of the pinion gear body 33. The pawl guide 77 is formed so that an inner peripheral diameter thereof is bigger than the spline grooves in the pawl base 76. Positioning projections 77A are provided at equal angles at three locations on concentrically the outer side face of the pawl guide 77.

The positioning projections 77A provided on the outer side face of the pawl guide 77 in the clutch mechanism 68 are engaged with the positioning holes 81 formed in the base plate 65, to set the clutch mechanism 68 to an outer surface of the base plate 65. Next, as shown in FIG. 8, the boss portion 74 of the pinion gear body 33 is inserted into the through hole 83 formed at substantially a central part of the base plate 65. Thereafter, the respective splines formed on the boss portion 74 are press-fitted and fixed in the respective spline grooves of the pawl base 76 constituting the clutch mechanism 68. As a result, the clutch mechanism 68 and the pinion gear body 33 are set and fixed to the base plate 65 and the pinion gear portion 71 of the pinion gear body 33 is positioned, at all times, in the position shown in FIG. 7.

The base block body 66 is made of a synthetic resin such as polyacetal resin or the like. The flange portion 73 of the pinion gear body 33 is inserted inside the through hole 82 formed on the bottom surface portion of the gear housing portion 85. This gear housing portion 85 is formed so as to be recessed in a substantially semicircle shape in plain view in an inward direction from a side edge portion inside the base block body 66 and also, is formed with a bottom surface thereof protruding outward. Positioning bosses 79 protruding at a side portion of the base block body 66 on the base plate 65 side are inserted into the positioning holes 80 formed in the base plate 65. The base block body 66 is thus set to an inner side surface of the base plate 65.

An elastic engagement piece 66A is formed so as to extend from an outer side surface of the base block body 66 to the base plate 65 side and enables elastic deformation thereof in an outward direction. An elastic engagement piece 66B is formed so as to extend from a lower-side side surface of the base block body 66 to the base plate 65 side and enables elastic deformation thereof in an outward direction. The elastic engaging pieces 66A and 66B latch with the respective side end portions of the base plate 65. As a result, the base block body 66 is set to the base plate 65. Further, at a center portion of the base block body 66, a convex portion 86 is formed so as to open at the side of the cover plate 57 for weight saving.

The through hole 83 formed at a substantially central portion of the base plate 65 has an internal diameter which can support an outer diameter of the bottom end portion of the boss portion 74 in the pinion gear body 33. The through hole 83 is also formed so as to rotatably support the pinion gear body 33 with one end portion thereof. The gear housing portion 85 is formed so that a height thereof is substantially the same as the sum of heights of the pinion gear portion 71 and the flange portion 73 in the pinion gear body 33.

Next, the configuration and mounting of the pipe cylinder 62 constituting the pretensioner mechanism 17 will be described based on FIG. 5 through FIG. 8.

As shown in FIG. 5 through FIG. 8, the pipe cylinder 62 is formed of a steel pipe material or the like in a substantially L shape. The pipe cylinder 62 has a housing portion 62A having a substantially cylindrical shape formed at one end thereof (lower-side bent portion in FIG. 7). The pipe cylinder 62 is configured to house the gas generating member 61. This gas generating member 61 includes explosive powder which is ignited in response to an ignition signal transmitted from a control portion not shown, generating gas as a result of gas generating agent combustion.

At the other end of the pipe cylinder 62 (top-side bent portion in FIG. 7), there are formed a piston housing portion 62B having a substantially rectangular shape in cross section and a notch portion 111 at a portion thereof facing the pinion gear body 33. When the pipe cylinder 62 is installed on the base plate 65, the pinion gear portion 71 of the pinion gear body 33 is fitted inside this notch portion 111. At a top end portion of the piston housing portion 62B, there is formed a notch portion 113 which is engaged with an arm portion 112 bent at a substantially right angle from the base plate 65 at the side surface portion of the base block body 66 and functions as a slip-off prevention means of the pipe cylinder 62 in a vertical direction. A pair of through holes 114 which are relatively opposite each other and allow insertion of a stopper screw 16 are formed at opposite side surface portions of the pipe cylinder 62 and sideways from the notch portion 113. This stopper screw 16 is used for mounting the pretensioner unit 7 to the housing unit 5 and functions as a bounce-out prevention means of the piston 64.

As seen in FIG. 7 and FIG. 8, the sealing plate 63 is made of a rubber material or the like and formed as a substantially rectangular-shaped plate so as to allow insertion thereof from an top end portion of the piston housing portion 62B. The sealing plate 63 has a pair of projecting portions 63A which extend upwards at opposite edge portions in a longitudinal direction thereof and protrude inwardly over the full width of their respective top end portions. A gas releasing hole 63B is formed at a central part in the sealing plate 63.

The piston 64 is made of a steel material or the like and has an overall lengthy shape, with a substantially rectangular shape in cross section, allowing for insertion thereof from the top end portion of the piston housing portion 62B. At a lower end portion of the piston 64, there are formed engagement grooves 64A wherein respective projecting portions 63A of the sealing plated 63 are fitted from sideways. On the lower end surface of the piston 64, there is formed a thin communicating hole 64C which extends from the lower end surface of the piston 64 to a through hole 64B formed in a side surface portion of the piston 64.

After the respective projecting portions 63A of the sealing plate 63 are slid from sideways into the engagement grooves 64A of the piston 64 for fitting therein, the sealing plate 63 is installed inside and is press-fitted to the back side thereof in a depth direction from the top end of the piston housing portion 62B. The gas releasing hole 63B formed in the sealing plate 63 communicates with the through hole 64B through the communicating hole 64C of the piston 64.

Thus, in this state, the sealing plate 63 is depressed by the pressure of the gas generated in the gas generating member 61 and the piston 64 is caused to move to the top end opening portion (top end portion in FIG. 7) of the piston housing portion 62B. When the webbing 3 is pulled out again after the activation of the pretensioner as will be described later, the piston 64 drops downward due to the reverse rotation of the pinion gear body 33. The gas inside the pipe cylinder 62 is thus released through the gas releasing hole 63B of the sealing plate 63, the communicating hole 64C and the through hole 64B of the piston 64 and the piston 64 is caused to drop smoothly.

On the side surface of the pinion gear body 33 side of the piston 64, there is formed a rack 116 which engages the pinion gear portion 71 of the pinion gear body 33. At a tip end portion of the rack 116 (top end portion in FIG. 7), there is formed a stepped portion 117 which can come in contact with the stopper screw 16. As shown in FIG. 7, in a normal state until the gas generating member 61 is activated, the piston 64 is positioned at the bottom of the piston housing portion 62B and the tip end of the rack 116 becomes disengaged from the pinion gear portion 71.

As shown in FIG. 7, the pipe cylinder 62 is installed on the base plate 65 in such a manner that the respective projecting portions 109 projecting outwardly from opposite edge portions of the gear housing portion 85 in the base block body 66 are being fitted inside the notch portion 111 of the thus configured piston housing portion 62B and the arm portion 112 of the base plate 65 is fitted inside the notch portion 113 formed in the top end portion of the piston housing portion 62B. A rack locking pin 108 having a substantially U-shape in cross section is erected in the base block body 66. The rack locking pin 108 is inserted in the gear groove at the top end of the rack 116 so as to restrain vertical movement of the piston 64. The tip end portion of the piston 64 is positioned in the vicinity of the pinion gear portion 71 of the pinion gear body 33, whereby the piston 64 is disengaged.

Thus, the opposite surfaces of the piston housing portion 62B in the pipe cylinder 62 are supported by ribs 110 and backrest portions 118A and 118B. The ribs 110 have a substantially triangular shape in cross section and are erected in a side surface of the base block body 66. The backrest portions 118A and 118B extend at a substantially right angle from portions on the side edge portions of the base plate 65 facing the pinion gear body 33. These backrest portions 118A and 118B extend slightly higher than the piston housing portion 62B and are formed so as to allow insertion thereof in the respective through holes 119A and 119B formed at side end portions of the cover plate 57 facing the backrest portions 118A and 118B.

The side edge portions of the through holes 119A and 119B facing the outside surfaces of the backrest portions 118A and 118B are recessed inwardly (leftward in FIG. 8) by a predetermined depth (for instance, approximately 1 mm deep). Thus, when the backrest portions 118A and 118B are inserted in the respective through holes 119A and 119B, the inner surface of the through holes 119A and 119B will reliably come in contact with the outside surface of the backrest portions 118A and 118B.

With the base block body 66, the pipe cylinder 62 etc., being installed on the base plate 65, the positioning bosses 121 of this base block body 66 projecting in a side surface portion of the cover plate 57 are engaged with the respective positioning holes 122 of the cover plate 57. As a result, the cover plate 57 is installed on the top side of the base block body 66 and the pipe cylinder 62 etc. Simultaneously, a cylindrical support portion 72 of the pinion gear body 33 is fitted in a support hole 125 formed at a substantially center part in the cover plate 57.

The backrest portions 118A and 118E which extend substantially at a right angle from the side edge portions of the base plate 65 are inserted in the respective through holes 119A and 119B formed at side edge portions of the cover plate 57 facing the backrest portions 118A and 118B. Elastic engagement piece 66C and elastic engagement piece 66D are latched in the respective side end portions of the cover plate 57. The elastic engagement piece 66C extends from an outer side surface of the base block body 66 to the cover plate 57 side and is formed so as to be elastically deformable outwardly. The elastic engagement piece 66D extends from the top side surface of the base block body 66 to the cover plate 57 side and is formed so as to be elastically deformable outwardly.

Thus, the cover plate 57 is set and fixed to the base block body 65 and the pipe cylinder 62 is mounted between the cover plate 57 and the base plate 65. The support portion 72 formed at the end portion of the pinion gear body 33 is rotatably supported by the support hole 125 in the cover plate 57. Accordingly, as shown in FIG. 4, the support portion 72 and the bottom end portion of the boss portion 74 formed at opposite ends portions of the pinion gear body 33 are rotatably supported by the through hole 83 formed in the base plate 65 and the support hole 125 formed in the cover plate 57.

There are coaxially arranged through holes 114 of the pipe cylinder 62, the through hole 127 of the cover plate 57 and the through hole 128 of the base plate 65 at so as to face one another at their respective corresponding positions. Thereby, the stopper screw 16 formed of a steel material or the like can be screwed into a screw hole 141B by inserting it from the cover plate 57 side towards the base plate 65 side (refer to FIG. 9).

Accordingly, the pipe cylinder 62 is held between the cover plate 57 and the base plate 65 and also opposite side surfaces thereof are held by the base block body 66 and the backrest portions 118A and 118B. The top end opening of the piston housing portion 62B in the pipe cylinder 62 is covered by a cover portion 131 which extends from the top end portion of the cover plate 57 at a substantially right angle therewith. The sealing plate 63 is depressed under the pressure of the gas generated by the gas generating member 61 and the piston 64 is caused to move toward the top end opening portion (top end in FIG. 7) of the piston housing portion 62B. In this case, the stepped portion 117 of the piston 64 comes in contact with the stopper screw 16 inserted in the through holes 114 so as to stop thereat.

[Schematic Configuration of Housing Unit]

A schematic configuration of the housing unit 5 will next be described based on FIG. 9 and FIG. 10.

Figure 9:
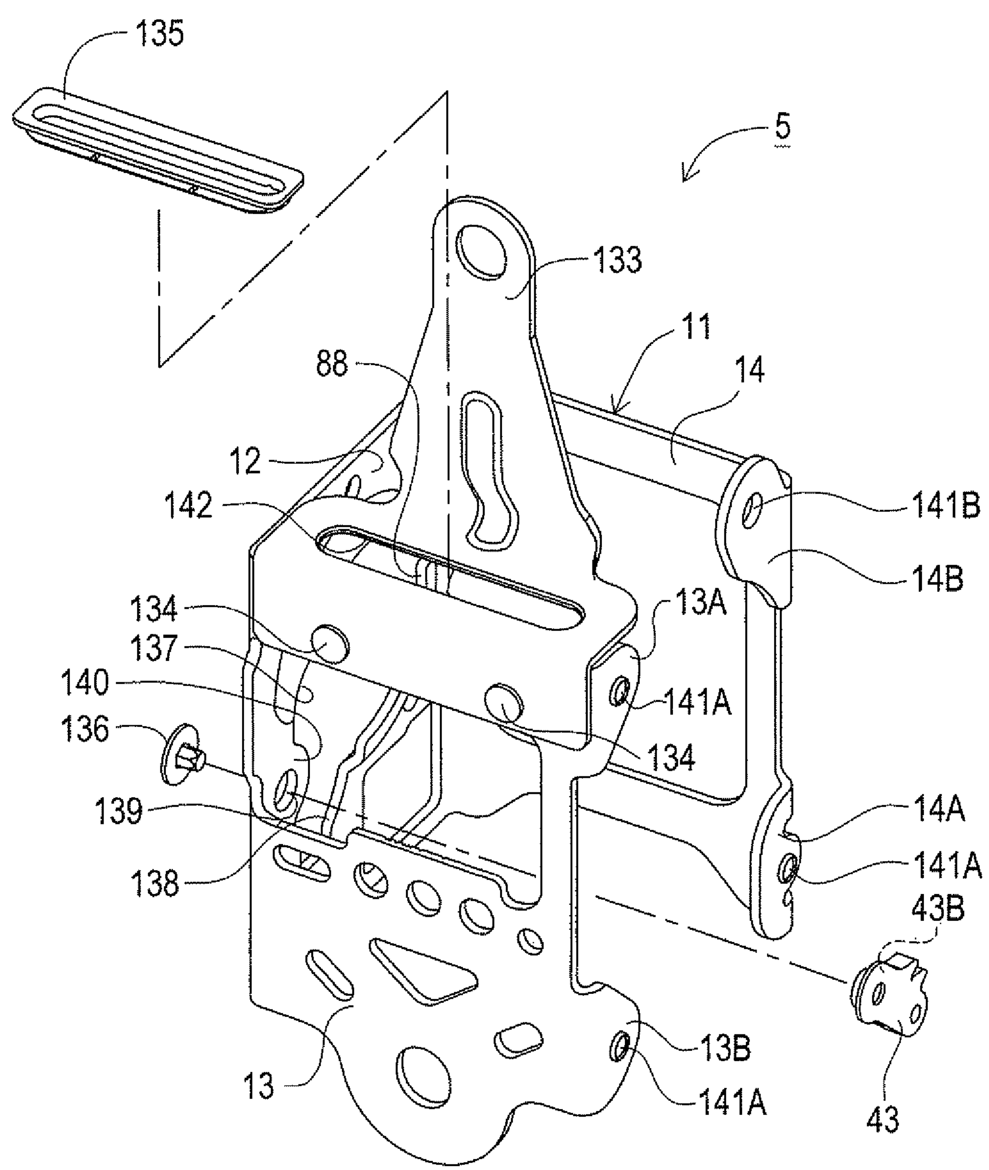
FIG. 9 is an exploded perspective view of a housing unit.

FIG. 9 is an exploded perspective view of the housing unit 5. FIG. 10 is a side view showing the seatbelt retractor 1 with the locking unit 9 removed therefrom.

Figure 10:
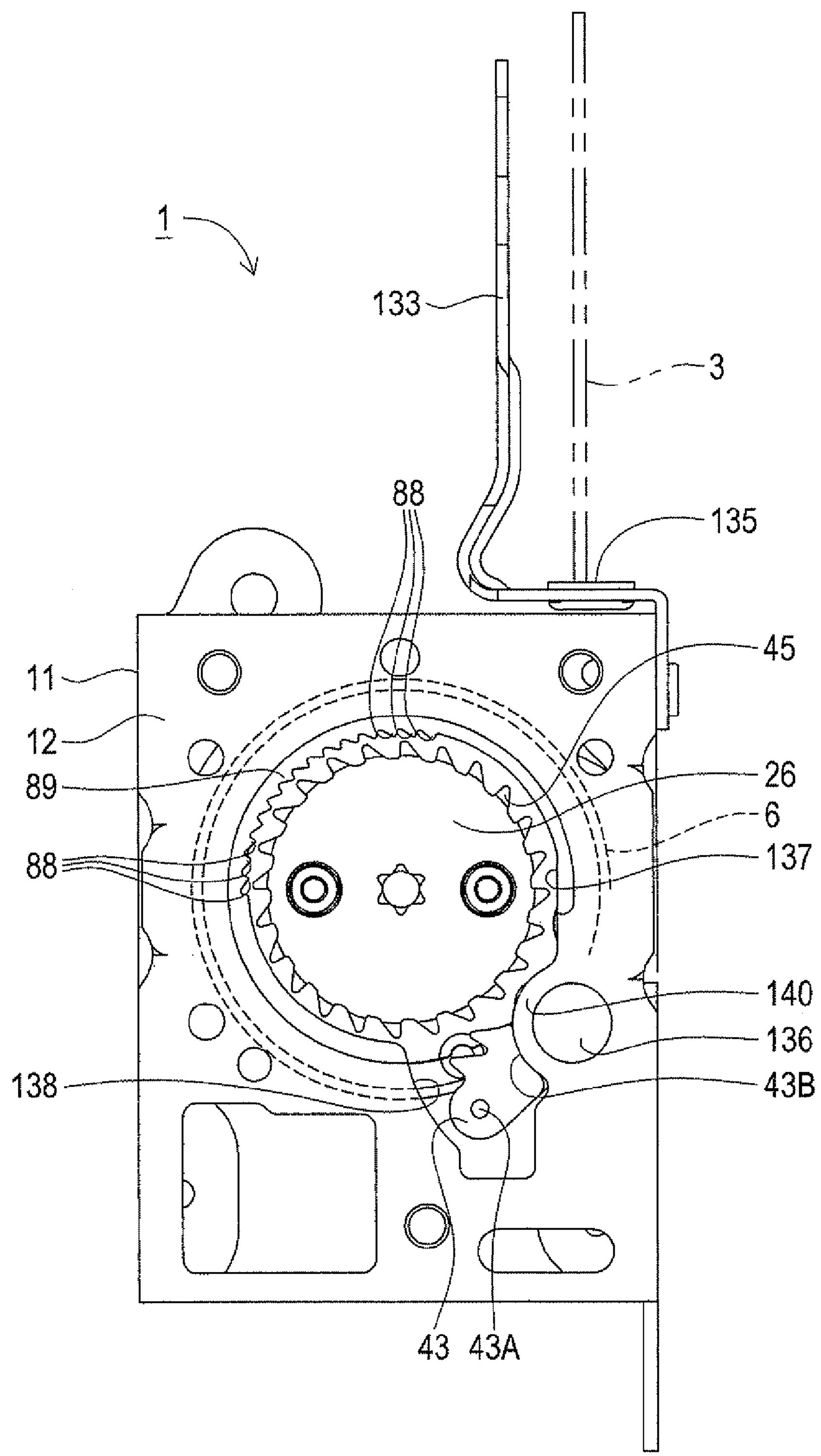
FIG. 10 is a side view showing the seatbelt retractor with the locking unit removed therefrom.

As shown in FIG. 9 and FIG. 10, the housing unit 5 is made of a housing 11, a bracket 133, a protector 135, a pawl 43 and a pawl rivet 136.

The housing 11 is made of a steel material or the like and is foiined to have a substantially U-shape in plain view. In a back-side side wall portion 12 of the housing 11, there is formed a through hole 137 allowing insertion of the ratchet gear portion 45 of the ratchet gear 26 on the take-up drum unit 6 so that a predetermined space (for instance, about 0.3 mm to 0.5 mm) is secured between the through hole 137 and the ratchet gear portion 26 when the ratchet gear 26 is inserted therein. The inner periphery portion of the through hole 137 is recessed at predetermined depth inwardly toward the take-up drum unit 6 so as to face the ratchet gear portion 45 of the ratchet gear 26 on the take-up drum unit 6.

On the inner periphery portion of the through hole 137 facing the ratchet gear portion 45 of the ratchet gear 26, there is formed an engagement gear portion 89 being comprised of inner teeth 88 and capable of getting engaged with the ratchet gear 26. The inner teeth 88 are formed so as to tilt in a direction where the take-up drum unit 6 rotates when taking up the webbing 3. Therefore, the inner teeth 88 are configured to get engaged with the ratchet gear portion 45 only when the ratchet gear 26 rotates in the webbing-pull-out direction.

The engagement gear portion 89 comprised of the inner teeth 88 is formed on a part of an inner periphery portion of the through hole 137 with approximately 90 degrees of central angle so that the inner teeth 88 start from a radial direction that is parallel with the webbing-pull-out direction (upward direction in FIG. 10) with reference to a rotation axis 48B of the shaft portion 48 erected on the ratchet gear 26, toward a direction where the take-up drum unit 6 is caused to rotate when the webbing 3 is pulled out.

Alternatively, the engagement gear portion 89 comprised of the inner teeth 88 may be formed on a part of an inner periphery portion of the through hole 137 with approximately 180 degrees of central angle so that the inner teeth 88 start from a radial direction that is orthogonal to the webbing-pull-out direction (upward direction in FIG. 10) with reference to a rotation axis 48B of the shaft portion 48 erected on the ratchet gear 26, toward a direction where the take-up drum unit 6 is caused to rotate when the webbing 3 is pulled out. Thereby, as will be described later, the ratchet gear portion 45 of the ratchet gear 26 can reliably get engaged with the inner teeth 88 when the pretensioner mechanism 17 activates.

Further, pitch of the inner teeth 88 at the engagement gear portion 89 formed on the inner periphery of the through hole 137 is made approximately half of pitch of the ratchet gear portion 45 of the ratchet gear 26. Still further, tooth depth of the inner teeth 88 is made smaller than that of the ratchet gear portion 45. Thereby, as will be described later, in a case where the ratchet gear portion 45 gets in contact with the inner teeth 88 in response to activation of the pretensioner mechanism 17 due to vehicle collision, the ratchet gear 26 gets engaged with each of the inner teeth 88 inclining by rotation angle in the webbing-pull-out direction that corresponds to angle of approximately half or shorter pitch of the ratchet gear portion 45.

A notch portion 138 is formed at an oblique lower side of the through hole 137 at a portion facing the pawl 43 so that the pawl 43 rotates smoothly. A through hole 139 is formed at the side of the notch portion 138 for mounting the pawl 43 in a rotatable fashion.

A semicircle-shaped guiding portion 140 is formed concentrically with the through hole 139 at a portion of the notch portion 138 which comes in contact with the pawl 43. The portion of the pawl 43 which comes in contact with and moves along the guiding portion 140 is formed to have approximately the same height as the thickness of the side wall portion 12. This portion has a stepped portion 43B which is recessed in a circular shape at a radius curvature which is the same as the side edge of the guiding portion 140. A guiding pin 43A is erected in a tip end portion of an outer side surface of the pawl 43. The guiding pin 43A is inserted in a guiding groove 202F of the clutch 202 constituting the locking unit 9 as will be described later.

Side plate portions 13 and 14 which are relatively opposite to each other extend from opposite edge portions of the side wall portion 12. Opening portions are respectively formed at a center part in the side plate portions 13 and 14 so as to reduce weight and improve efficiency of the webbing mounting operation. Screwed portions 13A, 13B, 14A and 14B are formed at the top and lower edge portions of the side plate portions 13 and 14, respectively. These screwed portions extend inwardly by a predetermined depth, substantially at a right angle with the respective plates. Screw holes 141A wherein the respective screws 15 are screwed are formed in the respective screwed portions 13A, 13B and 14A by burring. At the screwed portion 14B, a screw hole 141B wherein the stopper screw 16 is screwed is formed by burring.

A bracket 133 mounted to the top edge portion of the side plate portion 13 by the respective rivets 134 is made of a steel material or the like. A horizontally long through hole 142 is formed at a portion extending from the top edge portion of the side plate portion 13 in an inward direction at a substantially right angle therewith, for pulling out the webbing 3 therefrom. A horizontally long frame-like protector 135 made of a synthetic resin such as nylon or the like is fitted inside the through hole 142.

The stepped portion 43B of the pawl 43 made up of a steel material or the like is brought in contact with the guiding portion 140 and is rotatably fixed by the rivet 136 which is inserted in a rotatable fashion from the outside of the side wall portion 12 into the through hole 139. The side surface of the pawl 43 and the side surface of the ratchet gear 26 are positioned so as to be substantially coplanar with the outside surface of the side wall portion 12. The pawl 43 is disengaged with the ratchet gear 26 in normal operation.

[Configuration of Clutch Mechanism]

Next, there will be described on the configuration of the clutch mechanism 68 that constitutes the pretensioner mechanism 17 by referring to FIG. 11 through FIG. 16.

Figure 11:
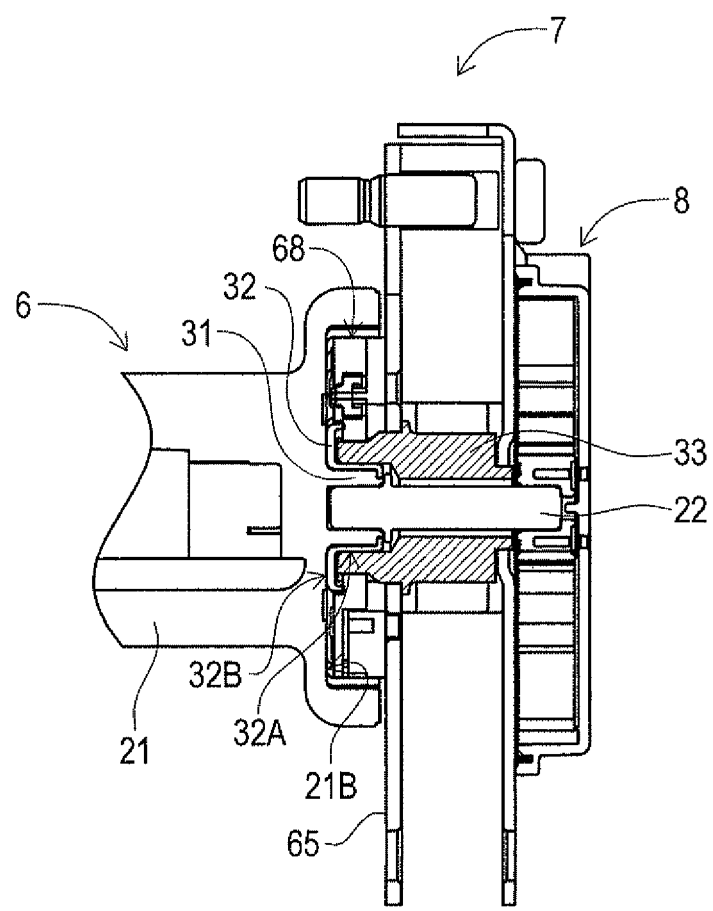
FIG. 11 is a partial sectional view showing a configuration wherein the take-up drum unit and the take-up spring unit are coupled with the pretensioner unit placed thereinbetween.

FIG. 11 is a partial cross-sectional view showing a configuration wherein the take-up drum unit 6 and the take-up spring unit 8 are coupled with the pretensioner unit 7 placed therebetween. FIG. 11 represents a view of the cross sectional diagram in FIG. 4 as seen from a back side.

As shown in FIG. 11, the guiding drum 21 is coupled coaxially with the take-up spring unit 8 through the drum shaft 22. The guiding drum 21 is always urged in a retracting direction of the webbing 3 by the take-up spring unit 8.

From the pretensioner unit 7, the ratchet mechanism 68 provided so as to protrude from the base plate 65 is stored inside the drum concave portion 21B in the guiding drum 21. A bearing 32 is provided in a freely sliding fashion between the guiding drum 21 and the pinion gear body 33. The bearing 32 has a cylindrical portion 32A which has a cylinder shape and a flanged end portion 32B provided at one end thereof and extending in the direction of the outer diameter. The bearing 32 is mounted in a freely rotating fashion between the guiding drum 21 and the pinion gear body 33.

More specifically, the inner surface of the cylindrical portion 32A and the lower surface of the flanged end portion 32B of the bearing 32 come in contact in a freely rotating fashion with the outside surface of the mounting boss 31 of the guiding drum 21 and the bottom surface of the drum concave portion 21B provided in the outside surface of the mounting boss 31. The outside surface of the cylindrical portion 32A and the top surface of the flanged end portion 32B of the bearing 32 come in contact with the inner surface and tip end portion of the pinion gear body 33 in a freely rotating fashion.

In the pretensioner unit 7, the pinion gear body 33 and the clutch mechanism 68 are in contact with the guiding drum 21 through the bearing 32 in a freely rotating fashion. As a result, the rotation of the guiding drum 21 responsive to the pull out and retracting operation of the webbing 3 is not restrained, in normal operation, by the pinion gear body 33 and the clutch mechanism 68 of the pretensioner unit 7.

Figure 12:
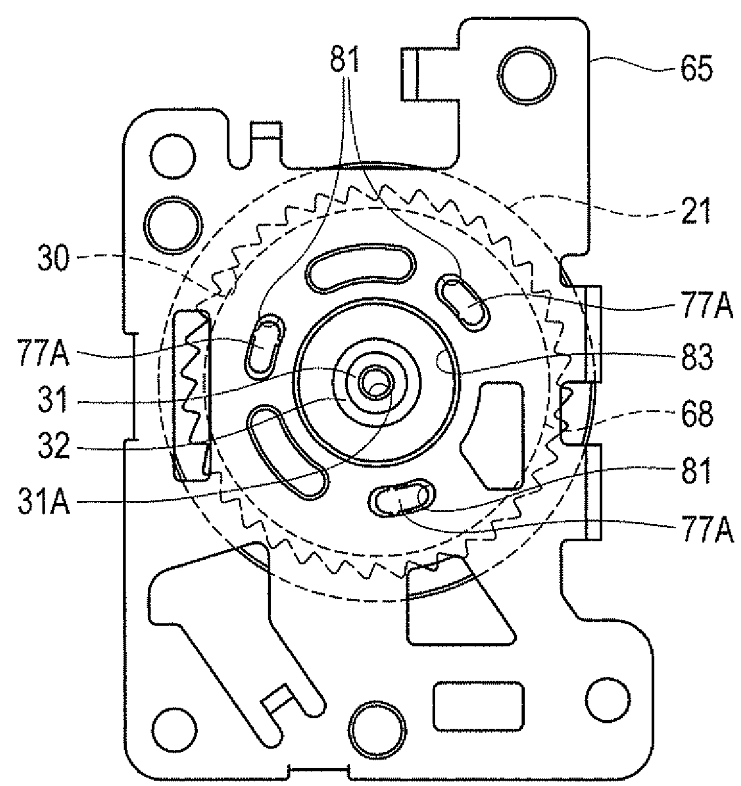
FIG. 12 is a plain view for describing a relationship between a guiding drum, a clutch mechanism and a base plate.
Figure 13:
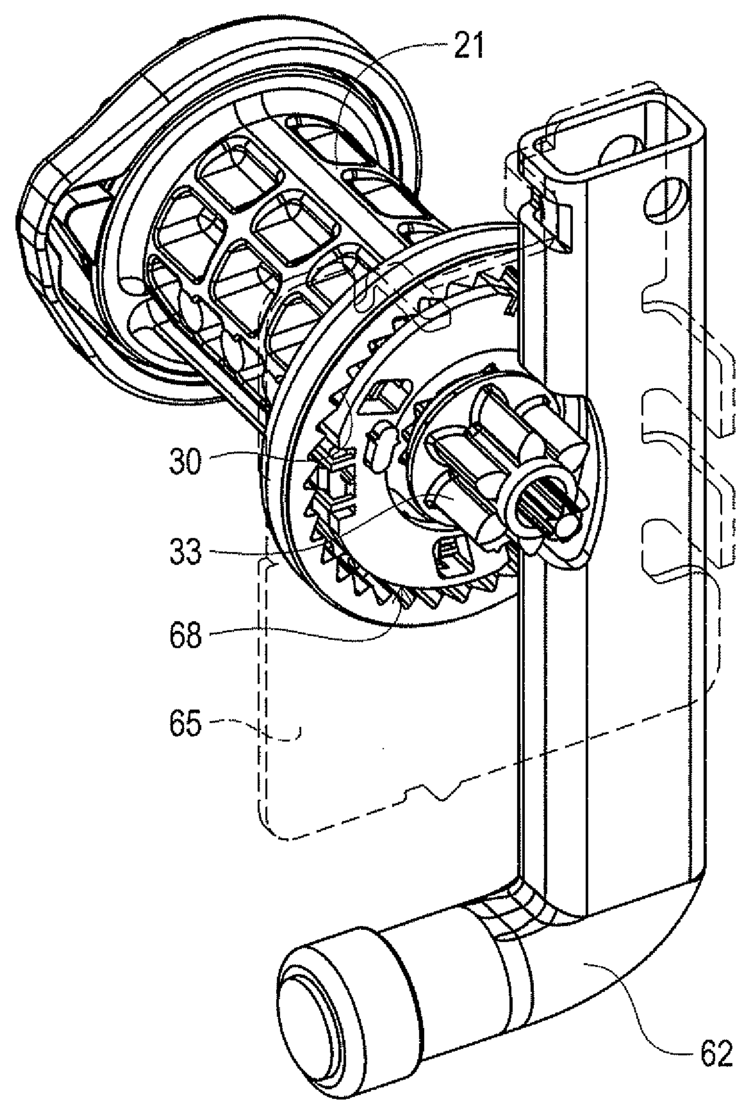
FIG. 13 is a perspective view for describing a relationship between a guiding drum, a clutch mechanism and a base plate.
Figure 14:
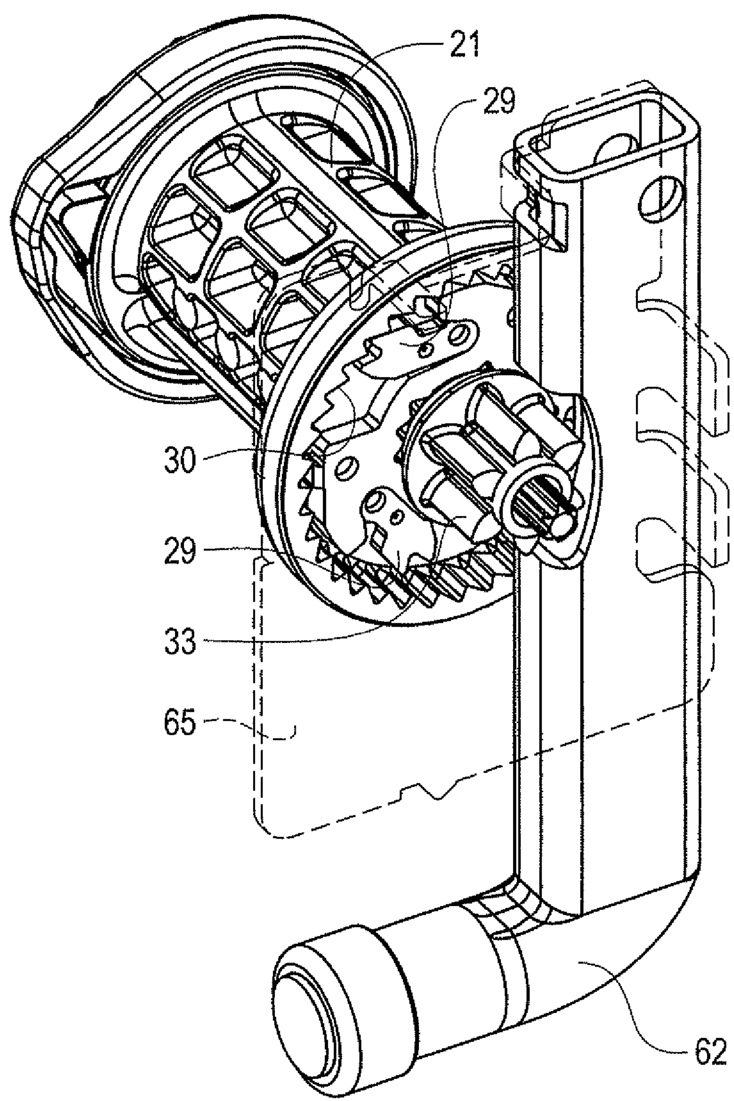
FIG. 14 is a perspective view for describing a relationship between a guiding drum, a clutch mechanism and a base plate.

FIG. 12 is a plain view of the seatbelt retractor 1 as seen from the take-up spring unit 8 side. FIG. 13 and FIG. 14 each are a perspective view for describing a relation between the guiding drum 21, the clutch mechanism 68 and the base plate 65. To describe the relationship between the guiding drum 21, the clutch mechanism 68 and the base plate 65, the constituting members of the pretensioner unit 7, excluding the clutch mechanism 68 and the base plate 65, the take-up spring unit 8 and the drum shaft 22 will be omitted. To show the relationship between these members, a part or all these members are shown in a see-through state (shown by a broken line), as necessary.

As shown in FIG. 12 through FIG. 14, the clutch mechanism 68 is mounted coaxially with the guiding drum 21. This is because the clutch mechanism 68 is coaxially coupled with the pinion gear body 33 through the through hole 83 of the base plate 65, and because the inner surface in the shaft receiving portion 33A of the pinion gear body 33 is positioned in a freely rotating fashion through the outer surface of the mounting boss 31 and the bearing 32.

The clutch gear 30 is engraved towards the shaft center on an inner peripheral edge portion constituting the drum concave portion 21B of the guiding drum 21. As will be described later, the clutch pawl 29 housed in the clutch mechanism 68 protrudes in a pretensioner-activated state. The protruding clutch pawl 29 engages the clutch gear 30 and the guiding drum 21 is caused to rotate in the retracting direction of the webbing 3.

At a face of the clutch mechanism 68 which comes in contact with the base plate 65, there is provided a positioning projection 77A which engages the positioning hole 81 formed in the base plate 65. As a result, the clutch mechanism 68 and the base plate 65 are fixed so that relative rotation thereof is disabled in normal operation.

As will be described later, the positioning projection 77A is formed in the pawl guide 77 constituting the clutch mechanism 68. At a normal operation and at an initial stage of a vehicle collision, the pawl guide 77 is fixed in the base plate 65 so that relative rotation thereof with respect to the base plate 65 is disabled.

When the piston 64 is depressed and driven in case of vehicle collision, the pinion gear body 33 is caused to rotate and the pawl base 76 will be relatively rotated with respect to the pawl guide 77. The clutch pawl 29 protrudes outwardly in response to this rotary motion. The driving force is maintained after the clutch pawl 29 protrudes, which means that this driving force is also applied to the pawl guide 77. Once the pawl guide 77 fails to resist this driving force, the positioning projection 77A will fracture. Thereafter, the clutch mechanism 68 becomes integral and the guiding drum 21 is caused to rotate, which in turn will result in a webbing 3 retracting operation.

[Configuration of Clutch Mechanism]

Figure 15:
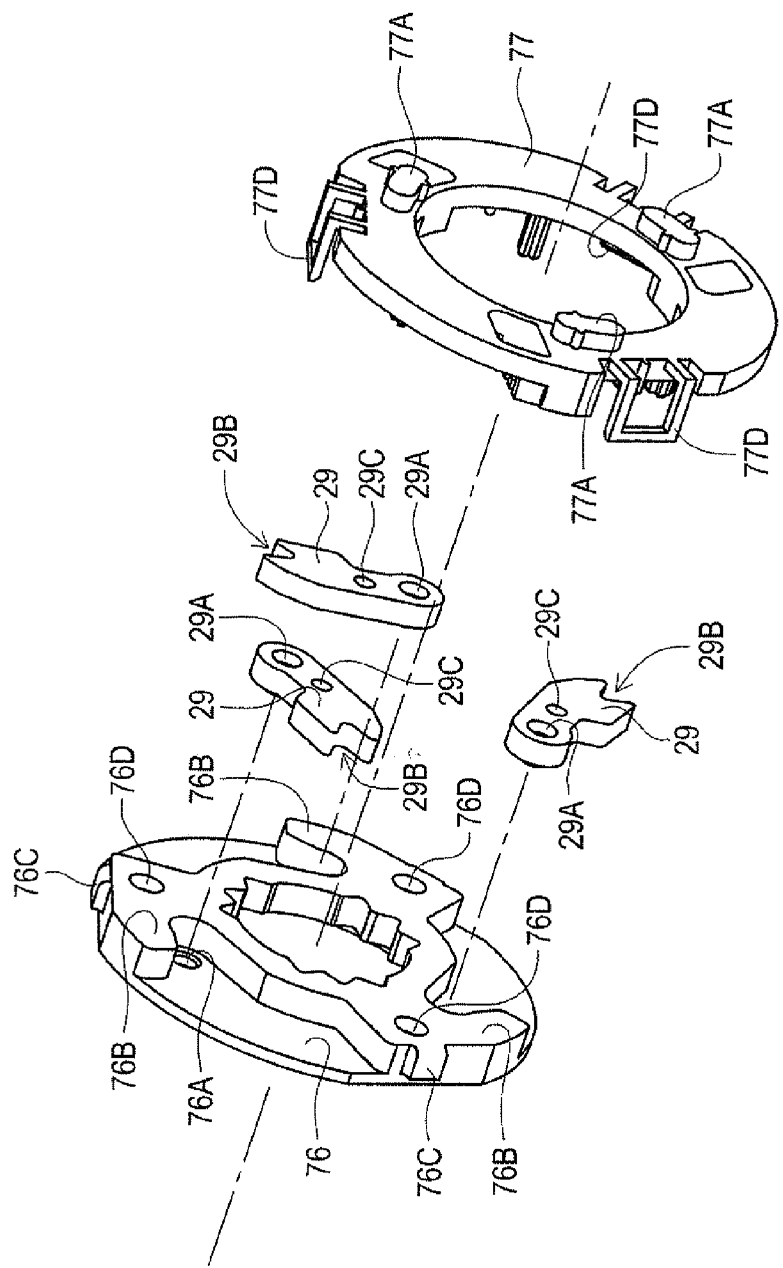
FIG. 15 is an exploded perspective view showing a configuration of the clutch mechanism.
Figure 16:
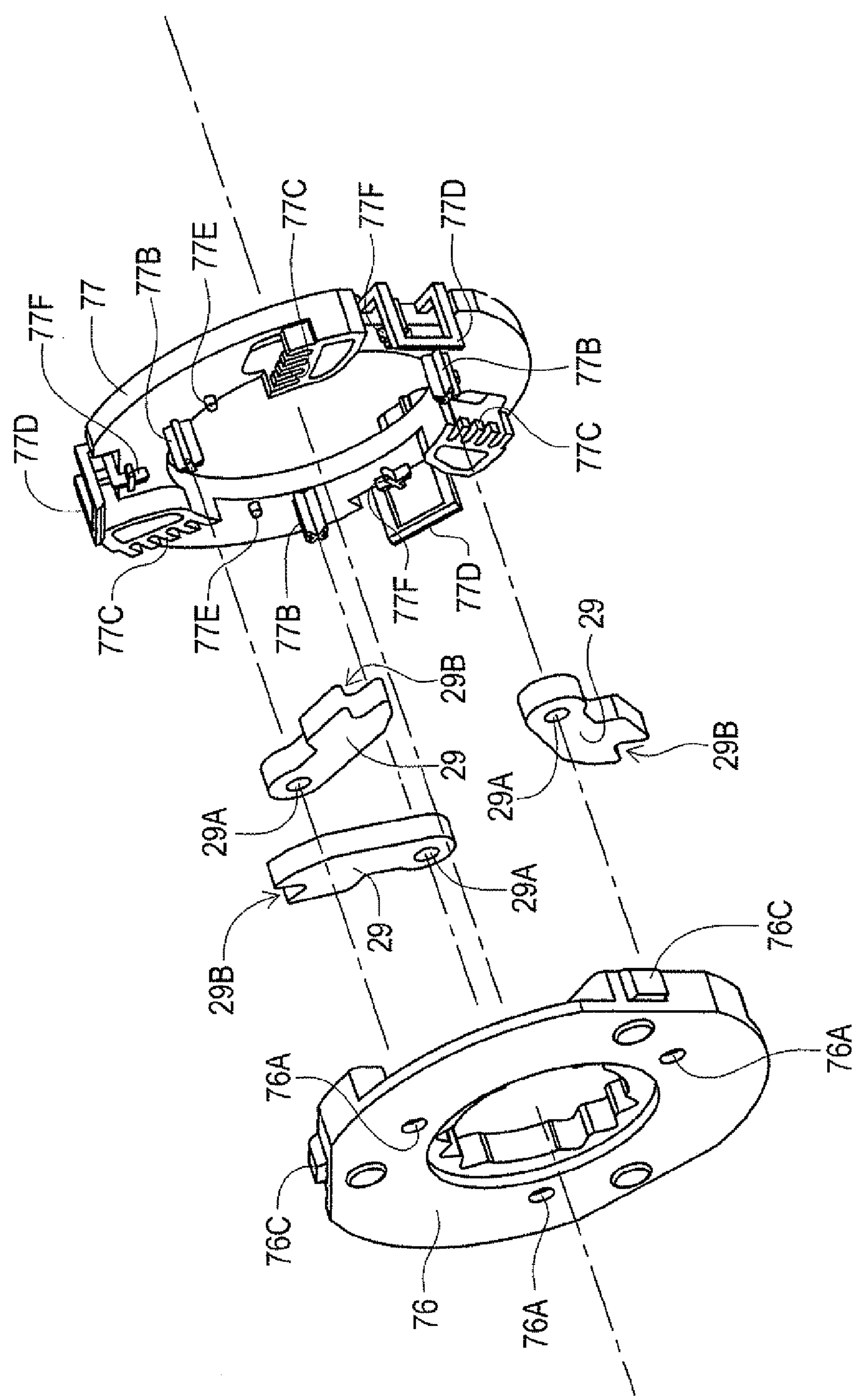
FIG. 16 is an exploded perspective view showing a configuration of the clutch mechanism.

FIG. 15 and FIG. 16 are exploded perspective view showing the configuration of the clutch mechanism 68. FIG. 15 is an exploded perspective view as seen from the take-up spring unit 8 side. FIG. 16 is an exploded perspective view as seen from the take-up drum unit 6 side.

As shown in FIG. 15 and FIG. 16, the clutch mechanism 68 is comprised of the pawl base 76, clutch pawls 29 and the pawl guide 77.

A through hole 29A is opened in the bottom end portion of each clutch pawl 29, and will be press-fitted in a cross-bars projection 77B erected in the pawl guide 77. The cross-bars projection 7713 is formed so that one bar of the cross-bars is longer than the diameter of the through hole 29A of the clutch pawl 29. This will help restrain the rotation of the clutch pawl 29 in a press-fitted state. In each clutch pawl 29, the side of the through hole 29A which faces the pawl guide 77 is subjected to a chamfering process. Also, in place of the chamfering process of the through hole 29A or together with this chamfering process, the cross-bars projection 77B may be formed so that one bar of the cross-bars are shorter at the tip end portions thereof, or alternatively, the tip end portions are formed thinner as compared to the other portions. As a result, the press-fitting operation can be carried out smoothly.

A concave portion 29C is provided at an intermediate position between the through hole 29A and the engagement tooth 29B in each clutch pawl 29 and a projection 77E is erected at a corresponding position in the pawl guide 77. The projection 77E and the concave portion 29C are engaged, with the clutch pawl 29 being press-fitted to the cross-bars projection 77B. The arrangement position of the concave portion 29C and the projection 77E has the effect of determining the rotating position of each clutch pawl 29 which is press-fitted in the cross-bars projection 77B. This configuration is for positioning each clutch pawl 29 press-fitted in the cross-bars projection 77B at a storing position. Due to the engagement between the concave portion 29C and the projection 77E and the through hole 29A being press-fitted in the cross-bars projection 77B, each clutch pawl 29 is prevented from rotating from the storing position in normal operation and the engagement tooth 29B is prevented from protruding outside.

Each guiding portion 77C is provided close to the inner side of each clutch pawl 29 on the pawl guide 77. At an initial stage when the pretensioner unit 7 is activated, rotation of the pawl guide 77 is disabled. This is because the positioning projections 77A are engaged with the base plate 65. In this state, the pawl base 76 rotates. In response to this rotation, the clutch pawls 29 depressed by the pawl support block 76B move in a rotating direction, while fracturing the cross-bars projections 77B and the projections 77E. The side faces on the inner side of the moved clutch pawls 29 are depressed against the guiding portions 77C. As the pawl base 76 rotates ever further, the clutch pawls 29 are depressed in the pawl support blocks 76B and the guiding portions 77C. As a result, the clutch pawls 29 are slidably guided outwardly along the guiding portion 77C and protrude from the pawl base 76 outwardly.

Through holes 76A are provided in the pawl base 76. Here, the projecting amount of the cross-bars projections 77B is formed to be longer than the thickness of the clutch pawls 29. Once the clutch pawls 29 are press-fitted in the cross-bars projections 77B, the tip end portion of the cross-bars projections 77B will protrude from an opposite side of the through holes 29A of the clutch pawls 29. When the pawl guides 77 and the pawl base 76 are coupled, the portions of the cross-bars projections 77B which protrudes from the clutch pawls 29 engage the through holes 76A.

The pawl supporting blocks 76B of enough thickness are provided so as to surround the insertion holes 76A at an outer diameter side of the pawl base 76. The pawl supporting blocks 768 are provided so as to receive the load which is in turn received by the clutch pawls 29 when the clutch pawls 29 depress and drive the guiding drum 21.

The clutch pawls 29 each have an engagement tooth 29B provided at a tip end portion thereof to engage with the clutch gear 30. In the present embodiment, three clutch pawls 29 are provided. When the guiding drum 21 is depressed and driven for activation of the pretensioner, the load for driving the guiding drum 21 is dispersed, which makes it possible to achieve efficient pressure capabilities and load bearing capabilities.

In the pawl base 76, the engaging blocks 76C are formed at an outer diameter end of the pawl supporting blocks 76B. The concave portions 76D are opened close to the engagement blocks 76C, at one corner of the pawl supporting blocks 76B. In the pawl guide 77, there are formed locking hooks 77D which engage the locking blocks 76C, and cross-bars projections 77F which engage the concave portions 76D, when the pawl guide 77 engages the pawl base 76.

Here, engagement between the locking blocks 76C and the locking hooks 77D is preferably so that the pawl base 76 is relatively rotatable with respect to the pawl guide 77 at an initial stage in the rotation of the pinion gear body 33. At an initial stage of this rotation, the pawl base 76 rotates with the pawl guide 77 kept in a rotation-disabled state and the clutch pawls 29 is caused to protrude. The cross-bars projections 77F which engage the concave portions 76D fracture in response to rotation of the pawl base 76.

Here, the pawl base 76 and the clutch pawls 29 are made of metallic members, and the pawl guide 77 is made of a resin member. Thereby, there can be easily and reliably carried out operations such as: projecting operation of the clutch pawls 29; integral rotating operation of the pawl guide 77 and the pawl base 76 that follows projecting operation of the clutch pawls 29; or reverse-rotation restricting operation with respect to the pawl base 76.

[Energy Absorption Mechanism]

There is assumed a case that pull-out force exceeding a prescribed value thereof works on the webbing 3 after the ratchet gear 26 of the take-up drum unit 6 gets engaged with the inner teeth 88 at the engagement gear portion 89 mounted on the side wall portion 12 of the housing 11 in response to activation of the pretensioner mechanism 17, namely, after forced locking works on the take-up drum unit 6 so as to prevent the take-up drum 6 from rotating in the webbing-pull-out direction. Providing for such a case, the wire 24, the torsion bar 23, etc., are provided with the take-up drum unit 6 as an energy absorption mechanism that absorbs impact energy which occurs at a vehicle occupant by controlling to pull out the webbing 3 under predetermined valued load.

Based on FIG. 17 through FIG. 21, there will be described on the mounting mechanism of the torsion bar 23 and that of wire 24 which is mounted between the guiding drum 21 and the wire plate 25.

Figure 17:
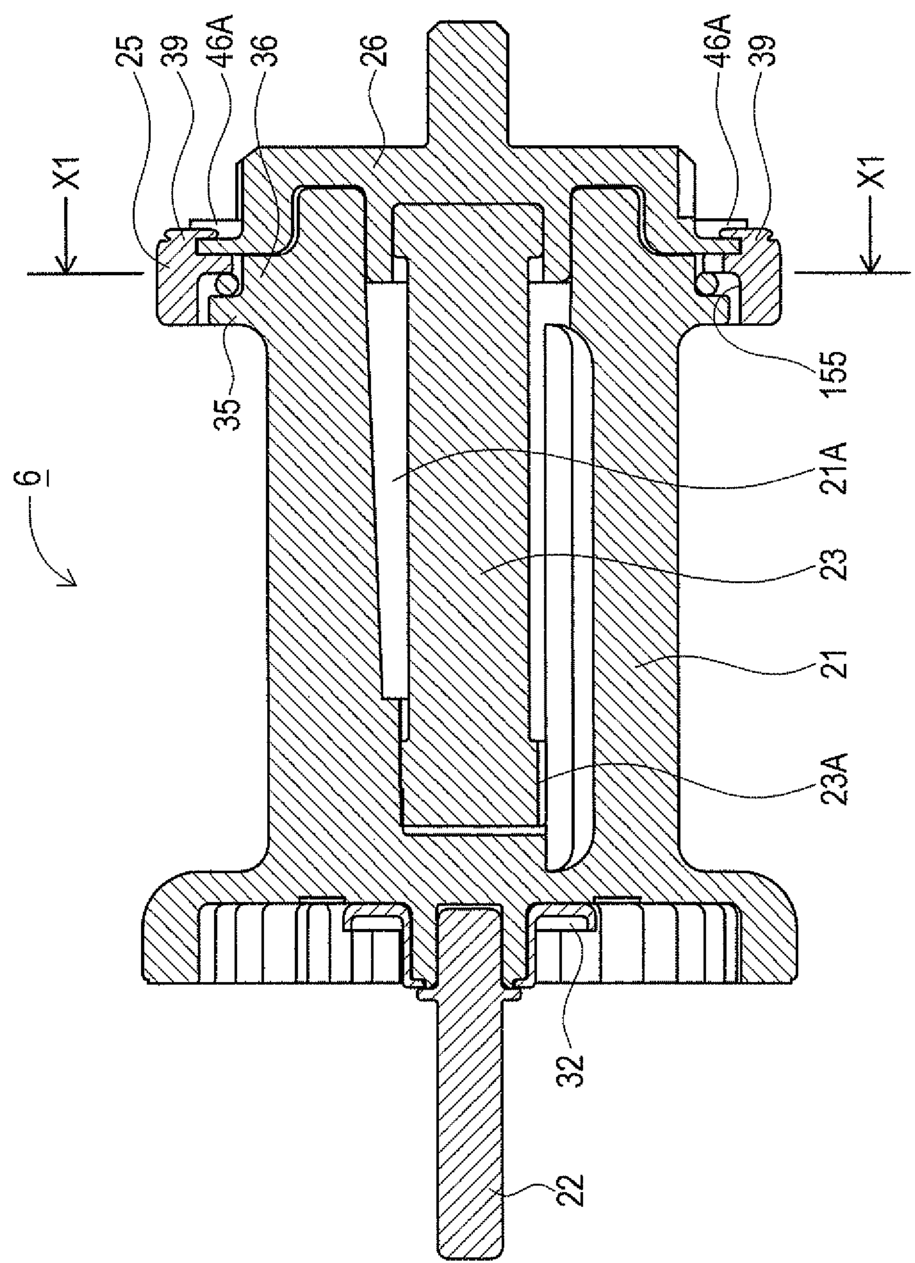
FIG. 17 is a cross sectional view including a shaft center and rivet pins of the take-up drum unit.
Figure 19:
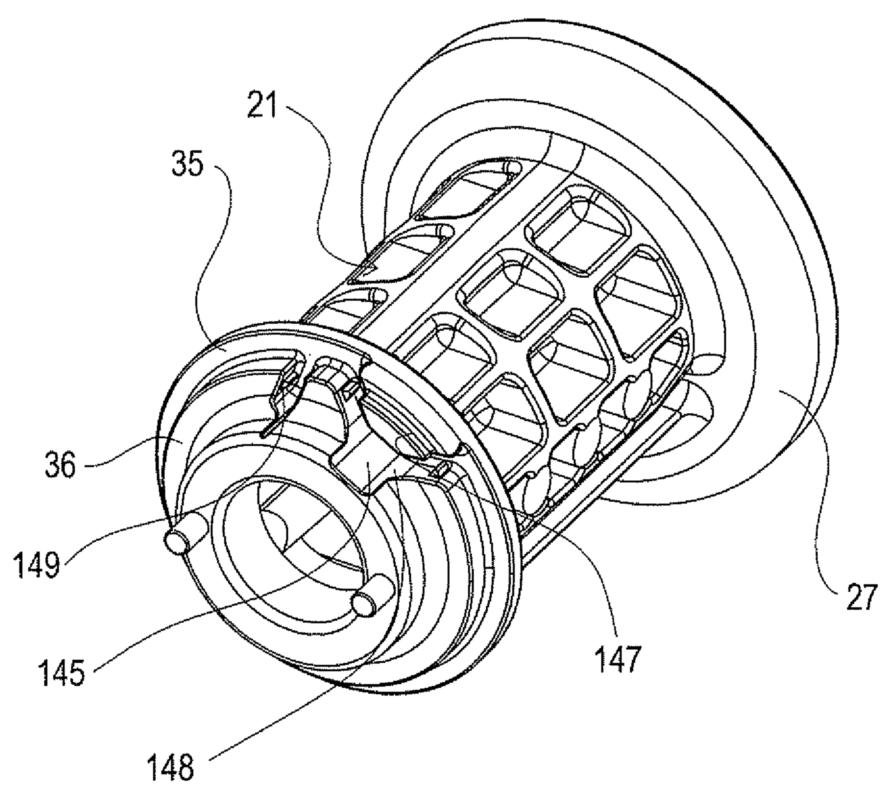
FIG. 19 is a perspective view of a drum guide as seen from a wire plate mounting side thereof.
Figure 20:
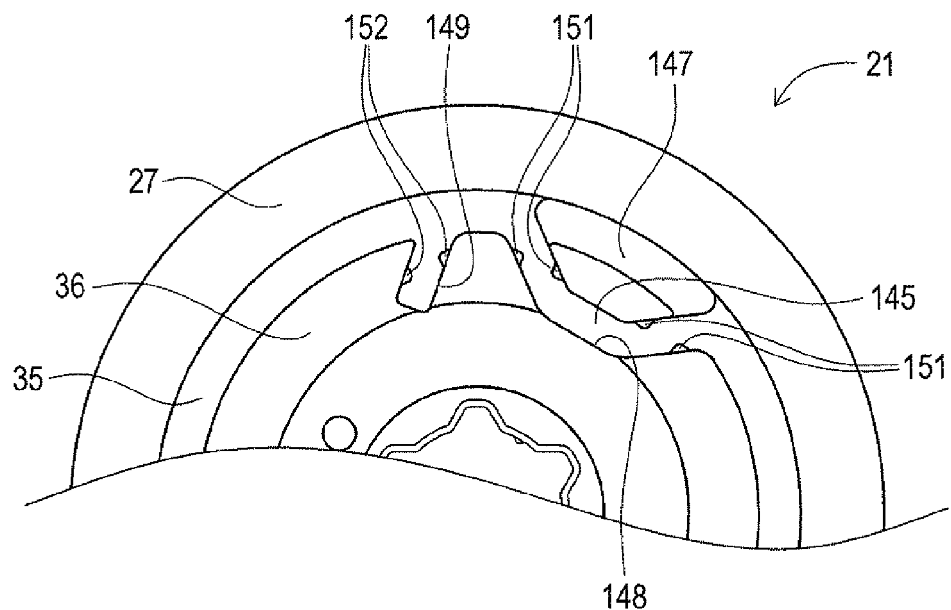
FIG. 20 is a partially enlarged view showing a crooked path formed in a stepped portion of the drum guide.
Figure 21:
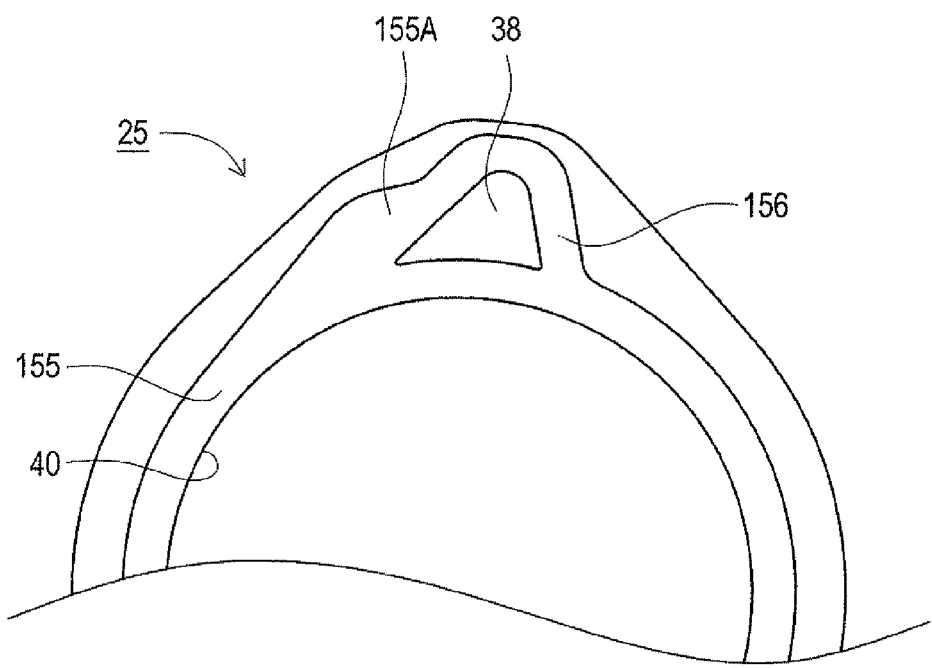
FIG. 21 is a partially enlarged view showing the crooked path of the wire plate.

FIG. 17 is a cross sectional view including the shaft center and the rivet pins 39 of the take-up drum unit 6. FIG. 18 is a cross sectional view taken along arrow X1-X1 in FIG. 17. FIG. 19 is a perspective view of the drum guide 21 as seen from a mounting side of the wire plate 25. FIG. 20 is a partially enlarged view showing a crooked path formed in the stepped portion 36 of the drum guide 21. FIG. 21 is a partially enlarged view showing a crooked path of the wire plate 25.

Figure 18:
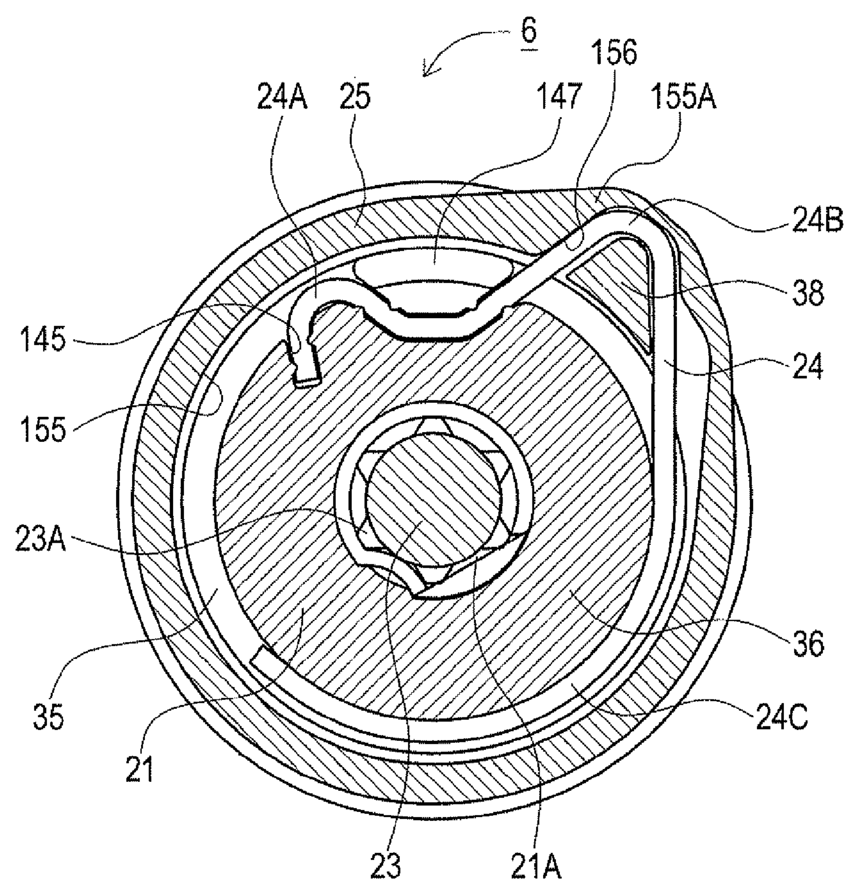
FIG. 18 is a cross sectional view taken along arrow X1-X1 in FIG. 17.

As shown in FIG. 17 and FIG. 18, the drum shaft 22 is fixed by press-fitting to a center position in an end portion, on the pretensioner unit 7 side, of the guiding drum 21 constituting the take-up drum unit 6. The bearing 32 is fitted to a bottom end portion of the drum shaft 22. The spline 23A of the torsion bar 23 is press-fitted for mounting to the back side of the shaft hole 21A of the guiding drum 21 so as to disable relative rotation thereof with respect to the shaft hole 21A.

As shown in FIG. 18, at the outer periphery of the stepped portion 36 which has a substantially circular shape when seen in front view and is formed in an outer surface of the flange portion 35 in the guiding drum 21, there is formed the crooked path 145 having a crooked portion 24A wherein one end of the wire 24 is fitted and held is integrally formed.

As shown in FIG. 19, the crooked path 145 is formed of a convex portion 147; a concave portion 148; a groove portion 149; and an outer surface between the concave portion 148 of the stepped portion 36 and the groove portion 149. The convex portion 147 is formed in a substantially trapezoidal shape oriented downward as seen from a front view and protrudes from the outer surface in an axial direction of the flange portion 35. The concave portion 148 faces the convex portion 147 formed at the outer periphery of the stepped portion 36. The groove portion 149 is formed in an inward direction from and on a slant with the outer peripheral surface of the stepped portion 36 which is slightly away from the left end (left end in FIG. 20) of the concave portion 148 as seen from a front view.

As shown in FIG. 20, two sets of opposite ribs 151 are provided in opposite faces of the convex portion 147 and the concave portion 148 along a depth direction of the crooked path 145. Also, one set of ribs 152 are formed in opposite faces of the groove portion 149 along the depth direction of the crooked path 145. The distance between the opposing ribs 151 and 152 is smaller than the outer diameter of the wire 24.

As shown in FIG. 18, the crooked portion 24A at one end portion of the wire 24 is fitted in the crooked path 145 while squeezing the respective ribs 151 and 152, whereby the crooked portion 24A is fixed and held thereat. The crooked portion 24B has a substantially V-shape when viewed from a front view and is formed so as to be continuous with the crooked portion 24A of the wire 24. The crooked portion 24B is formed so as to protrude further out than the outer periphery of the flange portion 35. The crooked portion 24C which is continuous with the crooked portion 24B of the wire 24 is formed in a circular arcuate shape along the outer peripheral surface of the stepped portion 36.

As shown in FIG. 5, FIG. 17, FIG. 18 and FIG. 21, there is formed a housing concave portion 155 for housing the wire 24, the flange portion 35 and the convex portion 147. This housing concave portion 155 is formed in the state the inner periphery of the through hole 40 in the wire plate 25 is substantially opposite the outer peripheral portion of the stepped portion 36, and comes in contact with the wire 24 at the peripheral edge portion of this through hole 40. The housing concave portion 155 is formed so that the diameter of an inner peripheral face which covers the outer peripheral portion of the flange portion 35 becomes substantially the same as the outer diameter of the flange portion 35.

At a portion of the housing concave portion 155 facing the crooked portion 24B of the wire 24, there is formed a bulging portion 155A which bulges outside in the direction of the diameter for housing the crooked portion 24B. At an inner surface of the bulging portion 155A, there is integrally formed a convex portion 38 which has a substantially angled shape as seen from a front view and is inserted inside the crooked portion 24B of the wire 24, whereby a crooked portion 156 is thus formed wherein the wire 24 is guided in a slidable fashion. An end portion of the convex portion 38 at an inner side in a radial direction of the wire plate 25 is formed in a circular arcuate shape along an outer peripheral surface of the stepped portion 36.

Accordingly, as shown in FIG. 18, to mount the wire 24 to the guiding drum 21, the spline 23A of the torsion bar 23 is press-fitted and fixed to the back side in a depth direction of the shaft hole 21A in the guiding drum 21. The crooked portion 24A of the wire 24 is tucked in the crooked path 145 formed in the stepped portion 36, and arranged along the outer peripheral surface of the stepped portion 36. Then, the convex portion 38 of the wire plate 25 is inserted inside the crooked portion 24B of the wire 24 and the crooked portion 24B of the wire 24 is inserted inside the crooked path 156. Also, the peripheral edge portion of the through hole 40 is brought in contact with the wire 24, so that the wire 24, the stepped portion 36 and the convex portion 147 are housed inside the housing concave portion 155.

Thereafter, as was described earlier, the spline 23B formed at the other end of the torsion bar 23 is fitted inside the mounting boss 49 of the ratchet gear 26 and the respective ejector pins 37 of the guiding drum 21 which have been inserted in the respective through holes 47 are riveted. As a result, the ratchet gear 26 and the wire plate 25 are fixed to the guiding drum 21 through the respective ejector pins 37 so that relative rotation thereof with respect to the guiding drum 21 is disabled. The ratchet gear 26 and the wire plate 25 are fixed to the torsion bar 23 so that relative rotation thereof with the torsion bar is disabled, by riveting the respective rivet pins 39 of the wire plate 25.

[Emergency Locking Mechanism]

In addition to the forced locking mechanism which forcedly locks and prevents the take-up drum unit 6 from rotating in the webbing-pull-out direction when the pretensioner mechanism 17 activates in response to vehicle collision, the seatbelt retractor 1 according to the present embodiment has two types of locking mechanisms both locking rotation of the take-up drum unit 6 upon activation of the locking unit 9. These two types include a webbing-sensitive locking system which is activated in response to sudden pull out of the webbing, and a vehicle-body-sensitive locking system which is activated in response to acceleration caused by vehicle rocking or tilting. Hereinafter, for clear distinction with the forced locking mechanism, these two types of locking mechanisms will be designated as emergency locking mechanisms in the following description.

[Schematic Configuration of Emergency Locking Mechanism]

Figure 22:
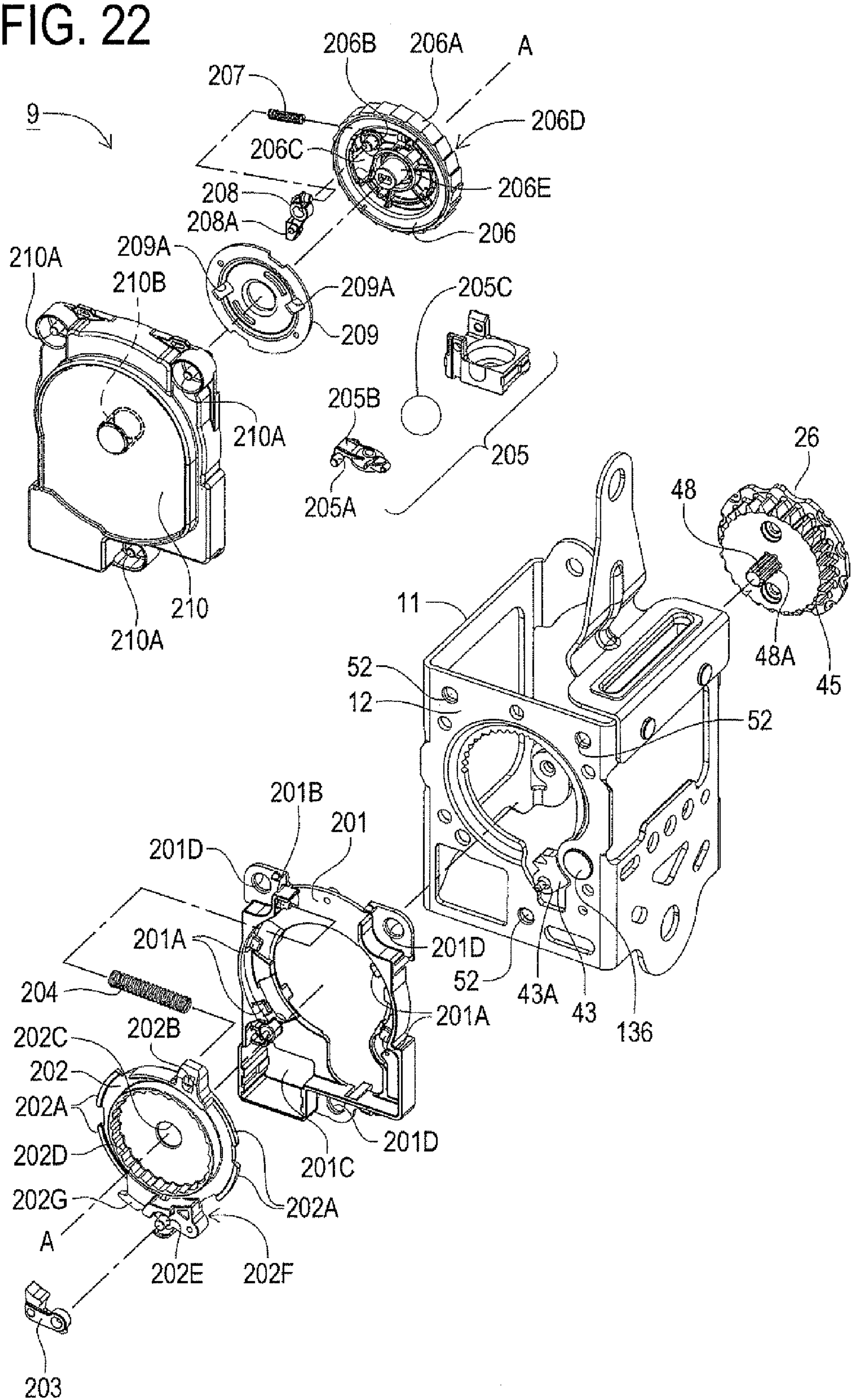
FIG. 22 is an exploded perspective view of the locking unit.

There will be described on the schematic configuration of the locking unit 9 which constitutes the emergency locking mechanism by referring to FIG. 4 and FIG. 22. FIG. 22 is an exploded perspective view showing the configuration of the locking unit 9 representing the emergency locking mechanism. Also, FIG. 4 shows the cross sectional view thereof.

As shown in FIG. 22 and FIG. 4, the locking unit 9 carries out the operation of the webbing-sensitive locking mechanism and the vehicle-body-sensitive locking mechanism. The locking unit 9 is made of a mechanism block 201, a clutch 202, a pilot aim 203, a return spring 204, a vehicle sensor 205, a locking gear 206, a sensor spring 207, a locking arm 208, an inertia mass 209 and a mechanism cover 210.

Ribs 202A are provided at an outer peripheral edge of the clutch 202 which has substantially a disk-like shape. The clutch 202 is mounted to the mechanism block 201 in a rotatable fashion by engagement with the engagement portions 201A of the mechanism block 201. The return spring 204 is held between the projective holding portions 201B and 202B of the mechanism block 201 and the clutch 202 which oppose each other at top end portions of the locking unit 9. Thus, the clutch 202 is urged to a predetermined position.

The mechanism block 201 has an opening formed at a center part thereof. The opening has a substantially inverted guitar-like shape. The opening portion with the larger diameter is larger than the diameter of the ratchet gear 26, and is smaller than the diameter of the clutch 202. As a result, in the larger diameter opening portion, the back surface of the clutch 202 and the ratchet gear 26 are arranged close to each other and so as to face each other. The connecting portion between the smaller diameter opening portion and the larger diameter opening portion forms a movable region of the pawl 43. A pawl 43 which is rotatably supported on a shaft by the pawl rivet 136 is installed in the housing 11. The pawl 43 engages the ratchet gear portion 45 of the ratchet gear 26 in response to rotation of the pawl 43 towards the larger diameter opening portion.

In the mechanism block 201, a sensor installation portion 201C is provided at an opposite end to the smaller diameter opening portion. The vehicle sensor 205 is composed of the ball sensor 205C and the vehicle sensor lever 205A thereon, with its lever 205A directed upwards.

The clutch 202 has an opening portion 202C formed at a center thereof. The shaft portion 48 of the ratchet gear 26 is loosely inserted therein. Clutch teeth 202D which are coaxial with the opening portion 202C and extend in the direction of the shaft center are erected in a circular shape at a front face portion of the clutch 202.

Figure 23:
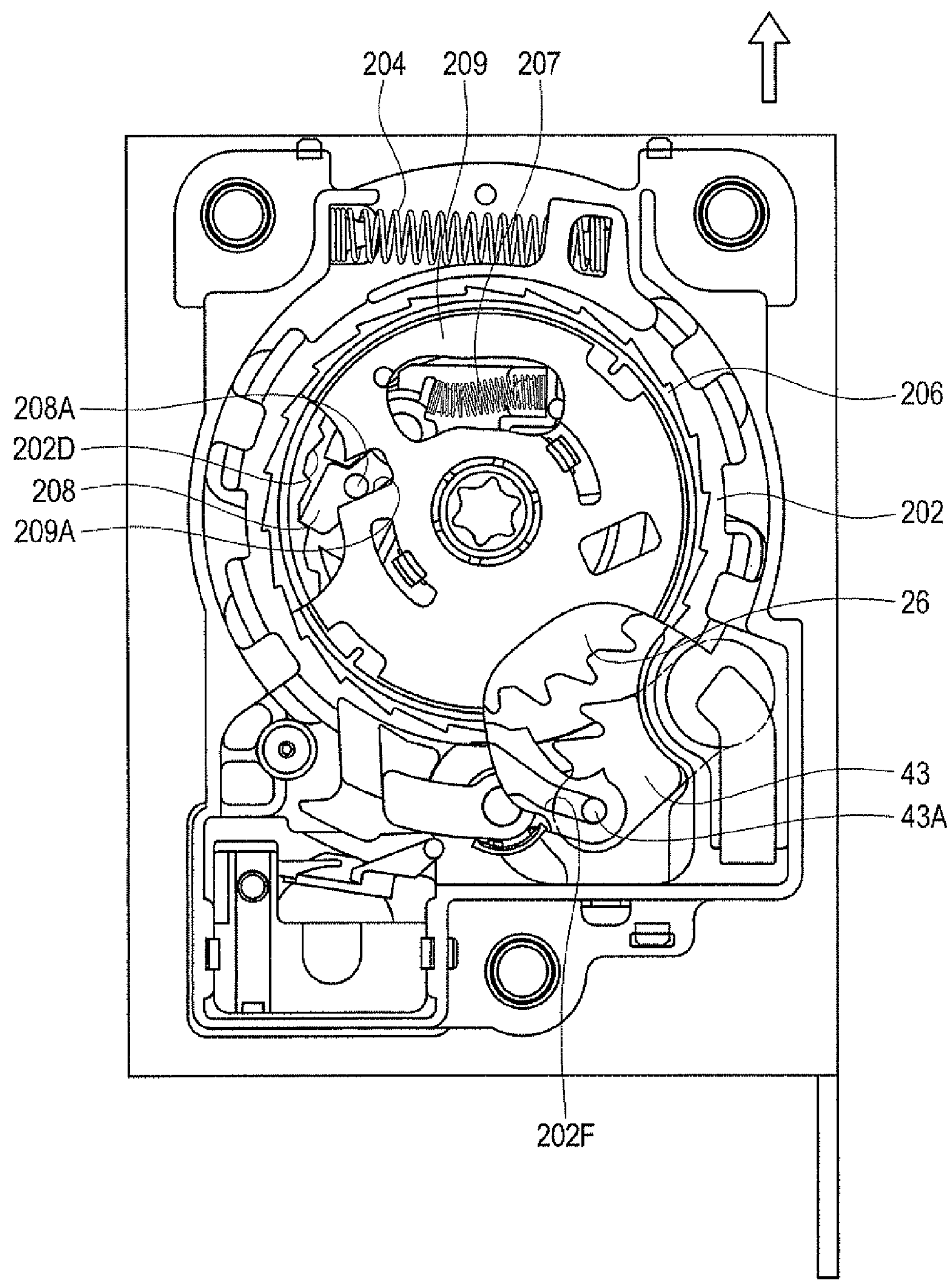
FIG. 23 is a view for explaining the operation of a webbing-sensitive-type locking mechanism (when operation is initiated)

A mounting pin 202E and a guide groove 202F are provided at a substantially lower central part in the clutch 202 (refer to FIG. 23). The mounting pin 202E is provided at a front surface so that the pilot arm 203 is rotatably supported. The pilot arm 203 is forced upwards by the vehicle sensor lever 205A. The guide groove 202F is provided at a back surface, so that the guiding pin 43A of the pawl 43 is loosely fitted therein. The guiding groove 202F is formed so as to extend close to the shaft center of the opening portion 202C in a leftward direction. As a result, the pawl 43 is driven so as to come close to the ratchet gear 26 by rotating the clutch 202 in a counter-clockwise direction.

Further, the guiding block 2020 extends in a leftward lower direction from the mounting pin 202E. The guiding block 202G is provided so as to face the bottom lever portion 205B of the vehicle sensor 205. The guiding block 202G has a tapered configuration, becoming broader in a downward direction as it extends leftward from the mounting pin 202E. At a tip portion, the guiding block 202G has a region of a predetermined width.

The locking gear 206 has a circular-shaped grooved portion 206D which is housed inside of the clutch teeth 202D of the circular-shaped clutch 202 at the back side thereof (refer to FIG. 4). The locking gear 206 is mounted there inside close to or in contact with the clutch 202 so that the grooved portion 206D surrounds the clutch teeth 202D.

Further, at the center of the locking gear 206, there is erected a cylindrical-shaped fixing boss 206E so as to penetrate the locking gear 206 from front side to back side thereof. On the inner periphery of the fixing boss 206E, there are formed spline grooves so as to allow press-fitting of the spline 48A formed on the outer periphery of the shaft portion 48. Further, the shaft portion 48 loosely inserted in the opening portion 202C is fitted in the fixing boss 206E, whereby the ratchet gear 26 of the take-up drum unit 6 and the locking gear 206 are coaxially press-fitted together so as not to relatively rotate.

An opening 206C which extends to the grooved portion 206D is provided at one corner at an outer peripheral end portion of the locking gear 206. A shaft supporting pin 206B is provided in the vicinity of the opening portion 206C. The locking arm 208 is supported by the shaft supporting pin 206B in a rotatable fashion, wherein a tip end portion of the locking arm 208 is rotatble from the opening portion 206C to the grooved portion 206D.

The locking arm 208 is coupled with the locking gear 206 through the sensor spring 207, and in normal operation, the locking arm 208 is urged so that a tip end portion thereof does not protrude from the opening portion 206C. In the locking operation carried out in the webbing-sensitive locking mechanism, the locking arm 208 protrudes in the grooved portion 206D through the opening portion 206C, and a tip end portion of the locking arm 208 is caused to engage the clutch teeth 202D.

At an outer peripheral edge of the locking gear 206, locking gear teeth 206A are engraved toward the direction of the outer diameter. The locking gear 206 is arranged at the back side of the clutch 202 so that the fixing boss 206E is fitted in the opening portion 202C of the clutch 202 and locking gear teeth 206A come close the pilot arm 203. In the locking operation carried out in the vehicle-body-sensitive locking mechanism, the pilot arm 203 is pushed upwards by the vehicle sensor lever 205A of the vehicle sensor 205, and the tip end portion of the pilot arm 203 is caused to engage the locking gear teeth 206A.

The inertia mass 209 is mounted to the front surface of the locking gear 206 in a rotatable fashion. The inertia mass 209 has a guide opening portion 209A. A guide pin 208A which extends in the locking arm 208 is loosely fitted in the guide opening portion 209A. The inertia mass 209 is made of a metallic member and serves to generate delay of inertia with respect to rapid pull out of a webbing. From a functionality point of view, provision of one guide opening portion 209A suffices. However, from the point of view of generating the inertial delay, dummy guide opening portions 209A may be provided at point-symmetric positions at a center of the inertia mass 209.

A front surface of the locking unit 9 is covered by a mechanism cover 210 shaped from a synthetic resin. The mechanism cover 210 has substantially a form of a box with an opening at a side of the housing 11. There are arranged nylon latches 210A at three portions in the mechanism cover 210, namely, at two of upper corners and at a center of a lower edge portion therein. Configuration of the nylon latches 210A is similar with that of the nylon latches 8A. Further, in the center of the mechanism cover 210 on the side of the housing 11, a cylindrical supporting boss 210B is arranged upright so as to allow therein rotatable mannered fitting of the fixing boss 206E that projects frontward with reference to the locking gear 206.

In assemblage of the locking unit 9, on the mechanism block 201, there are firstly mounted the return spring 204, the clutch 202, the pilot arm 203, the vehicle sensor 205, the locking gear 206, the locking arm 208 and the inertia mass 209. Thereafter, the fixing boss 206E of the locking gear 206 is fitted in the supporting boss 210B of the mechanism cover 210 and respective nylon latches 210A are inserted in the openings 201D of the mechanism block 201.

For mounting the locking unit 9 to the external of the side wall portion 12, the shaft portion 48 loosely threaded through the opening portion 202C of the clutch 202 is fitted in the fixing boss 206E of the locking gear 206. Thereafter, the nylon latches 210A of the mechanism cover 210 are pushed into the through holes 52 provided at three portions in the side wall portion 12 of the housing 11. Thereby, the shaft portion 48 of the take-up drum unit 6 is rotatably supported by the supporting boss 210B of the mechanism cover 210 mounted to the external of the side wall portion 12 of the housing 11, through the fixing boss 206E on the locking gear 206 of the locking unit 9.

In the locking unit 9, members other than the inertia mass 209, the return spring 204, the sensor spring 207 and the metallic ball of the vehicle sensor 205 are made of a resin material. Also, the coefficient of friction between these members in the case they come in contact with one another is small.

Next, the operation of the normal locking mechanism will be described based on FIG. 23 through FIG. 28. In these drawings, the webbing-pull-out direction is as shown an arrow. Rotation in the counter-clockwise direction is the webbing-pull-out direction. The following description is focused on the locking operation, while description of the remaining parts is omitted for convenience. In the description of this operation, contents of the drawings will be partly omitted as necessary. The operation of the pawl 43 is common both in the webbing-sensitive locking mechanism and the vehicle-body-sensitive locking mechanism. Also, in the following description, some portions obstacle to explain the relationship between the pawl 43 and the ratchet gear 26 are omitted.

[Description of Operation in Webbing-sensitive Locking Mechanism]

Figure 24:
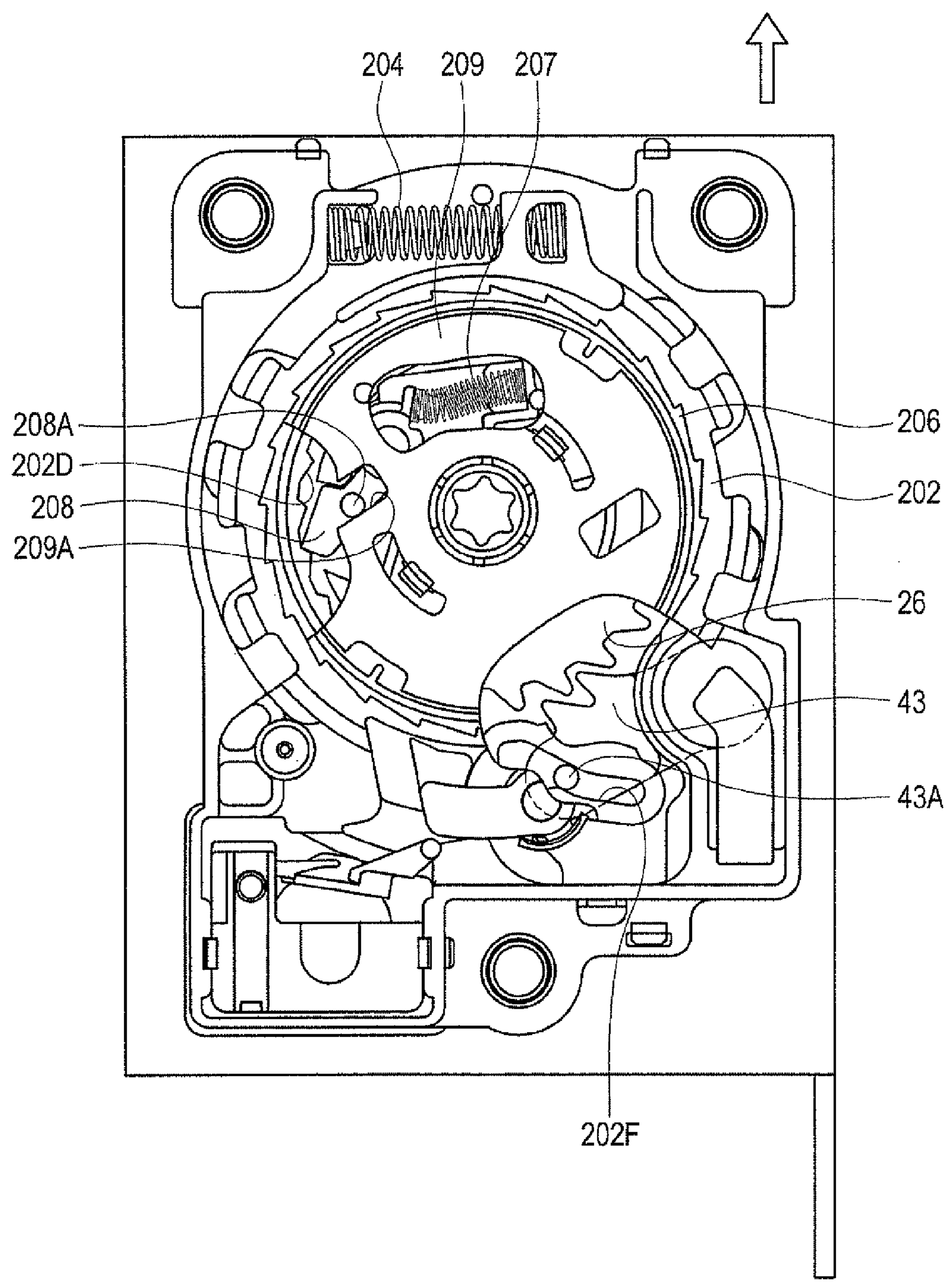
FIG. 24 is a view for explaining the operation of the webbing-sensitive-type locking mechanism (transitional phase to a locked state)
Figure 25:
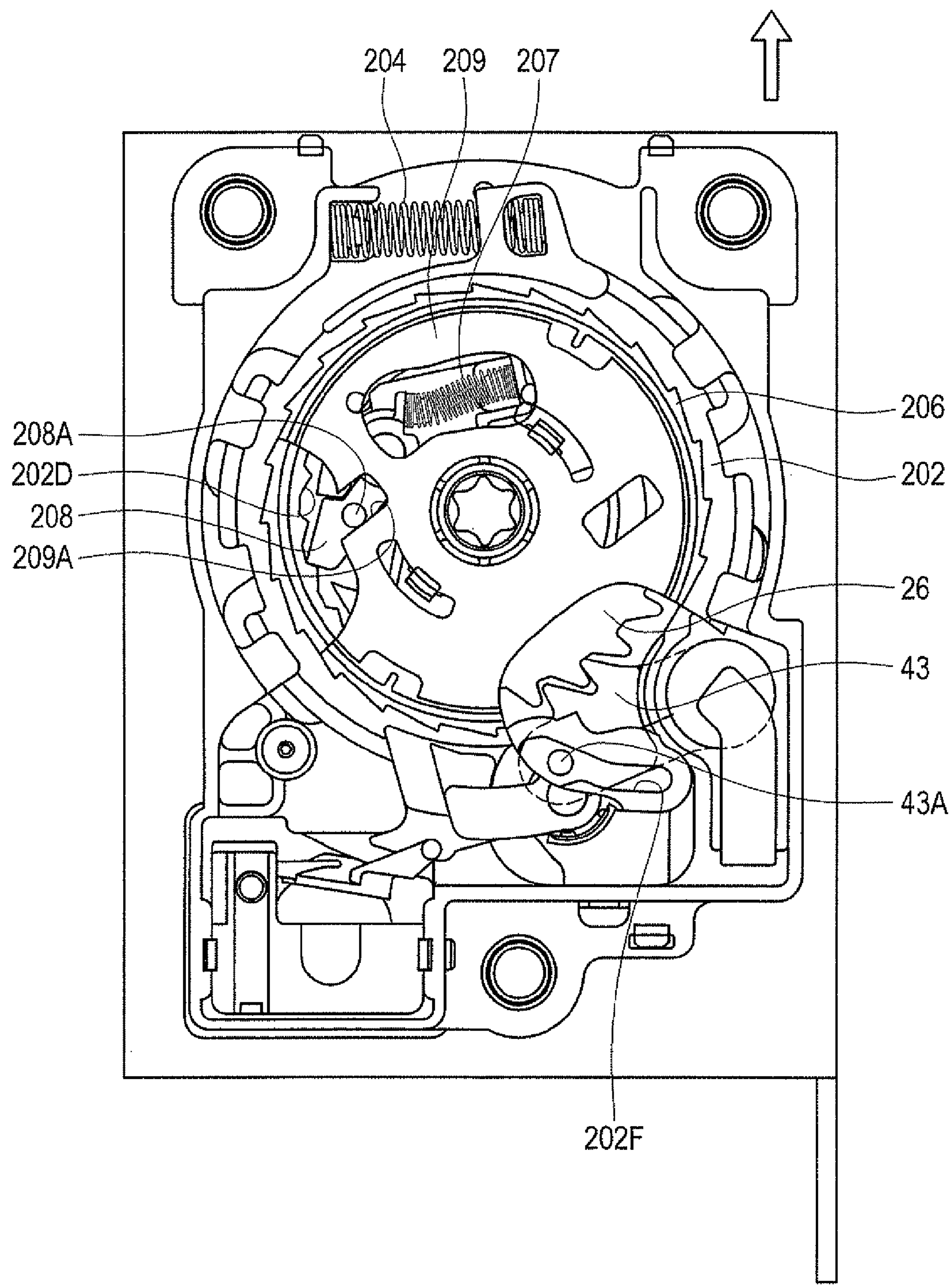
FIG. 25 is a view for explaining the operation of the webbing-sensitive-type locking mechanism (locked state)

FIG. 23 through FIG. 25 are explanatory diagrams showing the operation of the webbing-sensitive locking mechanism. Those diagrams omit some parts of the webbing-sensitive locking mechanism so as to clearly illustrate parts showing the relationship between the pawl 43 and the ratchet gear 26, the relationship between the locking arm 208 and the clutch teeth 202D, and the sensor spring 207.

Once the acceleration applied to the webbing in the webbing-pull-out direction exceeds a predetermined value, the sensor spring 207 can no longer maintain the initial position of the inertia mass 209. Specifically, inertia delay occurs in the inertia mass 209 and the locking gear 206 is rotated in a counter-clockwise direction with respect to the inertia mass 209.

As a result, the guide pin 208A of the locking arm 208 is guided in the guide opening portion 209A of the inertia mass 209 and the tip end portion of the locking arm 208 is caused to rotate in a radially outside direction and engage one of the clutch teeth 202D. This is shown in FIG. 23.

If the operation to pull out the webbing is continued even after the locking arm 208 engages one of the clutch teeth 202D, the locking gear 206 which is installed coaxially with the ratchet gear 26 keeps rotating in a counter-clockwise direction. As the locking arm 208 is engaged with one of the clutch teeth 202D, the clutch 202 as well will rotate in a counter-clockwise direction.

As a result, the guide pin 43A of the pawl 43 is guided in the guiding groove 202F of the clutch 202 and the pawl 43 is caused to rotate toward the ratchet gear 26. This state is shown in FIG. 24.

The pawl 43 keeps rotating and engages the ratchet gear 26, then rotation of the ratchet gear 26 is prevented. Rotation of the guiding drum 21, namely, the take-up drum unit 6, is locked and prevented, which consequently prevents the webbing 3 from being pulled out. This state is shown in FIG. 25. In the state shown in FIG. 25, the return spring 204 is kept in a compressed state.

Accordingly, when the tensile force as applied to webbing-pull-out direction is relaxed and the guiding drum 21, namely, the take-up drum unit 6, rotates in a webbing-take-up direction, the clutch 202 is rotated in the clockwise direction under the urging force of the compressed return spring 204. Thus, the guide pin 43A of the pawl 43 is guided in the guiding groove 202F of the clutch 202 in a reverse direction and the pawl 43 is caused to move away from the ratchet gear 26. The locked state is thus released.

[Description of Operation in Vehicle-body-sensitive Locking Mechanism]

Figure 26:
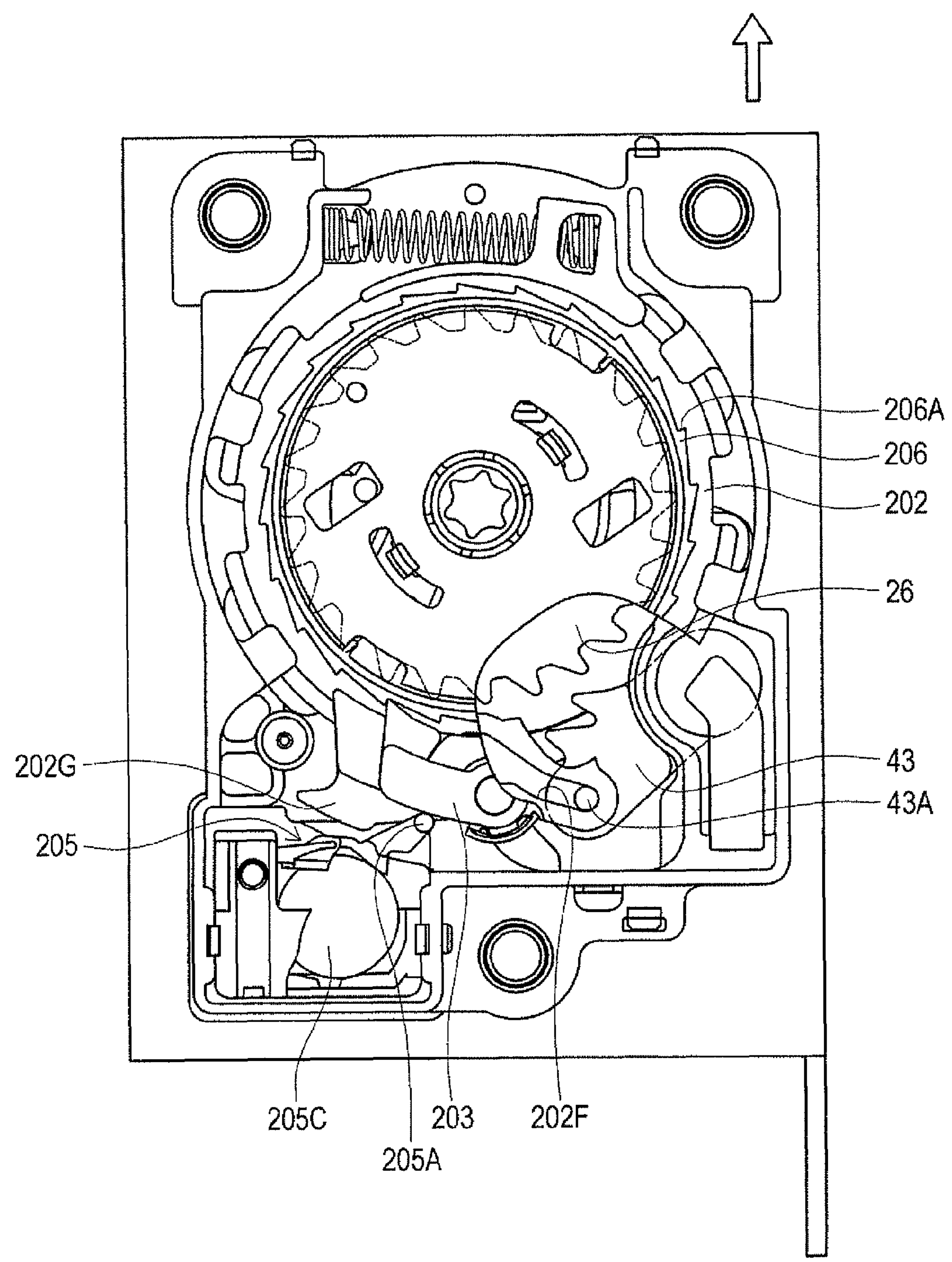
FIG. 26 is a view for explaining the operation of a vehicle-body-sensitive-type locking mechanism (when operation is initiated)
Figure 27:
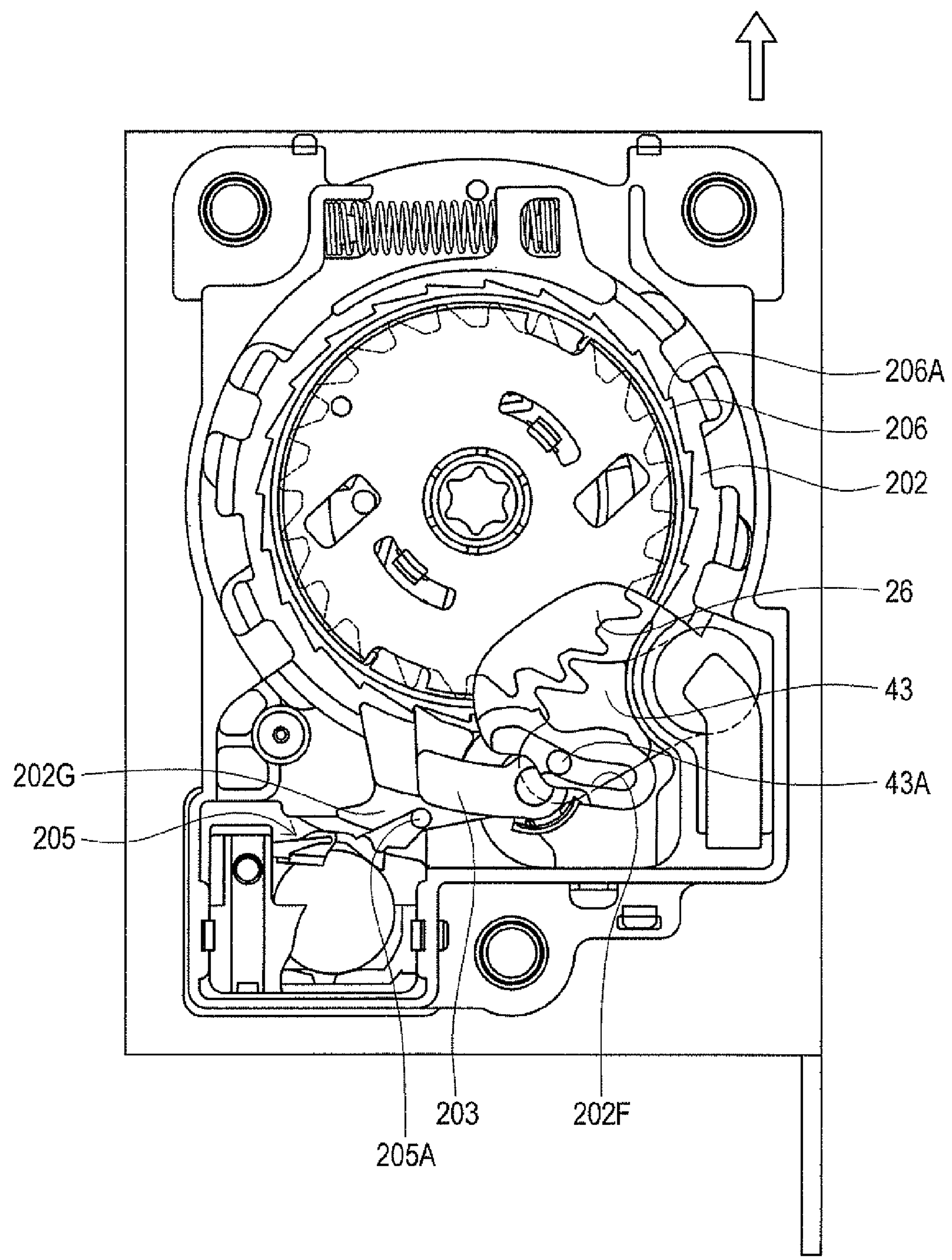
FIG. 27 is a view for explaining the operation of the vehicle-body-sensitive-type locking mechanism (transitional phase to a locked state)
Figure 28:
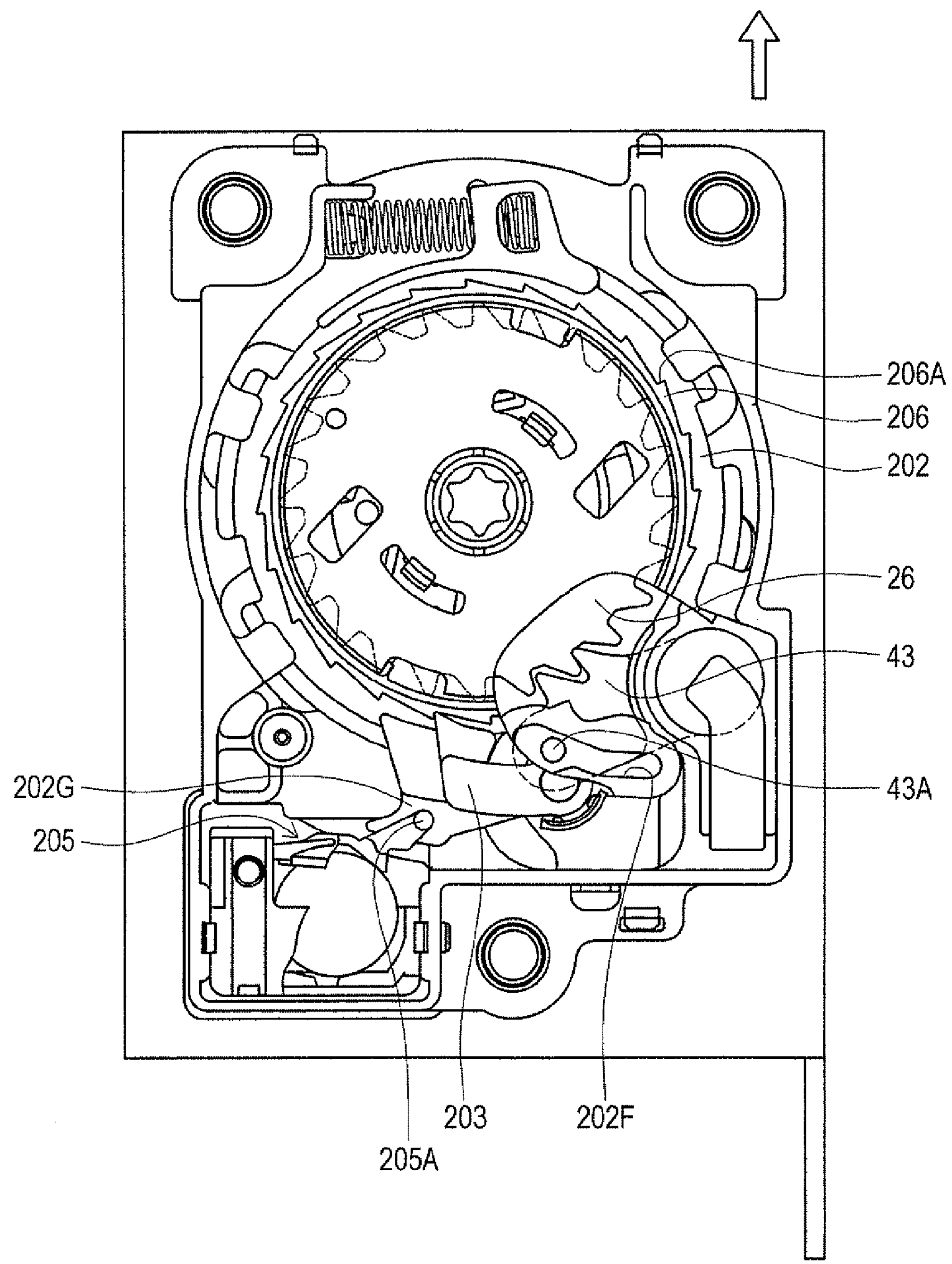
FIG. 28 is a view for explaining the operation of the vehicle-body-sensitive-type locking mechanism (locked state)

FIG. 26 through FIG. 28 are explanatory diagrams showing the operation in the vehicle-body-sensitive locking mechanism. Those diagrams omit some parts of the vehicle-body-sensitive locking mechanism so as to clearly illustrate parts showing the relationship between the pawl 43 and the ratchet gear 26.

Once acceleration caused by rocking or tilting of the vehicle body exceeds a predetermined value, a ball sensor 205C of the vehicle sensor 205 can no longer be maintained at the predetermined position and the vehicle sensor lever 205A is caused to push the pilot arm 203 upwards. As a result, the tip end portion of the pilot arm 203 engages one of the locking gear teeth 206A. This state is shown in FIG. 26.

If the pilot arm 203 and one of the locking gear teeth 206A are kept in the engaged state, the rotating force in the counter-clockwise direction as applied to the locking gear 206 causes the clutch 202 onto which the pilot arm is rotatably supported through the pilot arm 203 to rotate in a counter-clockwise direction.

Thus, the guiding pin 43A of the pawl 43 is guided in the guiding groove 202F of the clutch 202 and the pawl 43 is caused to rotate toward the ratchet gear 26. This state is shown in FIG. 27.

When the pawl 43 keeps rotating and engages the ratchet gear 26, then rotation of the ratchet gear 26 is locked in. The guiding drum 21, namely, take-up drum 6, is locked in so as to prevent the webbing 3 from being pulled out. This state is shown in FIG. 28. In the state shown in FIG. 28, the return spring 204 is compressed.

As is the case with the webbing-sensitive locking mechanism, once the webbing 3 is retracted by urging force of the compressed return spring 204, the clutch 202 rotates in a clock-wise direction, thereby the pawl 43 and the ratchet gear 26 are disengaged therefrom. The ball sensor 205C returns to the initial state once the acceleration of the vehicle reaches zero.

The guiding block 202G is a rocking restraining member which prevents the vehicle sensor lever 205A from elevating in response to acceleration of the vehicle, when the locked state has been released and the clutch 202 is caused to rotate in a clockwise direction and return to its normal position. This guiding block 202G is provided so as to prevent return of the clutch 202 from being restricted when the tip end portion of the pilot arm 203 comes in contact with the vehicle sensor lever 205A of the vehicle sensor 205.

In a locked state, the lower end portion of the wider region of the guiding block 202G comes in contact with the lever bottom portion 205B of the vehicle sensor 205. If the width of this wider region is set so that the tip end portion of the vehicle sensor lever 205A is kept below the moving path of the lower end portion of the pilot arm 203, the vehicle sensor lever 205A and the tip end portion of the pilot arm 203 will not come in contact even when the clutch 202 is rotated in a clockwise direction to be returned in its initial position.

The lower end portion of the guiding block 202G which comes in contact with the lever bottom portion 205B has a tapered configuration becoming gradually narrower in response to rotation of the clutch 202 in the clockwise direction. Upon returning from the locked state, when the clutch 202 rotates in a clockwise direction to return to its normal position, the tip end portion of the pilot arm 203 comes in contact with the vehicle sensor lever 205A so as not to restrict the returning operation of the clutch 202. In normal operation, the lever bottom portion 205B will not come in contact with the guiding block 202G, and rocking of the vehicle sensor 205 caused by the acceleration of the vehicle will not be restricted by the guiding block 202G.

[Description of Operation of Forced Locking Mechanism]

Next, the operation of the forced locking mechanism when activated by the gas generating member 61 of the pretensioner mechanism 17 in case of a vehicle collision will be described based on FIG. 29 through FIG. 38.

Figure 29:
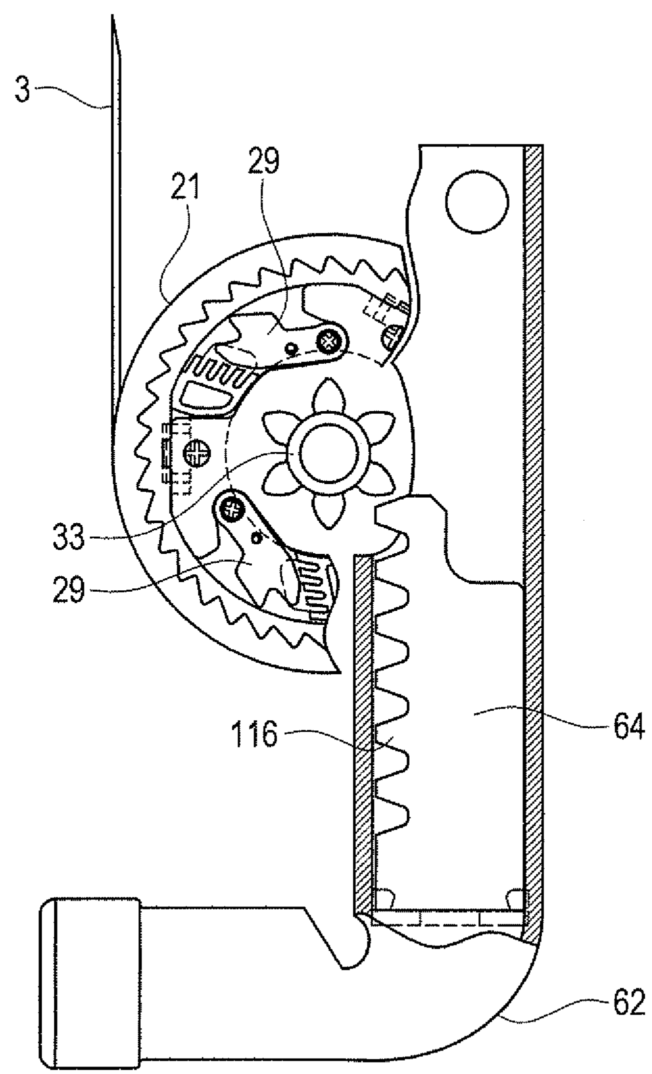
FIG. 29 is a view for describing a mechanism wherein the pretensioner operation is transmitted to the guiding drum (in normal operation)
Figure 30:
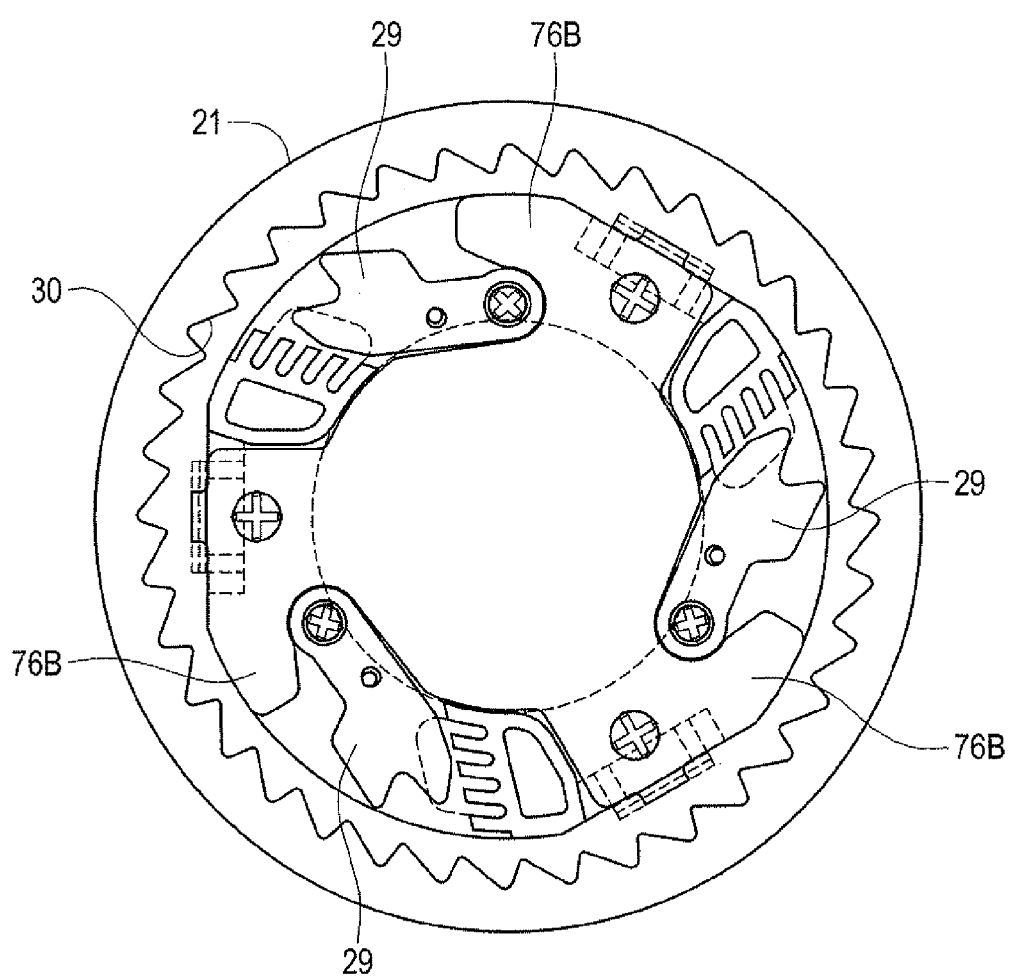
FIG. 30 is a partially enlarged view showing an engaged state between the clutch pawl and the guiding drum (when disengaged)
Figure 33:
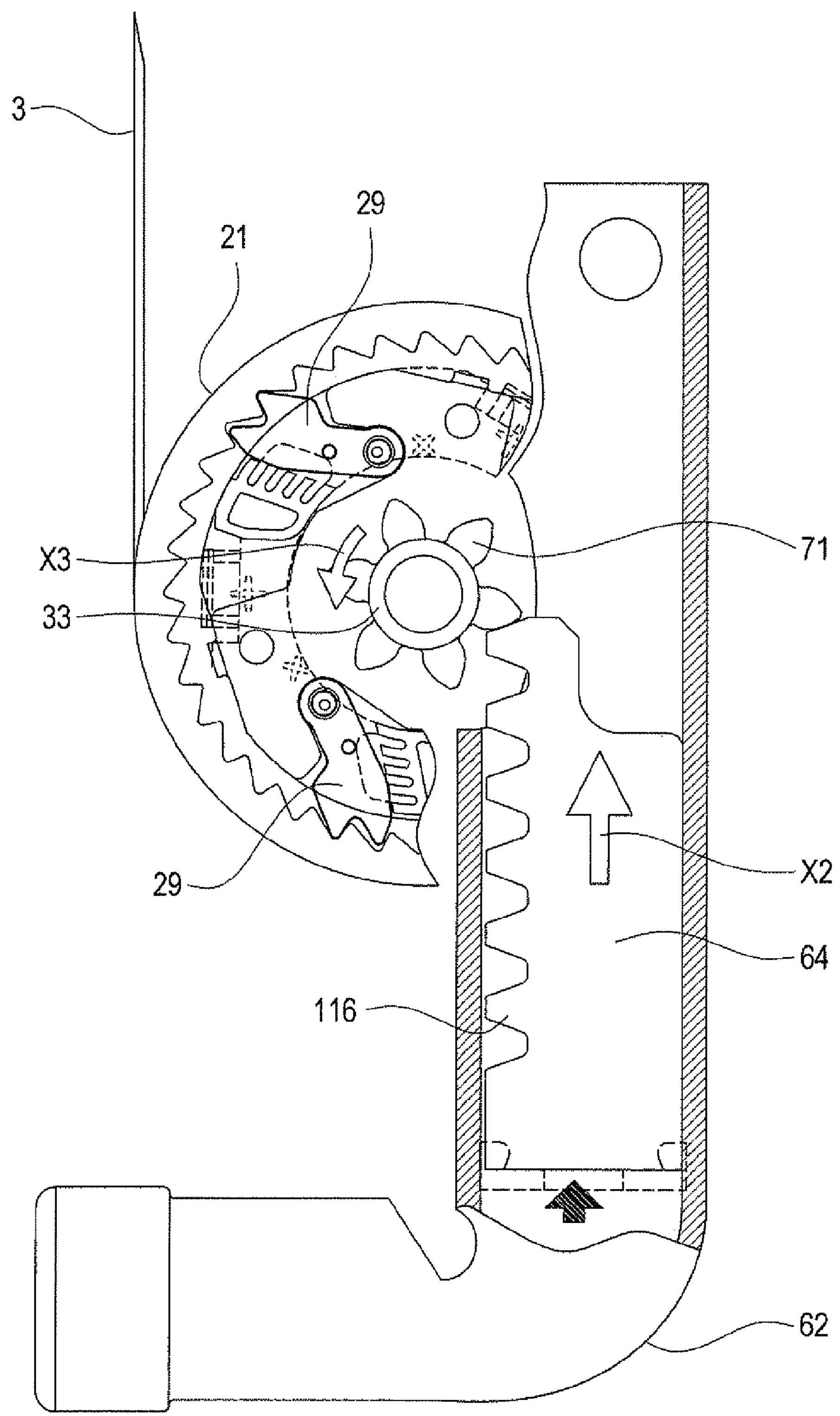
FIG. 33 is a view for describing a mechanism wherein the pretensioner operation is transmitted to the guiding drum (when engagement is initiated)
Figure 34:
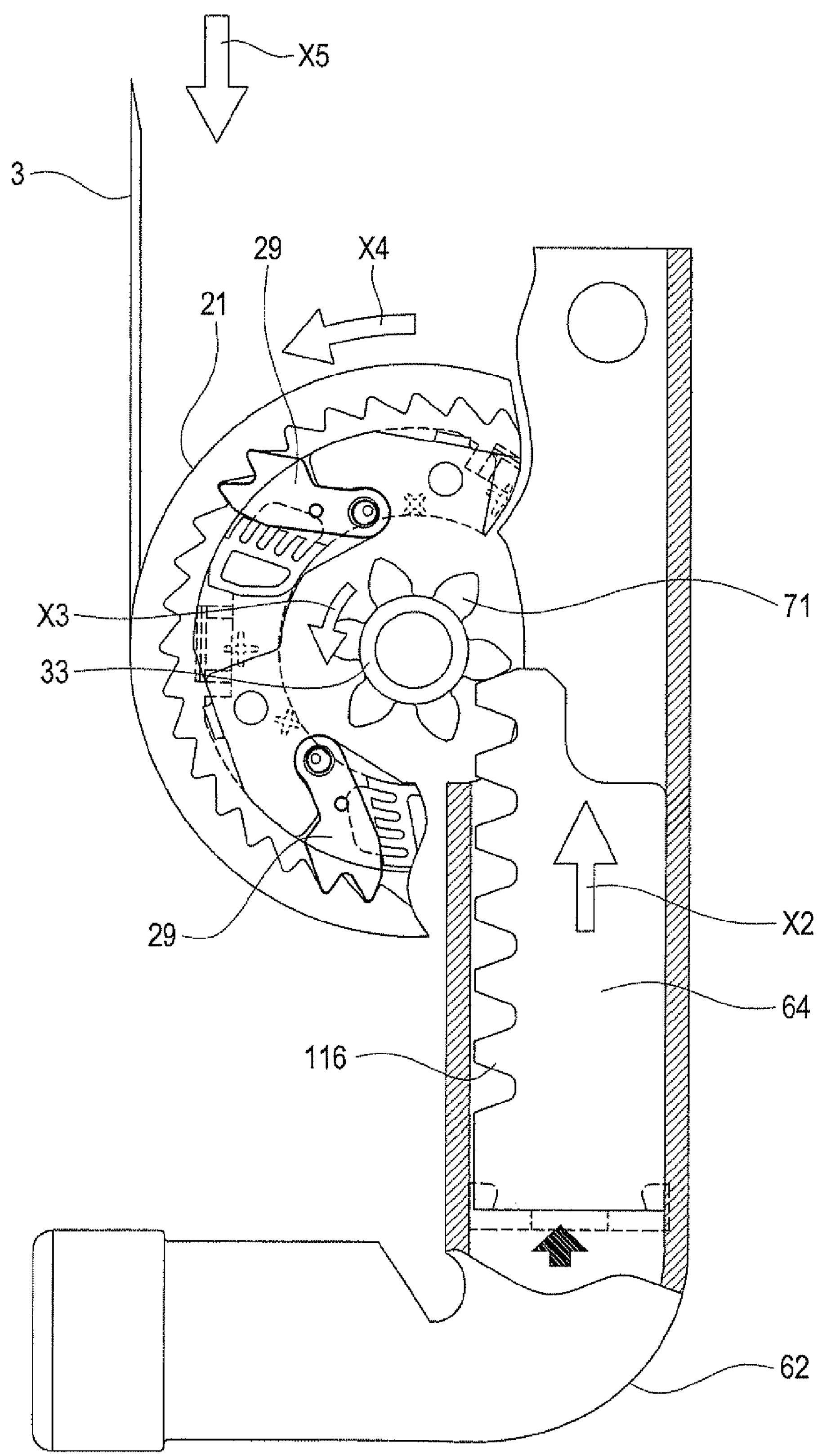
FIG. 34 is a view for describing a mechanism wherein the pretensioner operation is transmitted to the guiding drum (when engagement is completed)
Figure 35:
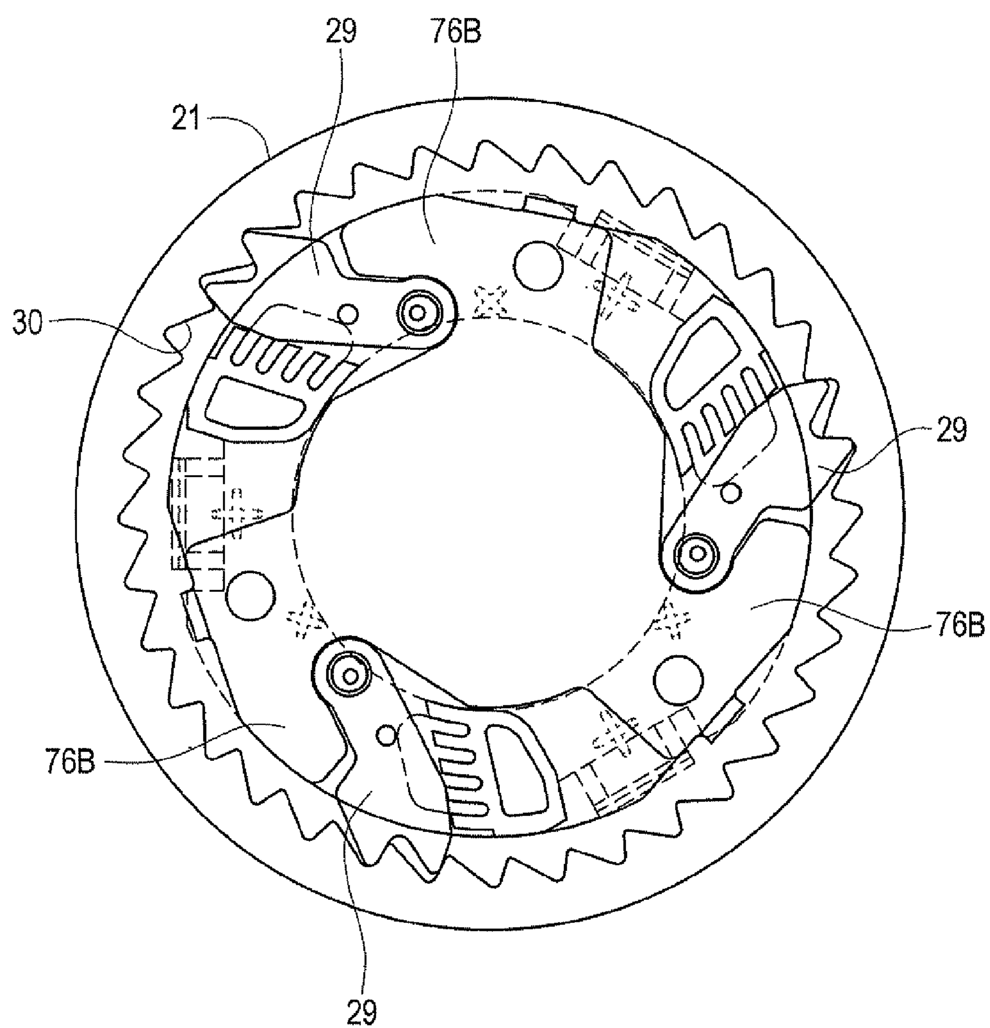
FIG. 35 is a partially enlarged view showing an engaged state between the clutch pawls and the guiding drum (when engagement is initiated in response to the pretensioner operation)
Figure 36:
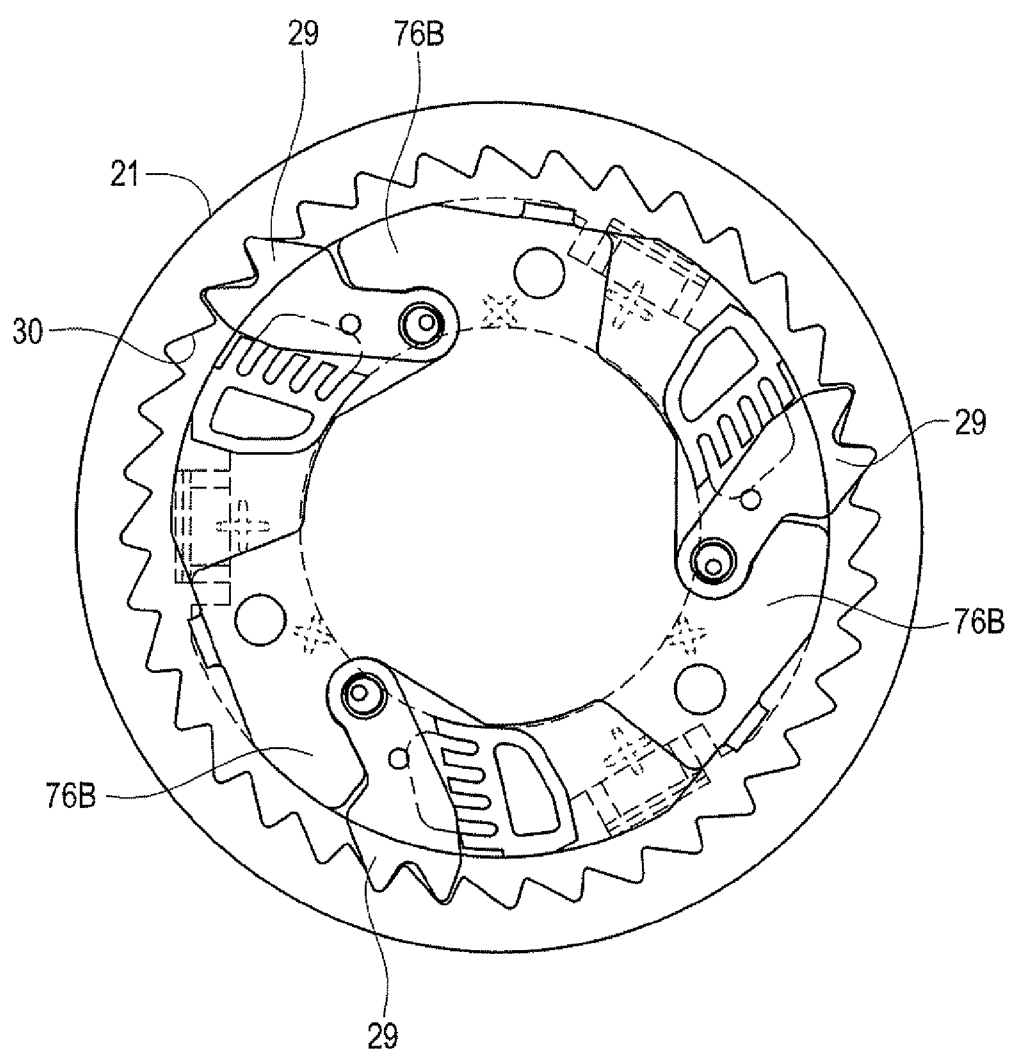
FIG. 36 is a partially enlarged view showing an engaged state between the clutch pawls and the guiding drum (when engagement is completed in response to the pretensioner operation)

FIG. 29, FIG. 33 and FIG. 34 show a part of the pipe cylinder 62 as a cross sectional view to illustrate inside of the pipe cylinder 62 in which the piston 64 is arranged. The drawings show the engaging state between the clutch pawls 29 and the guiding drum 21, excluding the base plate 65 and the pawl guide 77. FIG. 30, FIG. 35 and FIG. 36 are enlarged views of the engaging state between the clutch pawl 29 and the guiding drum 21.

Figure 31:
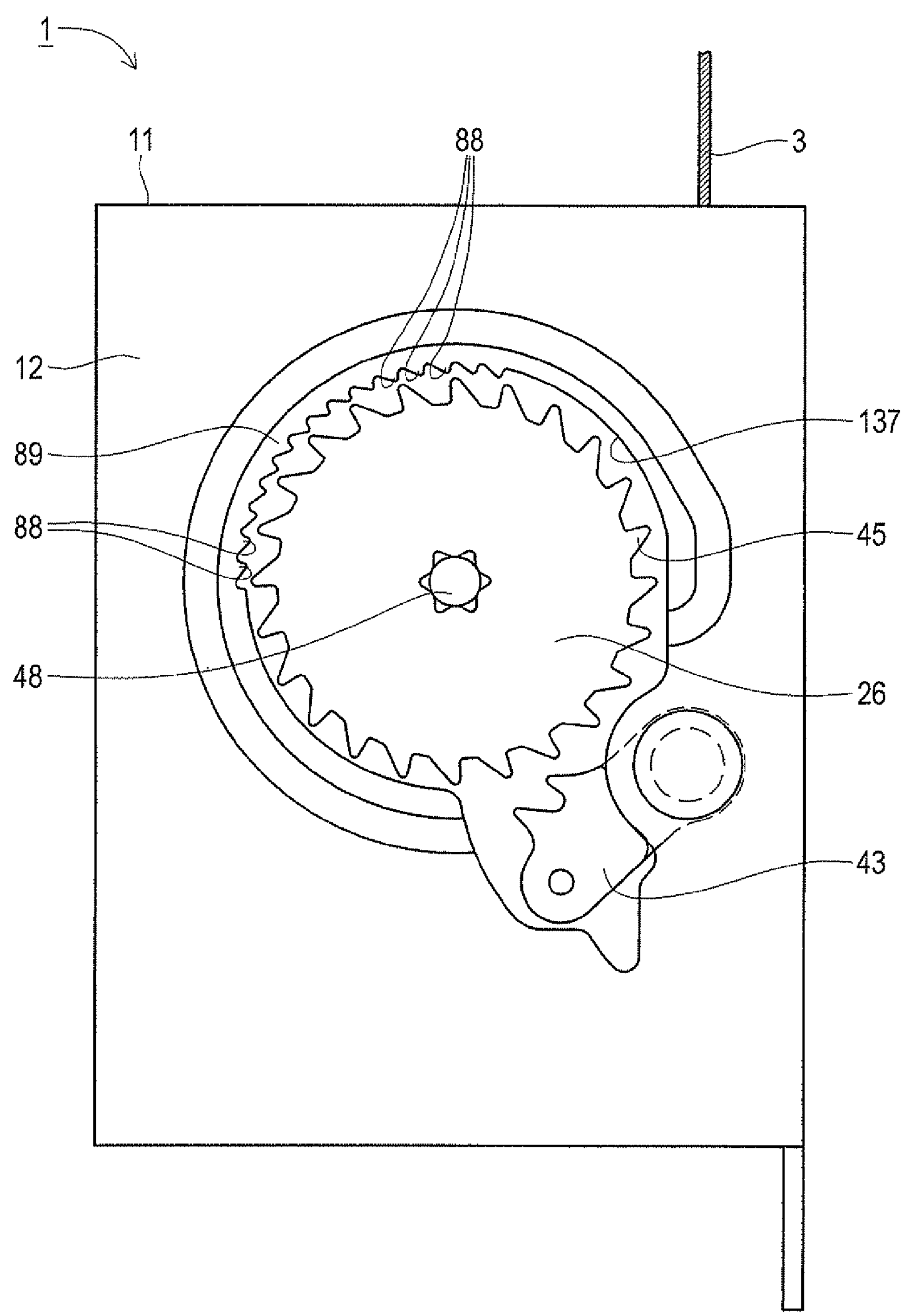
FIG. 31 is a view for describing a positional relation of the ratchet gear and the housing when the pretensioner mechanism does not activate.
Figure 32:
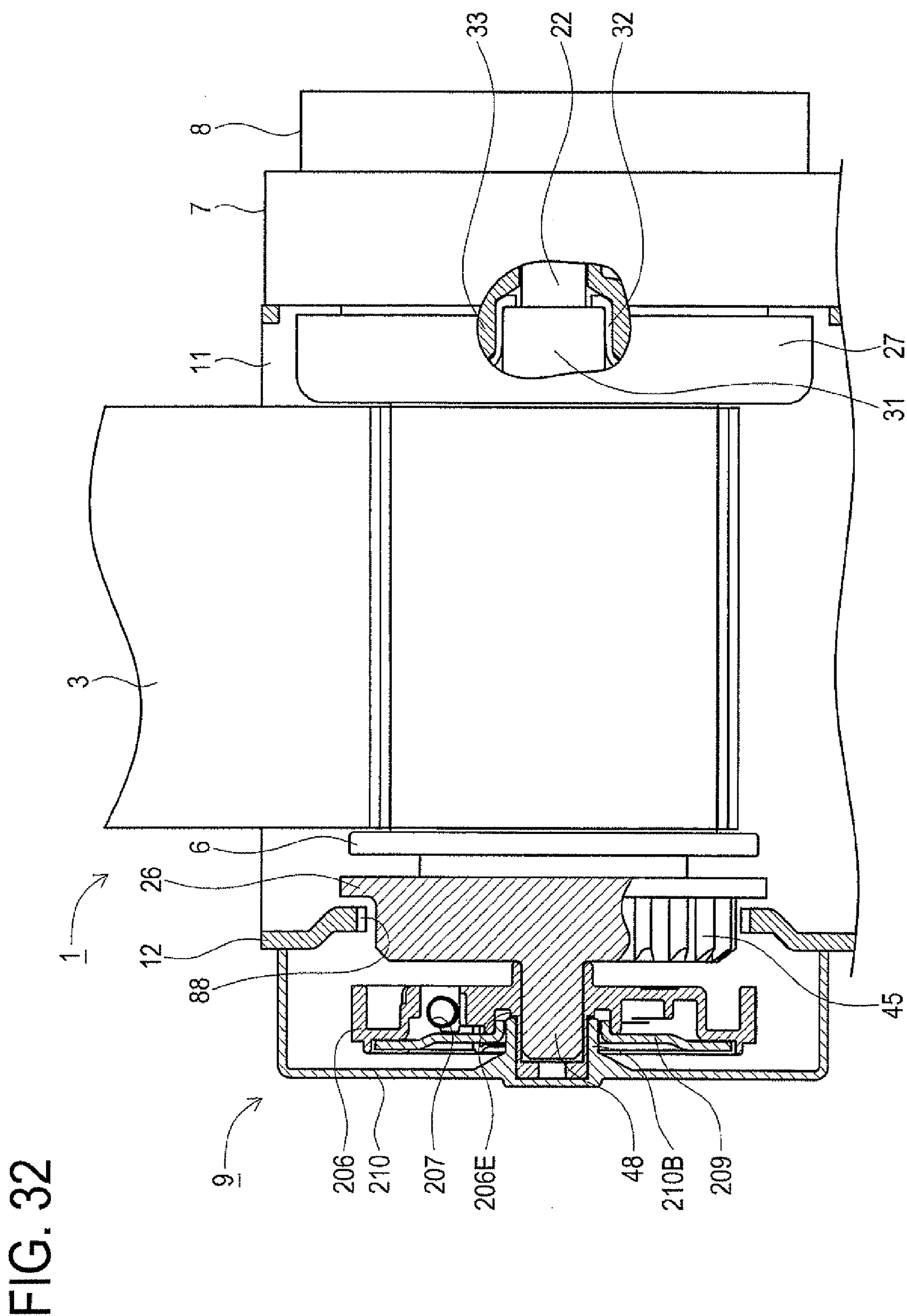
FIG. 32 is a view for describing a positional relation of the take-up drum and the housing when the pretensioner mechanism does not activate.
Figure 37:
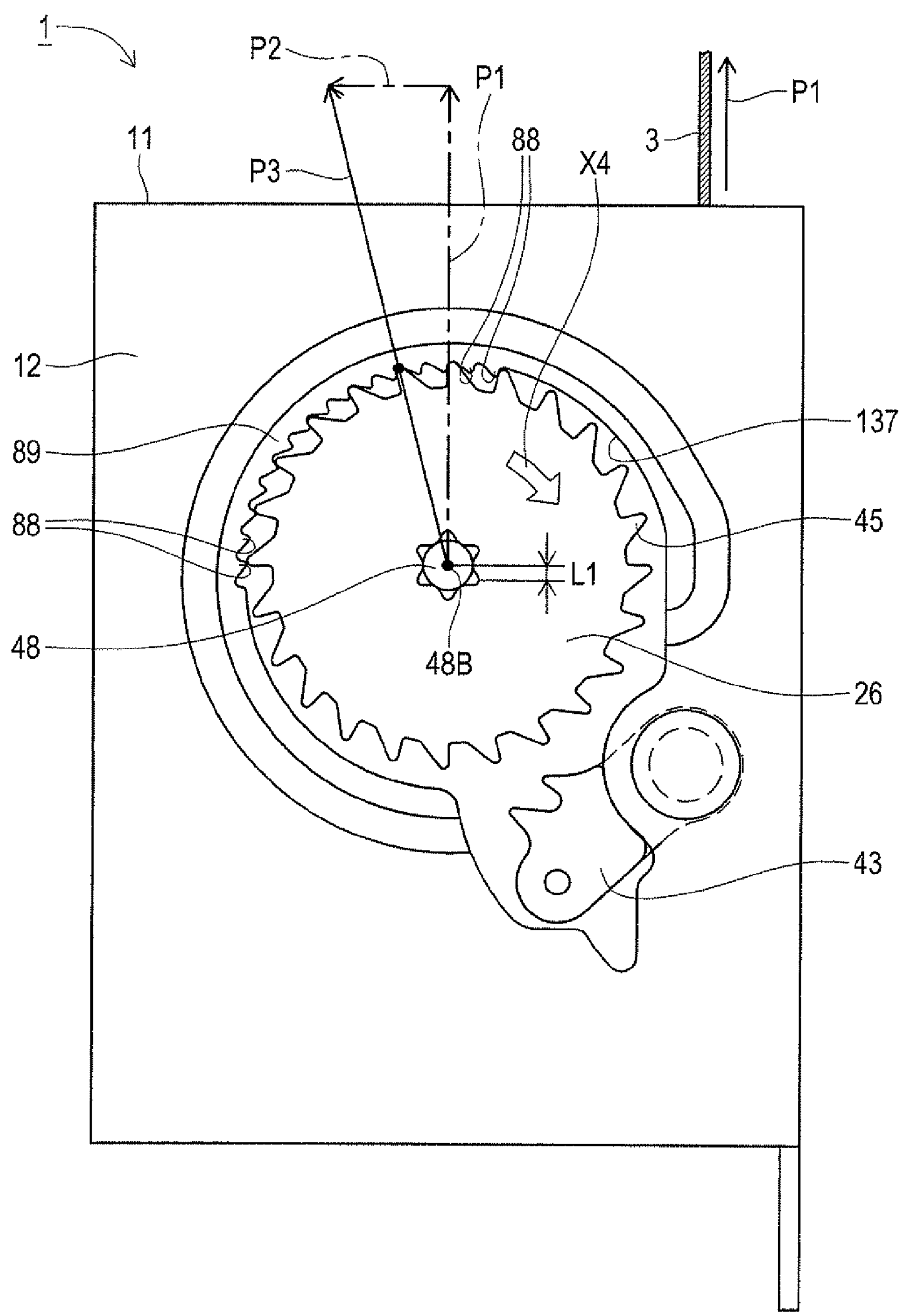
FIG. 37 is a view for describing a positional relation of the ratchet gear and the housing when activation of the pretensioner mechanism causes plastic deformation to the mechanism cover.

FIG. 31 shows rotation position of the ratchet gear 26 with the locking unit 9 being removed from the side wall portion 12 of the housing 11 when the pretensioner mechanism 17 does not activate. FIG. 32 shows rotation position of the take-up drum unit 6 with outer portion thereover being removed partially when the pretensioner mechanism 17 does not activate. FIG. 37 shows rotation position of the ratchet gear 26 with the locking unit 9 being removed from the side wall portion 12 of the housing 11 when activation of the pretensioner mechanism 17 causes plastic deformation to the mechanism cover 210.

Figure 38:
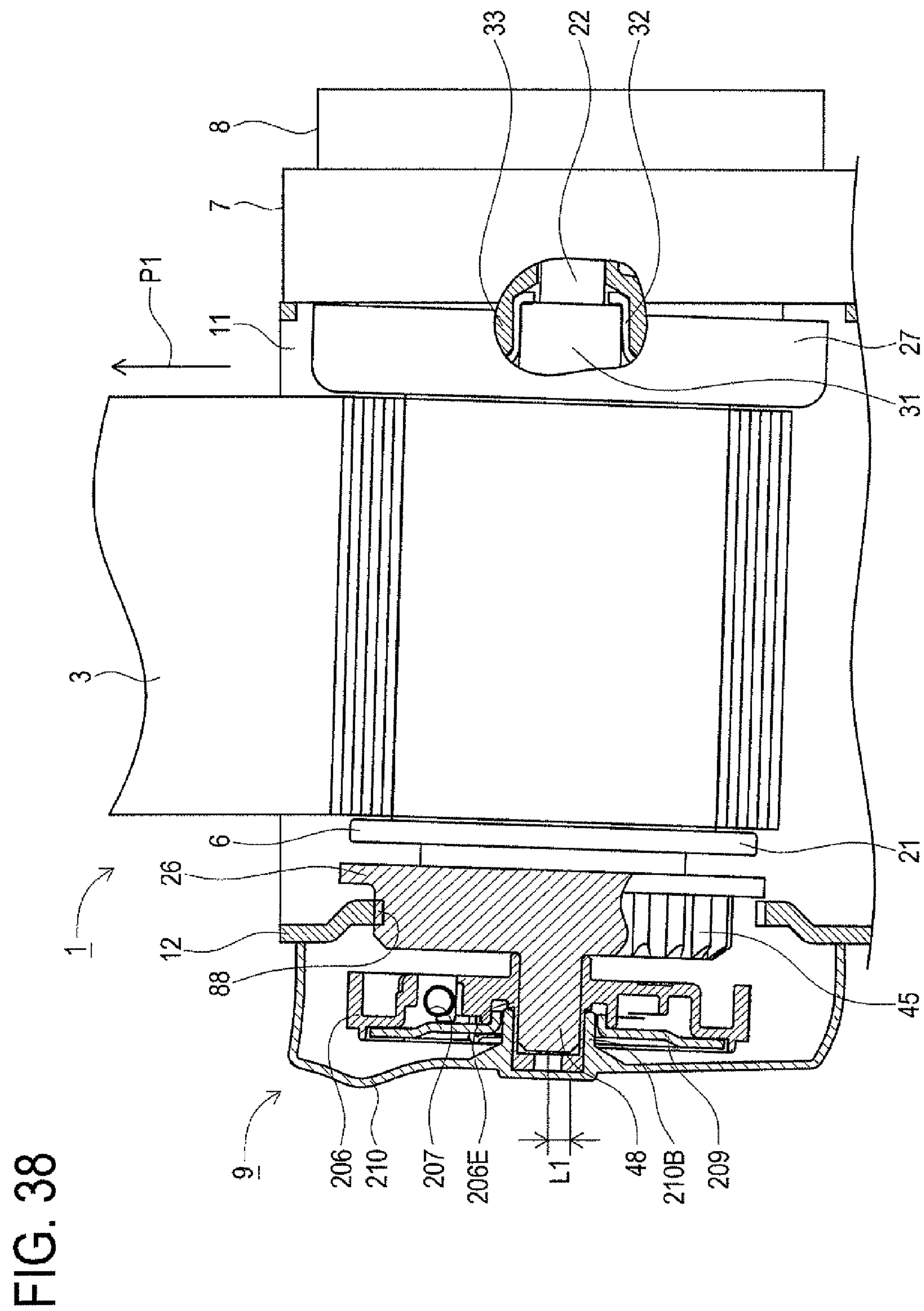
FIG. 38 is a view for describing a positional relation of the take-up drum and the housing when activation of the pretensioner mechanism causes plastic deformation to the mechanism cover.

FIG. 38 shows rotation position of the take-up drum unit 6 with outer portion thereover being removed partially when activation of the pretensioner mechanism 17 causes plastic deformation to the mechanism cover 210. For convenience of explanation, in both FIG. 32 and FIG. 38, the wire 24 and wire plate 25 are omitted and the flange portion 27 of the take-up drum unit 6 is depicted in a partially-cut-out manner so as to illustrate the state that the mounting boss 31 and the bearing 32 are rotatably supported by the pinion gear body 33.

There will firstly be described on the normal state where the pretensioner mechanism 17 does not activate, by referring to FIG. 29 through FIG. 32.

As shown in FIG. 29 and FIG. 30, the piston 64 is provided at a bottom position inside the pipe cylinder 62, whereby the rack 116 carved in the piston 64 is prevented from engaging with the pinion gear body 33. The clutch pawl 29 is kept at the storing position.

As shown in FIG. 31 and FIG. 32, through the bearing 32 fitted to the outer periphery of the mounting boss 31, the one end (right-side end in FIG. 32) of the take-up drum unit 6 is rotatably supported by the shaft receiving portion 33A of the pinion gear body 33 constituting the pretentioner unit 7 and being made of steel material or the like. Further, at the other end (left-side end in FIG. 32) of the take-up drum unit 6, the shaft portion 48 of the ratchet gear 26 is rotatably supported by the supporting boss 210B of the mechanism cover 210 through the fixing boss 206E of the locking gear 206.

Further, between the ratchet gear portion 45 of the ratchet gear 26 and the inner periphery of the through hole 137 formed at the side wall portion 12 of the housing, there is secured a predetermined space (for instance, about 0.3 mm to 0.5 mm). That is, between the ratchet gear portion 45 of the ratchet gear 26 and each of the inner teeth 88 formed on the engagement gear portion 89, there is secured a predetermined space (for instance, about 0.3 mm to 0.5 mm). Therefore, the ratchet gear 26 smoothly rotates in the webbing-pull-out direction or webbing-take-up direction without getting in contact with each of the inner teeth 88.

Next, there will be described on activated state of the pretensioner mechanism 17 by referring to FIG. 33 through FIG. 38.

As shown in FIG. 33 and FIG. 35, in a case where the gas generating member 61 of the pretensioner mechanism 17 activates at the time of vehicle collision or the like, the piston 64 inside the pipe cylinder 62 shears the rack locking pin 108 and moves upward (direction of arrow X2) from a normal state as shown in FIG. 29 so as to come in contact with the teeth on the pinion gear portion 71 of the pinion gear body 33.

Thereby, the pinion gear body 33 which is rotatably supported by the base plate 65 and the cover plate 57 starts rotating in a counter-clockwise direction in front view (direction of arrow X3). Accordingly, the pawl base 76 integrally fixed to the pinion gear body 33 is caused to start rotating and the clutch pawl 29 is caused to start projecting radially outward.

After that, as shown in FIG. 34, in a case where the piston 64 further moves inside the pipe cylinder 62 and the pinion gear body 33 is caused to rotate in a counter-clockwise direction in front view (direction of arrow X3), rotation of the or the pawl base 76 integrally fixed to the pinion gear body 33 continues and projecting state of the clutch pawl 29 is maintained. Further, as shown in FIG. 36, when the clutch pawl 29 finishes projecting in a diameter direction, engagement with the clutch 30 completes.

Next, the positioning projections 77A of the pawl guide 77 are sheared from the outside surface of the pawl guide 77 along rotation of the pawl base 76, thereby the clutch mechanism 68 and the pinion gear body 33 are caused to start rotating together in response to movement of the piston 64. Thereby, as shown in FIG. 34, engagement of the clutch pawl 29 and the guiding drum 21 completes and the take-up drum unit 6 is rotated in webbing-take-up direction (direction of arrow X4) so that the webbing 3 is retracted onto the guiding drum 21, namely, retracted into the seatbelt retractor 1 (direction of arrow X5).

Further, as shown in FIG. 37 and FIG. 38, in a case where activation of the pretensioner mechanism 17 causes the take-up drum unit 6 to rotate in the webbing-take-up direction (direction of arrow X4) at high speed, large tensile force P1 (for instance, about 2 kN to 3 kN of tensile force) acts on the webbing 3 in a direction opposite to webbing-take-up direction, namely, the webbing-pull-out direction (upward direction in FIG. 37). The tensile force P1 (for instance, about 2 kN to 3 kN of tensile force) is supported at axial both ends portions of the take-up drum unit 6, namely, the shaft portion 48 and the mounting boss 31.

As shown in FIG. 38, through the bearing 32, the mounting boss 31 is rotatably supported by the metallic pinion gear body 33, the base plate 65 and the cover plate 57. Meanwhile, through the synthetic resinous locking gear 206, the shaft portion 48 is rotatably supported by synthetic resinous mechanism cover 210 fixed to the side wall portion 12 of the metallic housing 11. Further, the synthetic resinous mechanism cover 210 is configured to get plastically deformed when pressing force of a predetermined value or larger (for instance, about 1 kN or larger) acts in a radially outward direction of the supporting boss 210B.

Therefore, as shown in FIG. 38, when the tensile force P1 (for instance, about 2 kN to 3 kN of tensile force) acts on the shaft portion 48, the pressing force of a predetermined value or larger (for instance, about 1 kN or larger) acts in a radially upward direction for the supporting boss 210B and the mechanism cover 210 gets plastically deformed in an upward direction where the tensile force P1 acts. Thereafter, the plastic deformation of the mechanism cover 210 causes the rotation axis 48B of the shaft portion 48 to get decentralized by distance L1 and causes the ratchet gear portion 45 of the ratchet gear 26 to rotate in a state of pressed-and-contact with the inner teeth 88 of the engagement gear portion 89 formed on the metallic side wall portion 12.

Thereby, frictional force occurs between the ratchet gear portion 45 of the ratchet gear 26 and each of the inner teeth 88 on the engagement gear 89 so that pressing force P2 (for instance, about 0.4 kN to 0.6 kN) acts in an almost radially inward direction (almost leftward in FIG. 37) with reference to the guiding drum 21. The pressing force P2 is supported at axial both ends portions of the take-up drum unit 6, namely, the shaft portion 48 and the mounting boss 31.

Therefore, when there is defined resultant force P3 of the tensile force P1 (for instance, about 2 kN to 3 kN of tensile force) and the pressing force P2 (for instance, about 0.4 kN to 0.6 kN), the resultant force P3 acts in a radially outward direction (left oblique upward direction in FIG. 37). More specifically, with reference to a radial direction that is oriented from the rotation axis 48B for the shaft portion 48 and the mounting boss 31 so as to be in parallel with the webbing-pull-out direction, the resultant force P3 tilts in the direction where the take-up drum 6 is caused to rotate when the webbing 3 is pulled out (direction opposite to arrow X4).

Accordingly, as shown in FIG. 38, in a case where approximately half of the resultant force P3 larger than the tensile force P1 (for instance, about 2 kN to 3 kN of tensile force) acts on the shaft portion 48, the mechanism cover 201 gets plastically deformed in direction where the resultant force P3 acts through the shaft portion 48 and the locking gear 206. Consequently, as shown in FIG. 37, the ratchet gear portion 45 of the ratchet gear 26 gets engage with the inner teeth 88 on the engagement portion 89 formed on the metallic side wall portion 12 so as to stay in an engaged state.

Thereby, the ratchet gar 26 and the wire plate 25 both constituting the take-up drum unit 6 is not allowed to rotate in the webbing-pull-out direction but allowed to rotate in the webbing-take-up direction (direction of arrow X4 in FIG. 37). In this situation, the take-up drum unit 6 is rotated in the webbing-take-up direction so as to take up the webbing 3 thereon by predetermined length until the piston 64 stops moving.

[Energy Absorption]

Next, in a case where activation of the pretensioner mechanism 17 causes the ratchet gear portion 45 of the ratchet gear 26 to get engaged with the inner teeth 88 on the engagement gear portion 89 formed on the metallic side wall portion 12 due to vehicle collision or the like, rotation of the ratchet gear 26 in the webbing-pull out direction is prevented. If the webbing 3 is further pulled out from this situation with pull-out force that exceeds the predetermined value, rotation torque acting on the guiding drum 21 shears the ejector pins 37 having been fitted in the through holes 47 of the ratchet gear 26 and reveted there, along rotation of the guiding drum 21. At this time, the impact energy is absorbed by sheared ejector pins 37 in a [first energy absorption mechanism].

Simultaneously, if the guiding drum 21 is rotated, there is rotated the spline 23A side of the torsion bar 23 which has been press-fitted and fixed to the back side of the shaft hole 21A in the guiding drum 21, whereby torsional deformation of the torsion bar 23 is caused to start. The guiding drum 21 starts rotating in the pull out direction of the webbing 3 in response to the torsional deformation of the torsion bar 23. Here, the impact energy is absorbed by the torsional deformation of the torsion bar 23 in a [second energy absorption mechanism].

Since the wire plate 25 and the ratchet gear 26 are fitted with the respective engagement convex portions 41 and the engagement concave portions 468, relative rotation occurs even between the wire plate 25 and the guiding drum 21 in response to roation of the guiding drum 21. Thus, relative rotation occurs even between the wire 24 and the wire plate 25 in response to the rotation of the guiding drum 21, and the impact energy is absorbed by the wire 24 in a [third energy absorption mechanism].

[Pull-out-wire Operation]

Here, the operation of the wire 24 at the time of impact energy absorption will be described based on FIG. 18, and FIG. 39 through FIG. 42. FIG. 39 through FIG. 42 are explanatory views of an operation to pull out the wire 24.

As shown in FIG. 18, in an initial state of the wire plate 25 and the guiding drum 21, one end in a peripheral direction of the convex portion 141 constituting the crooked path 145 is positioned close to the end portion on the pull-out side of the convex portion 38 constituting the crooked path 156. Also, the respective end portions of the crooked paths 145 and 156 face each other in a substantially straight line.

Figure 39:
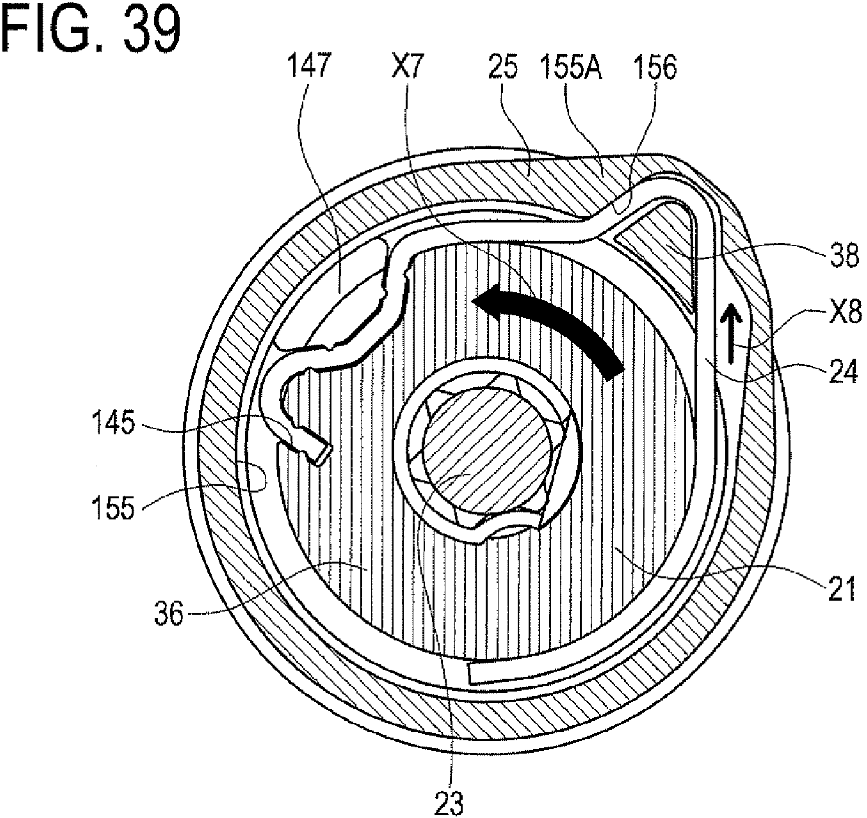
FIG. 39 is a view for describing a pull-out-wire operation.
Figure 40:
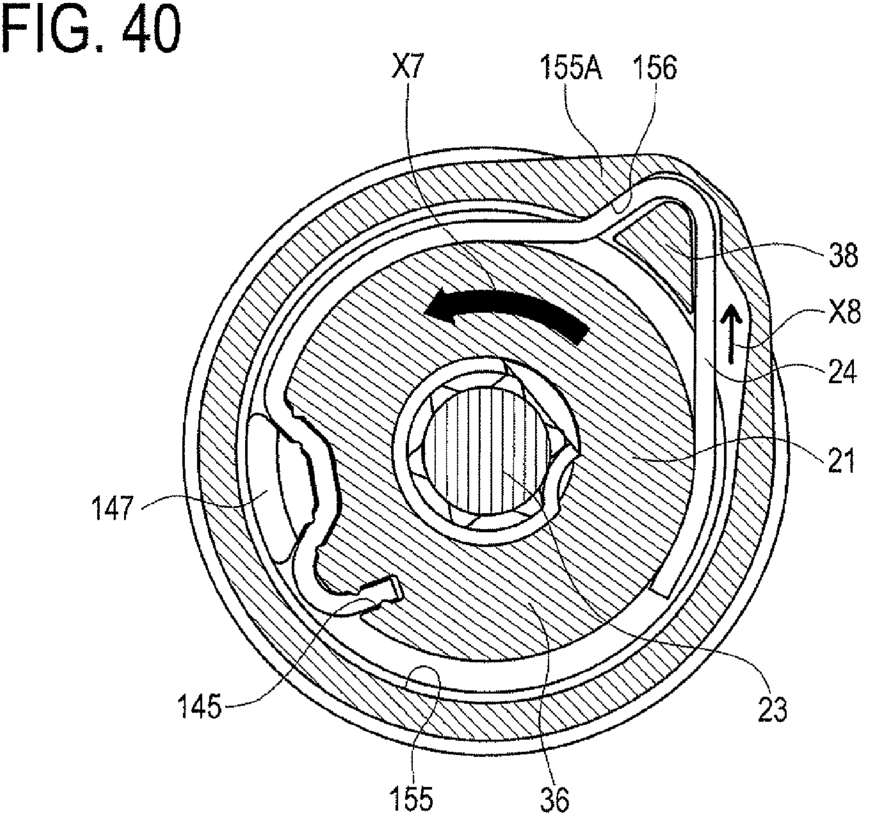
FIG. 40 is a view for describing the pull-out-wire operation.
Figure 41:
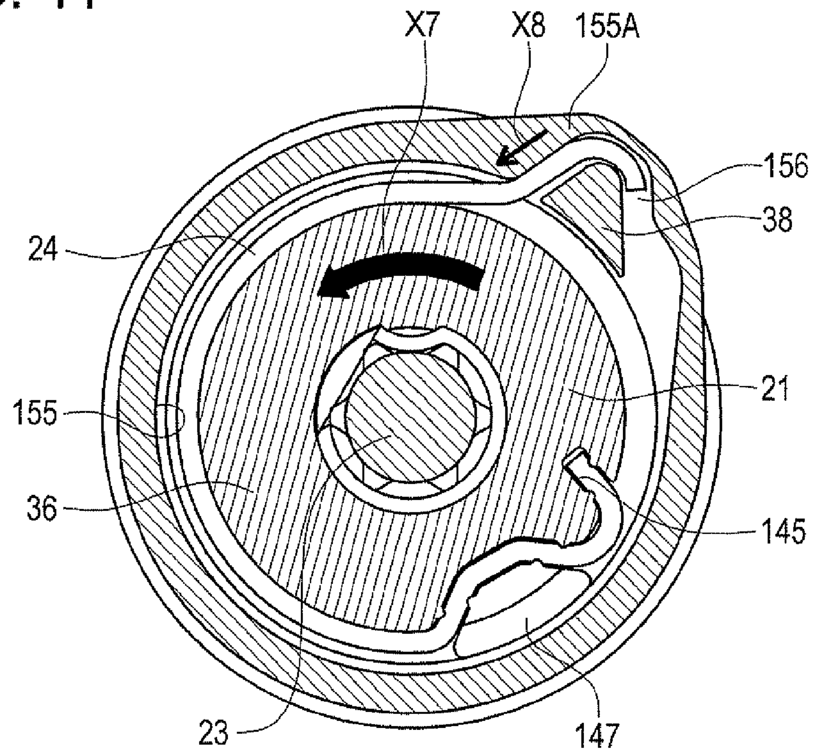
FIG. 41 is a view for describing the pull-out-wire operation.

As shown in FIG. 39 through FIG. 41, if the guiding drum 21 is rotated in the webbing-pull-out direction along pull out of the webbing 3, the wire plate 25 is prevented from rotating. Also, the stepped portion 36 is relatively rotated in the webbing-pull-out direction X7 along the rotation of the guiding drum 21. As a result, the wire 24 with its crooked portion 24A fixed and held in the crooked path 145 of the stepped portion 36 is drawn in the direction of arrow X8 while being sequentially drawn from the crooked path 156 which has a substantially V shape as seen from a front view and is formed by the convex portion 38 inside the bulging portion 155A. The wire 24 is thus taken-up on the outer peripheral surface of the stepped portion 36. Simultaneously with pull out of the wire 24, the torsion bar 23 undergoes torsional deformation in response to rotation of the guiding drum 21.

When the wire 24 passes through the substantially V-shaped crooked path 156 in front view while being deformed, a sliding resistance occurs between the convex portion 38 and the wire 24, and a winding resistance occurs in the wire 24 itself. Thus, the impact energy of the wire 24 is absorbed by this sliding resistance and the winding resistance.

Figure 42:
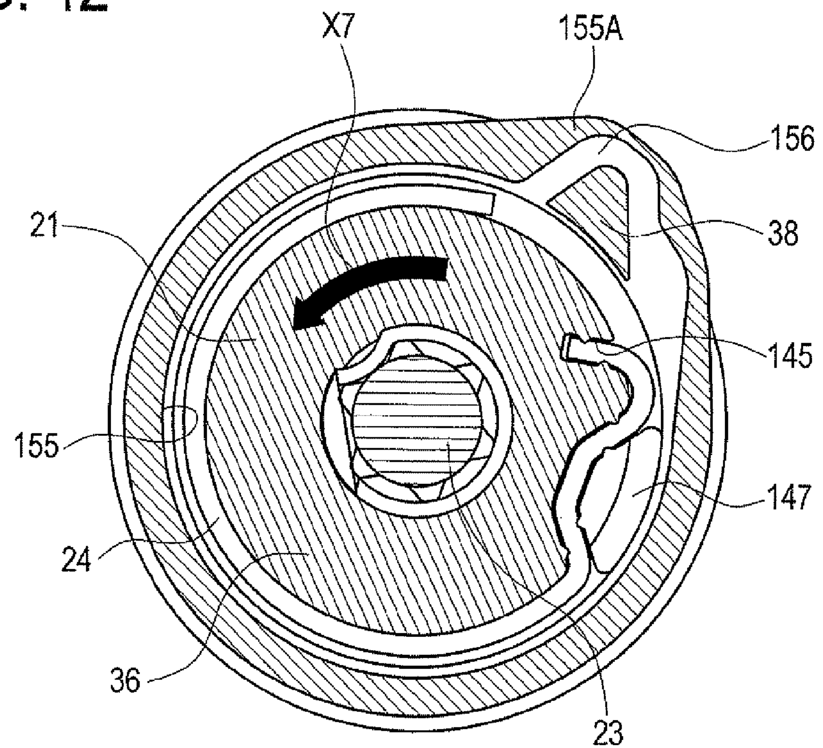
FIG. 42 is a view for describing the pull-out-wire operation.

As shown in FIG. 42, when the other end of the wire 24 has moved away from the crooked path 156 in response to rotation of the guiding drum 21, absorption of impact energy by the wire 24 is ended. Subsequent absorption includes only absorption of impact energy by torsional deformation of the torsion bar 23 in response to rotation of the guiding drum 21.

Figure 43:
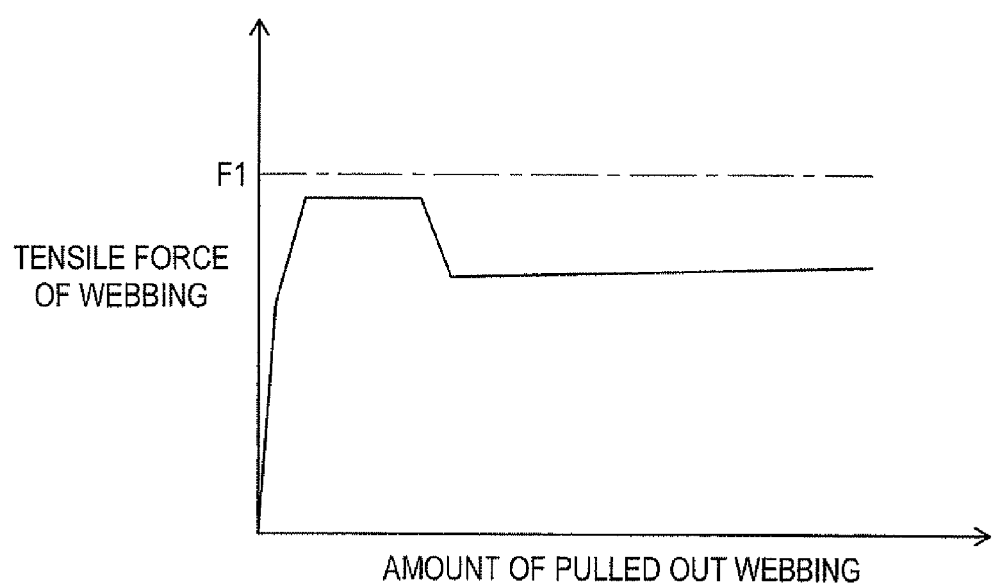
FIG. 43 is an absorption characteristic diagram showing one example of impact energy absorption by the respective ejector pins, wire and torsion bar.

The absorption characteristics of the impact energy by the respective ejector pins 37, the wire 24 and the torsion bar 23 will next be described based on FIG. 43. FIG. 43 is an absorption characteristic diagram showing one example of impact energy absorption by the respective ejector pins 37, the wire 24 and the torsion bar 23.

As shown in FIG. 43, in the period of time from the start of the operation to pull out the webbing 3 operation until the respective ejector pins 37 are sheared, absorption of impact energy by the respective ejector pins 37 and the torsion bar 23 is carried out simultaneously. Accordingly, from the start of the operation to pull out the webbing 3 till the ejector pins 37 are sheared, energy is absorbed by the ejector pins 37 and the torsion bar 23.

Further, in a period of time from the operation to pull out the webbing 3 and shearing of the ejector pins 37 until the wire 24 moves away from the crooked path 156, absorption of impact energy by the torsional deformation of the torsion bar 23 and impact energy absorption by the wire 24 are carried out simultaneously. Also, in the period of time from the shearing of the ejector pins 37 till the operation to pull out the wire 24 from the crooked path 156 ends, the energy absorption load can be set so as to meet, as possible, a predetermined load which is smaller than a maximum load F1 which does not adversely influence the vehicle occupants.

Further, when the wire 24 is moved away from the crooked path 156, the absorption operation of the impact energy by the wire 24 ends. Subsequent absorptions include only absorption of the impact energy by torsional deformation of the torsion bar 23 in response to rotation of the guiding drum 21.

Accordingly, as the wire 24 is fixed and held in place by the respective ribs 151 and 152 by tucking the crooked portion 24A of the wire 24 in the crooked path 145, the configuration can be simplified and the efficiency of the assembly operation of the wire 24 can be improved.

With respect to absorption of impact energy in case of a vehicle collision or the like, absorption of energy at an initial stage right after absorption of this impact energy start is carried out by the ejector pins 37, the torsion bar 23. Thereafter, energy absorption is increased so that energy is absorbed by the torsion bar 23 and the wire 24, whereby efficient energy absorption can be carried out.

As described in detail, in the seatbelt retractor 1 of the present embodiment, in a case where activation of the pretensioner mechanism 17 causes the take-up drum unit 6 to rotate in the webbing-take-up direction at high speed due to vehicle collision or the like, the large tensile force P1 (for instance, about 2 kN to 3 kN of tensile force) acts on the webbing 3 in the webbing-pull-out direction (upward direction in FIG. 37). Thereby, pressing force of a predetermined value or larger (for instance, about 1 kN or larger) acts in a radially upward direction for the supporting boss 210B so that the mechanism cover 21 gets plastically deformed in upward direction where the tensile force acts through the shaft portion 48 and the rocking gear 206.

Subsequently, plastic deformation of the mechanism cover 210 generates frictional force between the ratchet gear portion 45 of the ratchet gear 26 and each of the inner teeth 88 on the engagement gear 89 so that the pressing force P2 (for instance, about 0.4 kN to 0.6 kN) acts in an almost radially inward direction (almost leftward in FIG. 37) with reference to the guiding drum 21. Therefore, the resultant force P3 of the tensile force P1 and the pressing force P2 acts in the radially outward direction (left oblique upward direction in FIG. 37). More specifically, with reference to a radial direction that is oriented from the rotation axis 48B for the shaft portion 48 and the mounting boss 31 so as to be in parallel with the webbing-pull-out direction, the resultant force 3 tilts in the direction where the take-up drum 6 is caused to rotate when the webbing 3 is pulled out.

Since approximately half of the resultant force P3 that is larger than the tensile force P1 (for instance, about 2 kN to 3 kN of tensile force) acts on the shaft portion 48, the mechanism cover 201 gets plastically deformed further in the direction where the resultant force P3 acts through the shaft portion 48 and the locking gear 206. Consequently, the plastic deformation of the mechanism cover 210 causes the ratchet gear portion 45 of the ratchet gear 25 to get engaged with the inner teeth 88 on the engagement gear portion 89 formed on the metallic side wall portion 12 so as to stay in an engaged state.

Thus, the mechanism cover 210 mounted on the exterior of the side wall portion 12 of the housing 11 so as to rotatably support the shaft portion 48 is configured to get plastically deformed when the tensile force P1 acting in the webbing pull-out direction exceeds predetermined value (for instance, about 2 kN to 3 kN). Therefore, when the webbing 3 is taken up in response to activation of the pretensioner mechanism 17, plastic deformation can surely be caused to the mechanism cover 210 and rotation of the take-up drum unit 6 in the webbing-pull-out direction can be stopped promptly and reliably.

Thereby, even after activation of the pretensioner mechanism 17, there can surely be kept the state that the take-up drum unit 6 is locked and prevented from rotating in the webbing-pull-out direction. Further, this mechanical configuration allows the take-up drum unit 6 to rotate in the webbing-take-up direction so that the take-up drum unit 6 can surely take up the webbing 3 in the webbing-take-up direction in response to activation of pretensioner mechanism 17.

Further, on the inner periphery of the through hole 137 formed on the side wall portion 12 of the housing 11, there are formed the inner teeth 88 configured to get engaged with the ratchet gear 26 of the take-up drum unit 6. Still further, on the exterior of the side wall 12 of the housing 11, there is mounted the mechanism cover 210. The arrangement of the above mentioned mechanical elements can constitute a forced locking mechanism that prevents the take-up drum unit 6 from rotating in the webbing-pull-out direction when the pretensioner mechanism 17 activates. Thereby, reduction in the number of assemblage parts and speeding-up of assemblage operation can be achieved with respect to the forced locking mechanism that prevents the take-up drum 6 from rotating in the webbing-pull-out direction when the pretensioner mechanism 17 activates.

Further, the pitch of the inner teeth 88 on the inner periphery of the through hole 137 formed in the side wall portion 12 of the housing 11 is made smaller by approximately half than that of the ratchet gear portion 45 of the ratchet gear 26. Therefore, the difference of pitch size in this extent can surely shorten delay time for the ratchet gear portion 45 of the ratchet gear 26 to get engaged with the inner teeth 88 when the take-up drum unit 6 rotates in the webbing-pull-out direction. Still further, since the pitch of the inner teeth 88 is made smaller by half than that of the ratchet gear portion 45 of the ratchet gear 26, tooth thickness of the inner teeth 88 can be thickened by reducing radial directional tooth depth of the inner teeth 88 through burring, etc.

The inner teeth 88 are formed on a part of the inner periphery on the through hole 137 formed in the side wall portion 12 that faces the ratchet gear portion 45 of the ratchet gear 26 with central angle of 90 degrees so that, with reference to the rotation axis 48B for the shaft portion 48 and the mounting boss 31, the inner teeth 88 start from at least a webbing-pull-out-side radial direction toward the direction where the take-up drum unit 6 is caused to rotate when the webbing 3 is pulled out. Thereby, the inner teeth 88 can surely be formed on the inner periphery of the through hole 137 that faces movement direction of the ratchet gear 26 that is caused to move due to plastic deformation of the mechanism cover 210 in response to activation of the pretensioner mechanism 17.

Further, the mechanism cover 210 is made by molding synthetic resin. Therefore, shape and hardness of the mechanism cover 210 can easily be designed. Thereby, plastic deformation can surely be caused to the mechanism cover 210 so that ratchet gear portion 45 of the ratchet gear 26 gets engaged with the inner teeth 88 to keep the engaged state when the pretensioner mechanism 17 activates and causes the webbing 3 to receive the predetermined value or more (for instance, 2 kN to 3 kN) of tensile force P1.

The present invention is not limited to the above-described embodiment, but various improvements and alterations can be made thereto without departing from the spirit of the present invention. The following alternations may be made, for instance.

[Other Embodiment 1]

(A) A seatbelt retractor 301 directed to other embodiment 1 is structurally almost the same as the seatbelt retractor 1. The seatbelt retractor 301, however, may be configured to include an engagement gear portion 303 shown in FIG. 44 instead of the engagement gear portion 89, for instance. Here will be described on the engagement gear portion 303 referring to FIG. 44.

Figure 44:
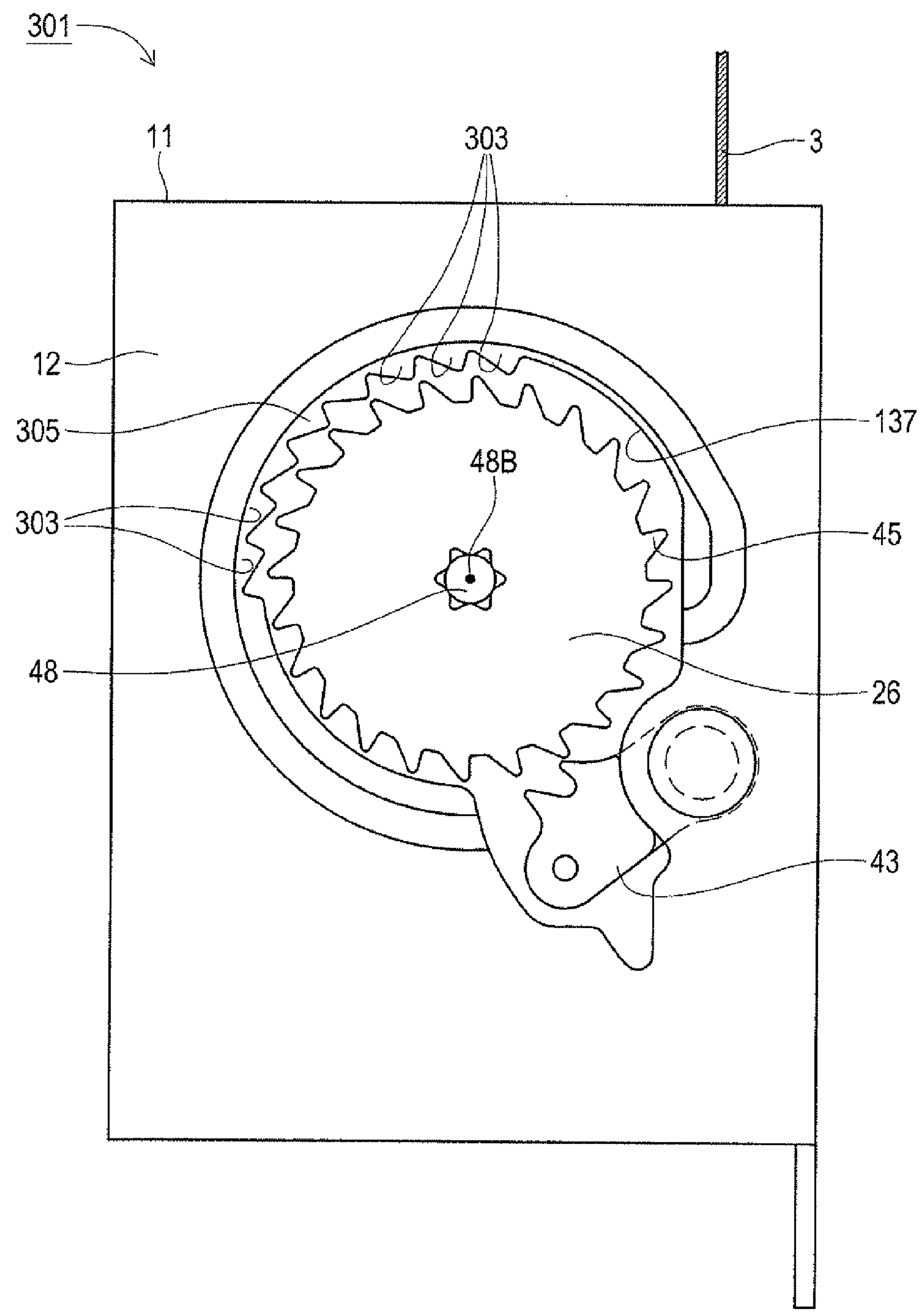
FIG. 44 is a view for describing inner teeth formed on an engagement gear portion of a housing directed to other embodiment.

FIG. 44 shows rotation position of the ratchet gear 26 when the pretensioner mechanism 17 does not activate with the locking unit 9 being removed from the side wall portion 12 of the housing 11. In the following description, reference numbers identical with those assigned to configuration elements of the seatbelt retractor 1 indicate configuration elements identical or similar with those of the seatbelt retractor 1.

As shown in FIG. 44, on the inner periphery of the through hole 137 where the ratchet gear portion 45 of the ratchet gear 26 faces, there are formed an engagement portion 305 comprised of inner teeth 303 that can get engaged with the ratchet gear 26. The inner teeth 303 are configured to have pitch the same as pitch of the ratchet gear portion 45 of the ratchet gear 26 and to tilt in a direction where the take-up drum 6 rotates for taking up the webbing 3. Accordingly, the inner teeth 303 are formed so that the ratchet gear portion 45 gets engaged therewith only when the ratchet gear 26 rotates in the webbing-pull-out direction.

Further, the engagement gear portion 305 comprised of the inner teeth 303 is formed on a part of the inner periphery on the through hole 137 with central angle of 90 degrees so that, with reference to the rotation axis 48B of the shaft portion 48 erected on the ratchet gear 26, the inner teeth 303 start from a radial direction that is parallel with the webbing-pull-out direction (upward direction in FIG. 44) toward a direction where the take-up drum 6 is caused to rotate when the webbing 3 is pulled out.

Alternatively, the engagement gear portion 305 comprised of the inner teeth 303 may be formed on a part of the inner periphery on the through hole 137 with central angle of 180 degrees so that, with reference to the rotation axis 48B of the shaft portion 48 erected on the ratchet gear 26, the inner teeth 303 start from a radial direction that is orthogonal to the webbing-pull-out direction (upward direction in FIG. 44) toward a direction where the take-up drum 6 is caused to rotate when the webbing 3 is pulled out. Thereby, the ratchet gear portion 45 of the ratchet gear 26 can surely get engaged with the inner teeth 303 when the pretensioner mechanism 17 activates.

Further, regarding the inner teeth 303 of the engagement gear portion 305 formed on the inner periphery of the through hole 137, pitch thereof is made the same as pitch of the ratchet gear portion 45 of the ratchet gear 26. Thereby, the ratchet gear 26 can surely and promptly get engaged with the inner teeth 303 in a case where the ratchet gear portion 45 comes into contact with the inner teeth 303 in response to activation of the pretensioner mechanism 17 due to vehicle collision. Hardness of each of the inner teeth 303 can be enhanced by making pitch of the inner teeth 303 of the engagement gear portion 305 the same as that of the ratchet gear portion 45.

[Other Embodiment 2]

Figure 45:
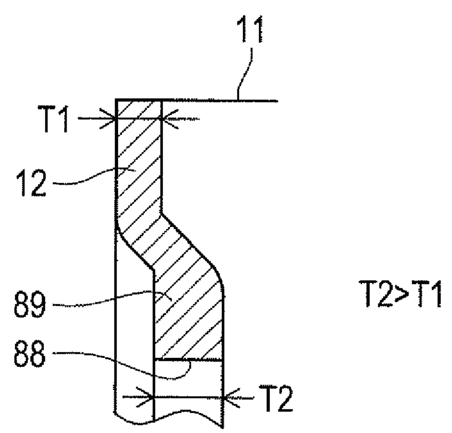
FIG. 45 is a cross sectional view of the inner teeth formed on the engagement gear portion of the housing directed to the other embodiment.

(B) For instance, as shown in FIG. 45, regarding thickness T2 of each of the inner teeth 88 on the engagement gear portion 89 formed on the side wall portion 12 of the housing, thickness T2 thereof may be made thicker than thickness T1 of the side wall portion 12 through burring. Thereby, hardness of each of the inner teeth 88 can be enhanced.

The invention claimed is:

1. A seatbelt retractor comprising:

a housing;

a take-up drum that is housed in the housing in a rotatable fashion and configured to house a webbing by winding the webbing thereon; and a pretensioner mechanism unit that is mounted on an exterior of one-side wall portion of the housing and configured to rotate the take-up drum in a webbing-take-up direction so as to take up the webbing on the take-up drum in a case of vehicle collision, wherein an axial directional one end of the take-up drum is rotatably supported by the one-side wall portion of the housing and a shaft portion erected on an axial directional other end of the take-up drum is rotatably supported by a cover member that is mounted on an exterior of other-side wall portion of the housing, the other-side wall portion facing the one-side wall portion, the housing includes:

an opening portion that is formed in the other-side wall portion of the housing and configured to allow insertion of a ratchet gear formed on an outer periphery of an edge portion at the axial directional other end of the take-up drum so that predetermined space is secured between the opening portion and the ratchet gear when the ratchet gear is inserted therein; and inner teeth that are formed on an inner periphery of the opening portion so as to face the ratchet gear and capable of engaging with the ratchet gear, the inner teeth being formed so as to tilt in a direction where the take-up drum rotates when taking up the webbing, wherein:

when the pretensioner mechanism activates and causes the take-up drum to rotate in the webbing-take-up direction so that the webbing to receive a predetermined value or more of tensile force in a webbing-pull-out direction, the cover member gets plastically deformed by a pressing force that acts in a radially outward direction via the shaft portion which the tensile force acts on, and the deformation of the cover member causes an eccentricity of a rotation axis of the shaft portion so that the inner teeth of the opening portion and the ratchet gear stay in an engaged state, and a pitch of the inner teeth is smaller than a pitch of teeth of the ratchet gear.

2. The seatbelt retractor according to claim 1, wherein the cover member is made by molding synthetic resin.

* * * * *